United States Patent
Hashimoto et al.

[11] Patent Number: 5,959,804
[45] Date of Patent: Sep. 28, 1999

[54] STORAGE DEVICE AND RECORDING MEDIUM CARTRIDGE

[75] Inventors: Akira Hashimoto; Yasutaka Mizutani; Kazunobu Hamatsu; Hirohiko Sugiura; Takamitsu Sugahara; Masao Sato; Kenji Shoji; Junji Kawada, all of Tokyo, Japan

[73] Assignee: Mitsubishi Denki Kabushiki Kaisha, Tokyo, Japan

[21] Appl. No.: 08/791,906

[22] Filed: Jan. 31, 1997

[30] Foreign Application Priority Data

Jan. 31, 1996 [JP] Japan .................................. 8-015703
Nov. 15, 1996 [JP] Japan .................................. 8-305245

[51] Int. Cl.$^6$ .................................................. G11B 17/04
[52] U.S. Cl. ........................................................ 360/99.06
[58] Field of Search ............................ 360/99.06, 99.12, 360/97.01

[56] References Cited

U.S. PATENT DOCUMENTS

| | | | |
|---|---|---|---|
| 3,943,567 | 3/1976 | Kazuo | 360/93 |
| 4,503,530 | 3/1985 | Hinlein et al. | 369/270 |
| 4,899,238 | 2/1990 | Inoue et al. | 360/99.06 |
| 5,014,152 | 5/1991 | Sasaki | 360/135 |
| 5,063,554 | 11/1991 | Uehara | 369/77.2 |
| 5,091,898 | 2/1992 | Bessho et al. | 369/77.2 |
| 5,123,004 | 6/1992 | Arai | 360/99.06 X |
| 5,381,293 | 1/1995 | Akiyama et al. | 360/133 |
| 5,481,423 | 1/1996 | Aoki | 360/99.06 |
| 5,586,106 | 12/1996 | Chiou et al. | 360/99.12 X |
| 5,590,109 | 12/1996 | Ookawa et al. | 360/99.06 X |

FOREIGN PATENT DOCUMENTS

| | | |
|---|---|---|
| 0240170A1 | 10/1987 | European Pat. Off. |
| 0283921A2 | 9/1988 | European Pat. Off. |
| 0352918A2 | 1/1990 | European Pat. Off. |
| 0439286A2 | 7/1991 | European Pat. Off. |
| 0482585A2 | 4/1992 | European Pat. Off. |
| 0499413A1 | 8/1992 | European Pat. Off. |
| 0510681A2 | 10/1992 | European Pat. Off. |
| 0573291A2 | 12/1993 | European Pat. Off. |
| 0579317A2 | 1/1994 | European Pat. Off. |
| 0740301A2 | 10/1996 | European Pat. Off. |
| 37-42156 | 3/1962 | Japan . |
| 57-38388 | 3/1982 | Japan . |
| 59-54067 | 3/1984 | Japan . |
| 59-71161 | 4/1984 | Japan . |
| 60-648 | 5/1985 | Japan . |
| 03100967 | 4/1991 | Japan . |
| 5181565 | 7/1993 | Japan . |
| 555352 | 7/1993 | Japan . |
| 0644679 | 2/1994 | Japan . |
| 644679 | 2/1994 | Japan . |
| 06119699 | 4/1994 | Japan . |
| 652053 | 7/1994 | Japan . |
| 6267226 | 9/1994 | Japan . |
| 2274939 | 8/1994 | United Kingdom . |

OTHER PUBLICATIONS

Patent Abstracts of Japan—Japanese Patent Publication No. 07085626 Published on Mar. 31, 1995.
Patent Abstracts of Japan—Japanese Patent Publication No. 07249277 Published on Sep. 26, 1995.
Patent Abstracts of Japan—Japanese Patent Publication No. 08096544 Published on Apr. 12, 1996.
Patent Abstracts of Japan—Japanese Patent Publication No. 62248182 Published on Oct. 29, 1987.

*Primary Examiner*—John H. Wolff

[57] ABSTRACT

A small and thin storage device that can be substituted for IC memory card is disclosed. When the recording medium cartridge is inserted into the frame of the storage device, a slide member in a hub moves parallel to the frame and retracts a shaft under restriction of a restriction member provided in the recording medium cartridge so that the hub and the shaft engage. When the recording medium cartridge is ejected from the frame, the slide member moves parallel to the frame and the shaft under restriction of the restriction member so as to release the engagement of the shaft and the hub.

2 Claims, 66 Drawing Sheets

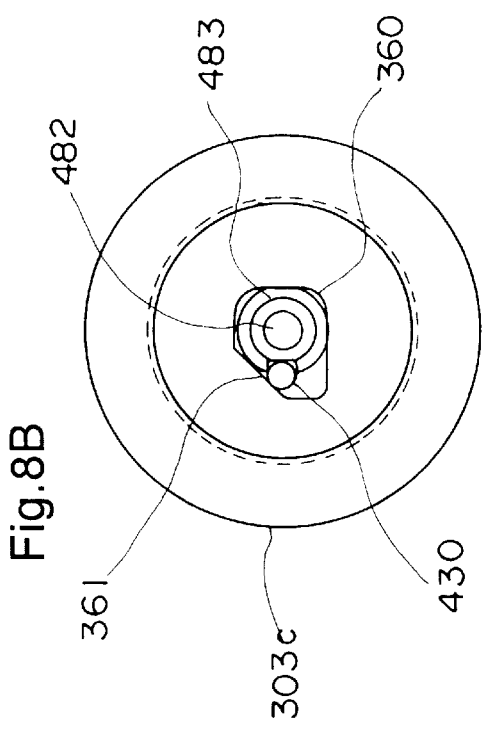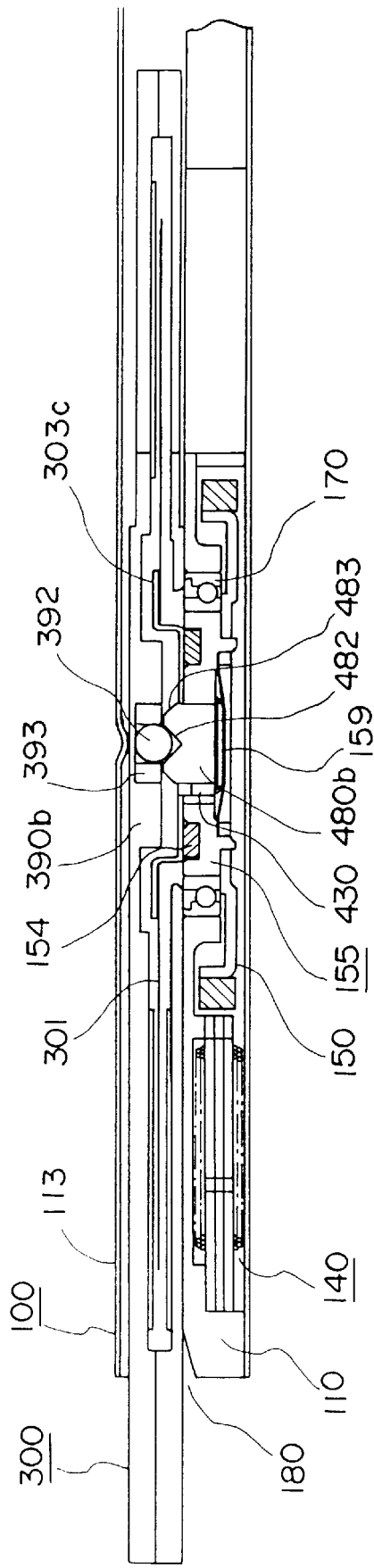

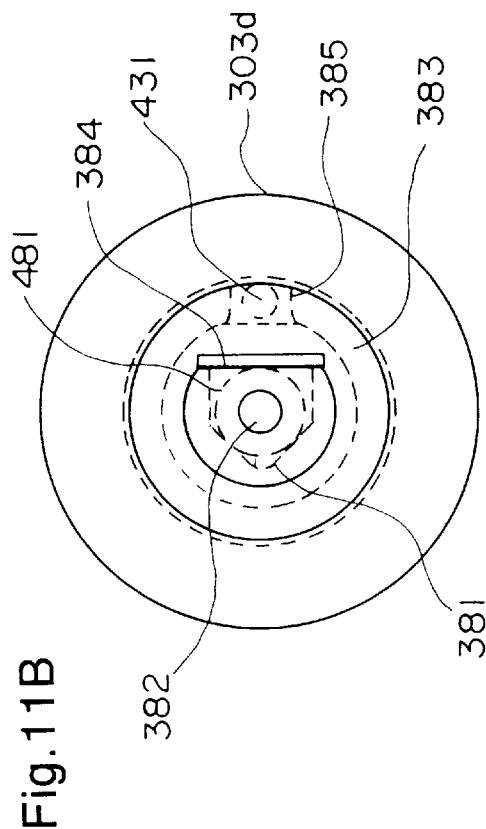
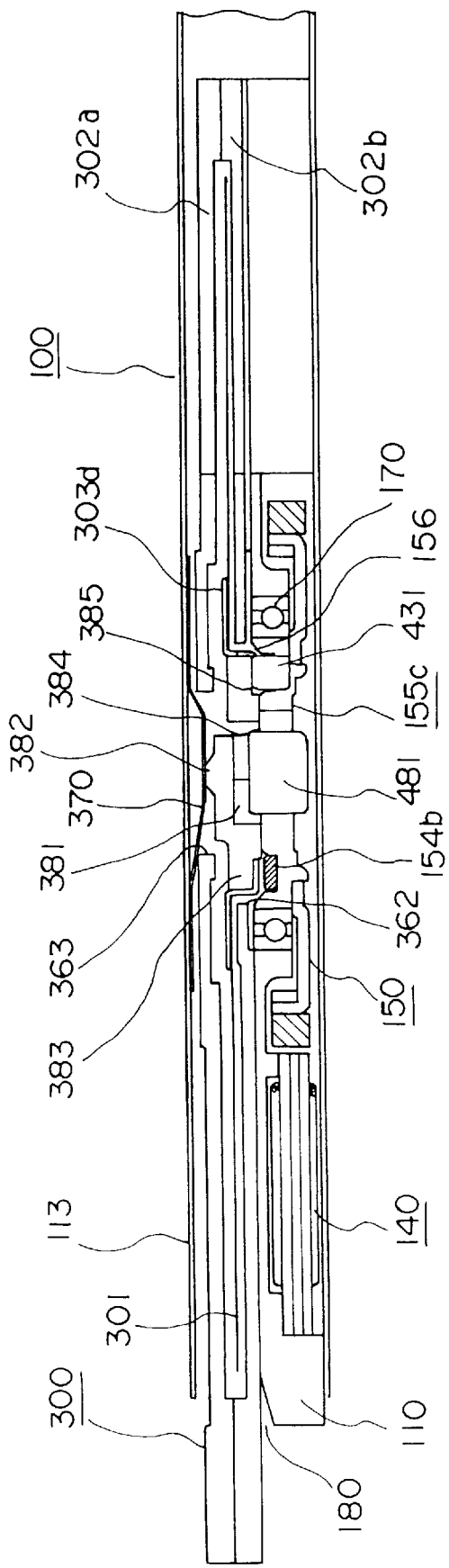
Fig.11B
Fig.11A

Fig.22D

| STATE \ TERMINAL | | 115a | 115b | 115c | |
|---|---|---|---|---|---|
| DISK in | WRITE PROTECT ON | L | L | H | Fig.22A |
| | WRITE PROTECT OFF | L | L | L | Fig.22B |
| DISK out | | H | L | H | Fig.22C |

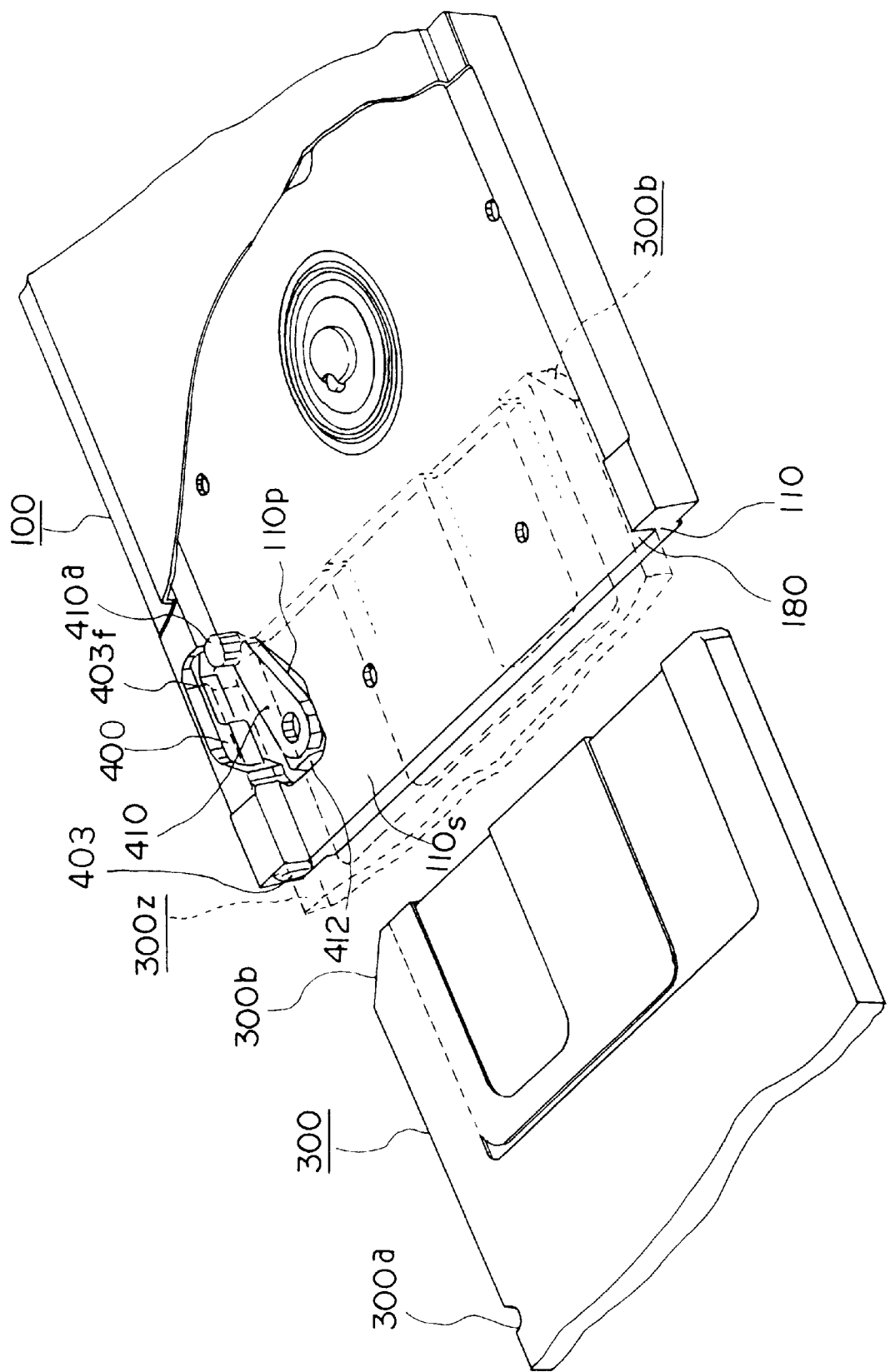

SECTION AA

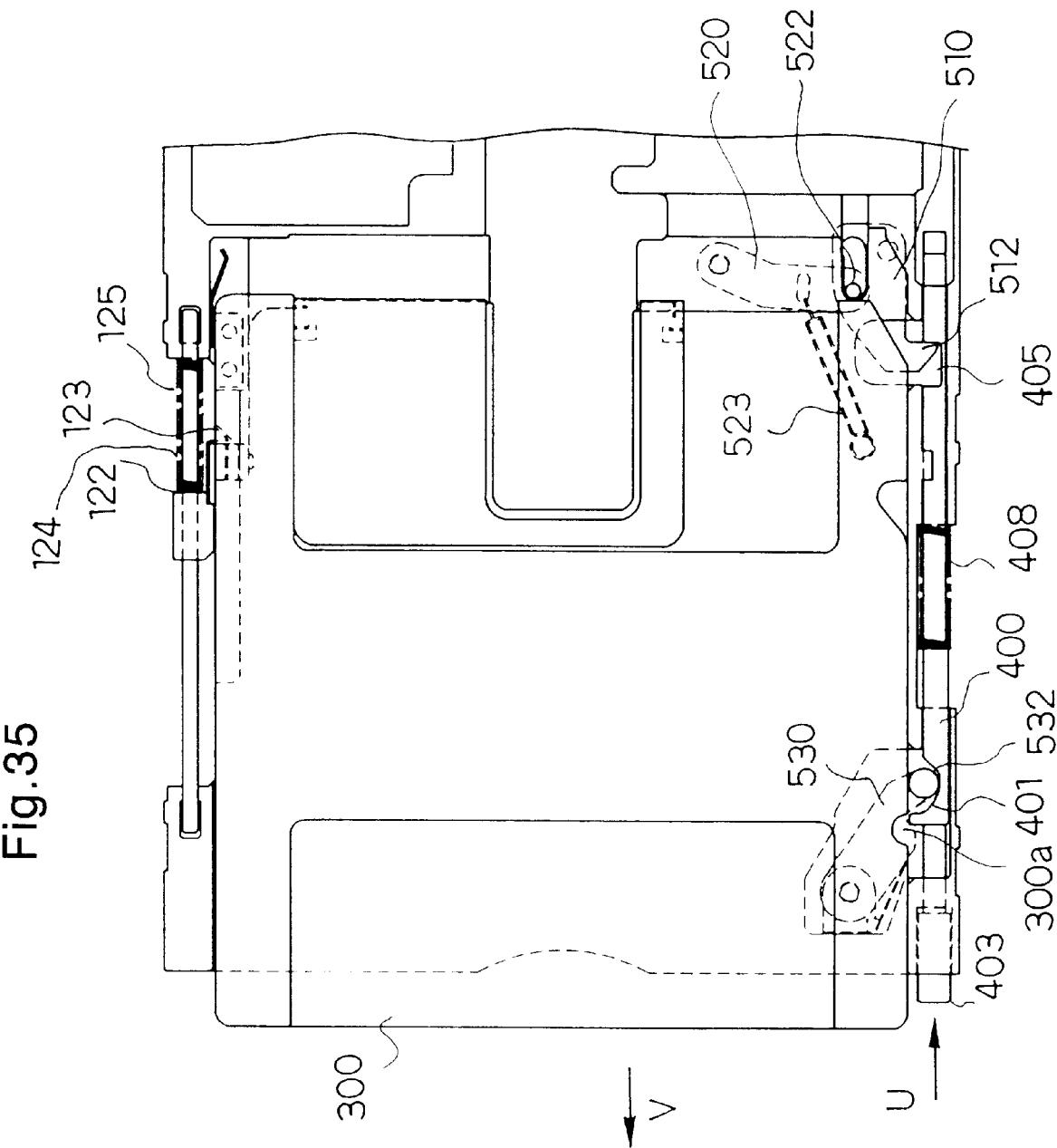

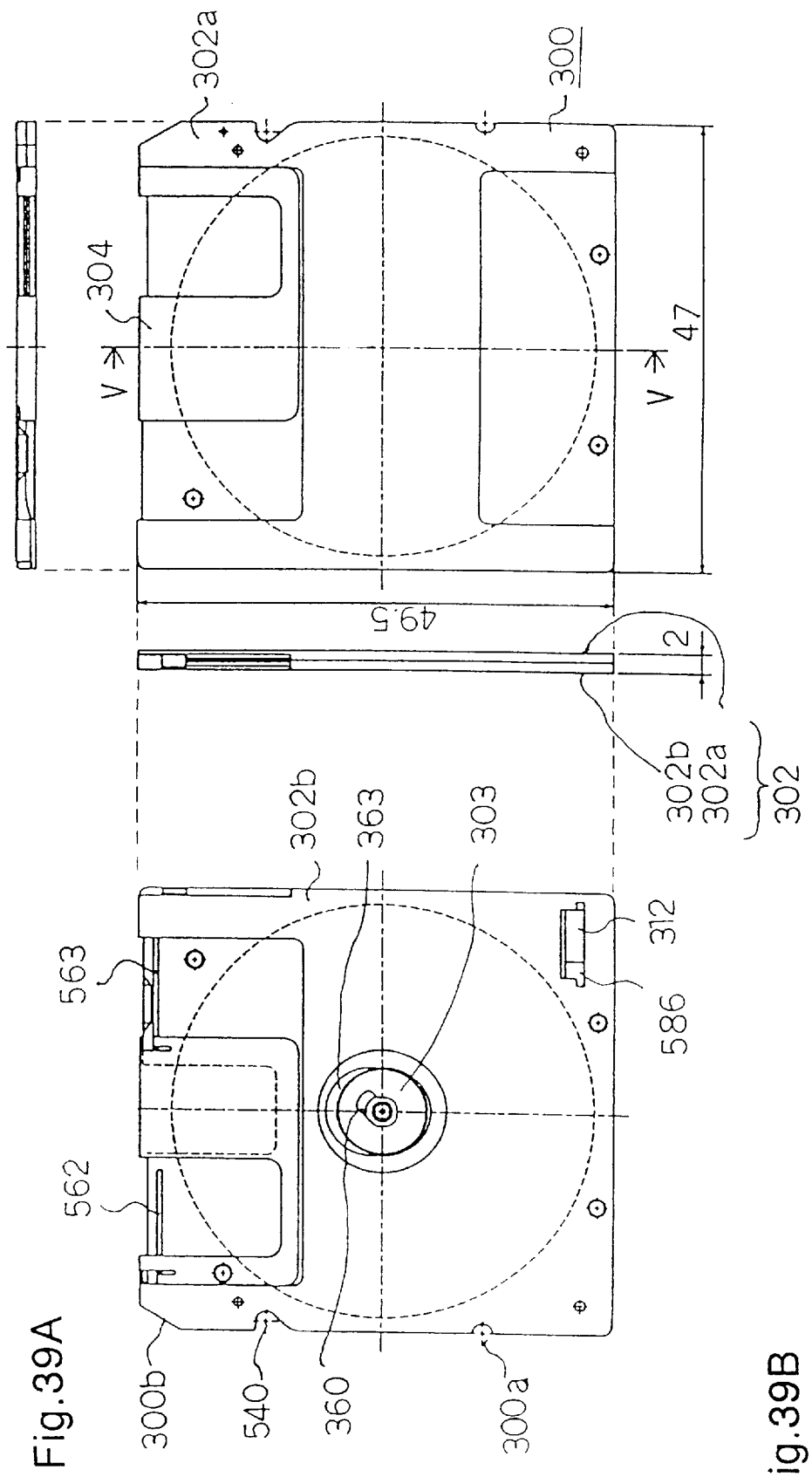
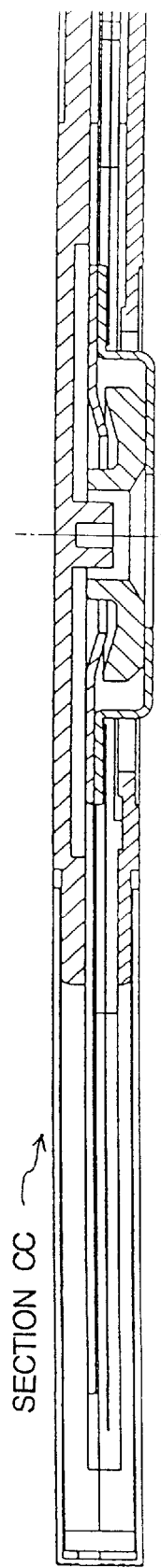
Fig.39A
Fig.39B  SECTION CC

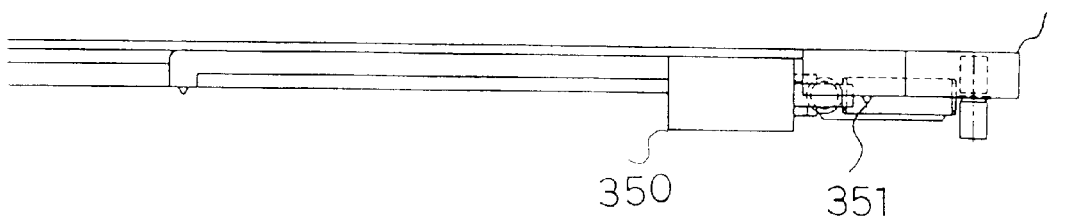
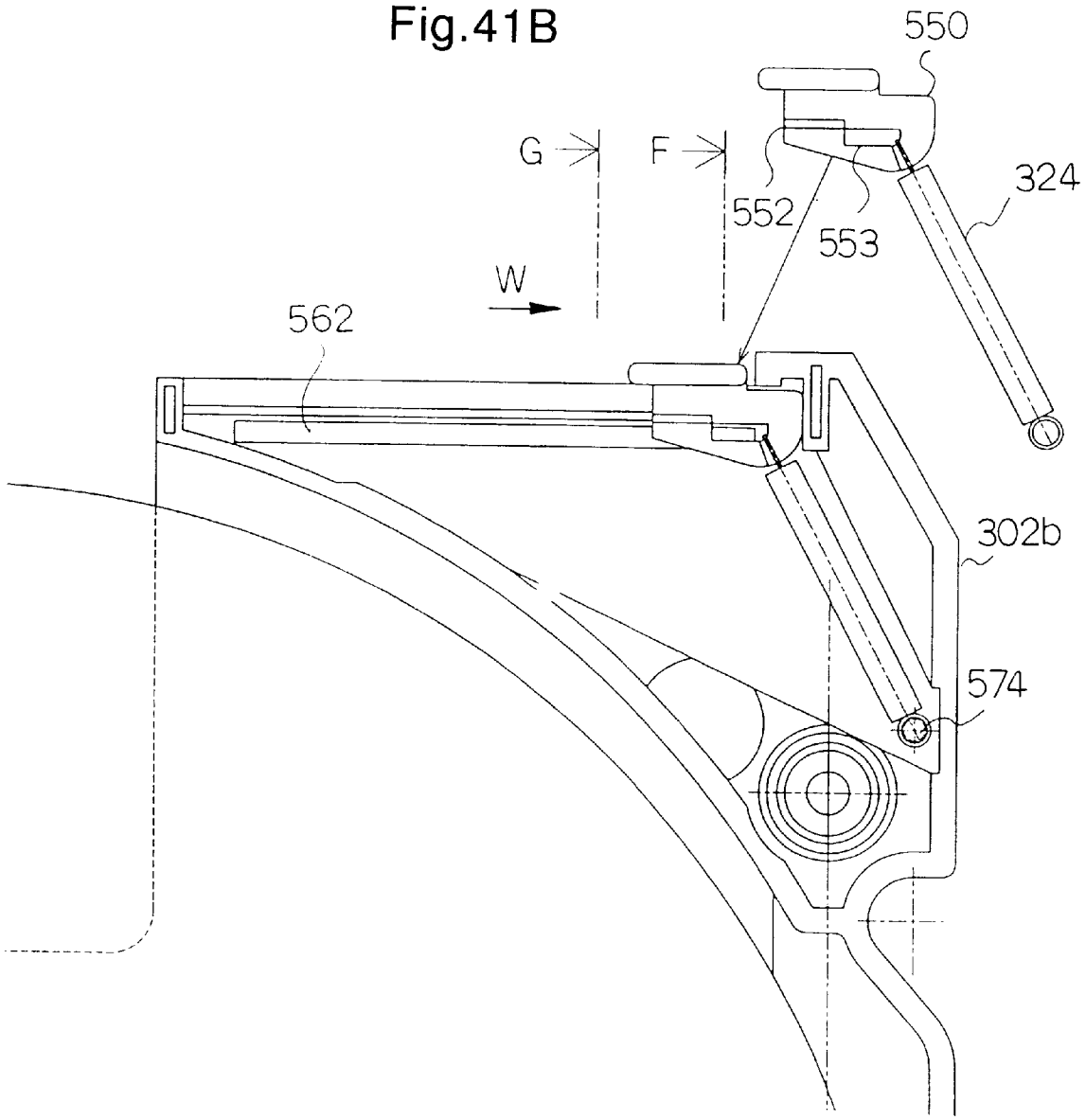

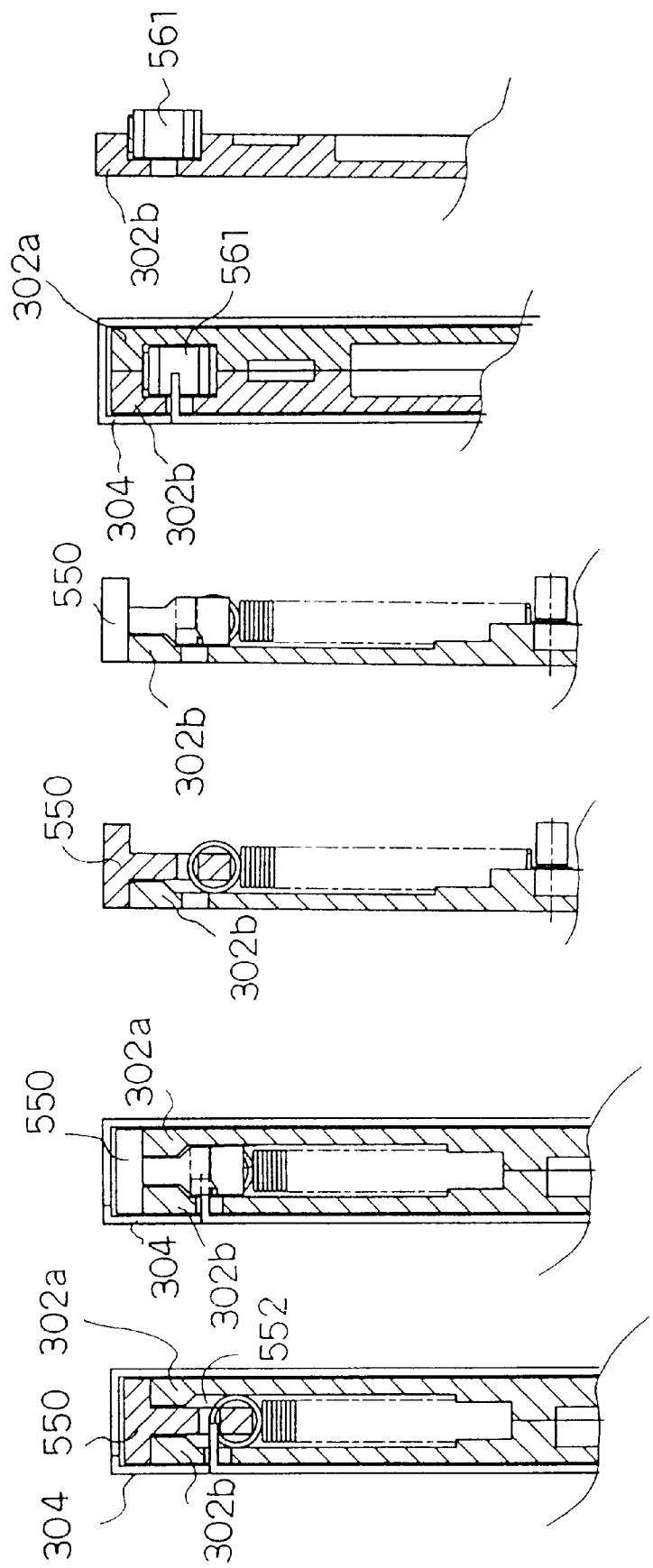

Fig.56A
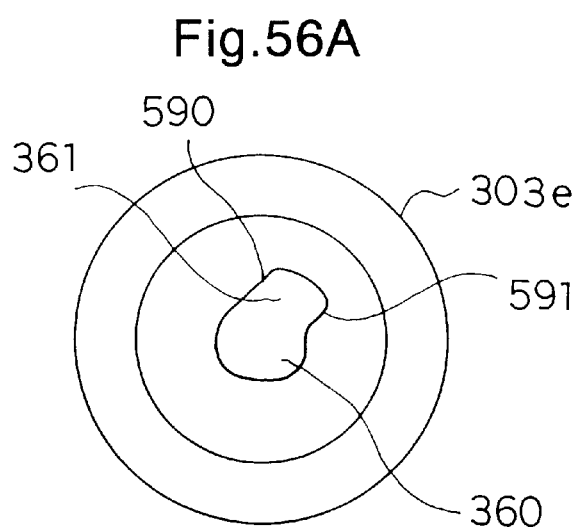
Fig.56B
Fig.56C
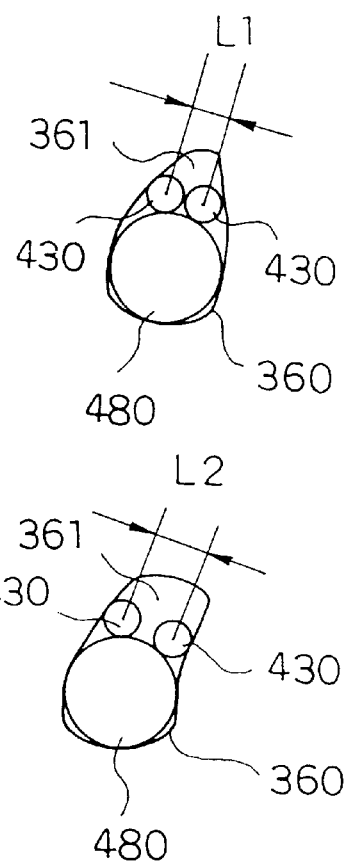
Fig.57A
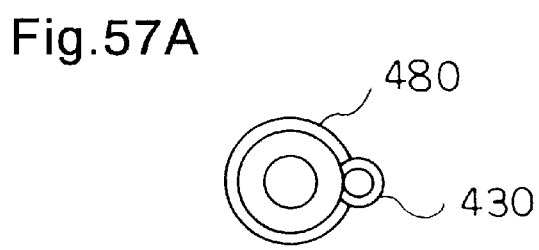
Fig.57C
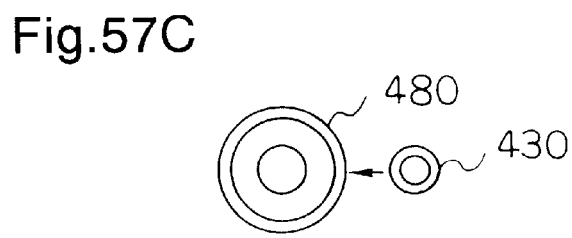
Fig.57B
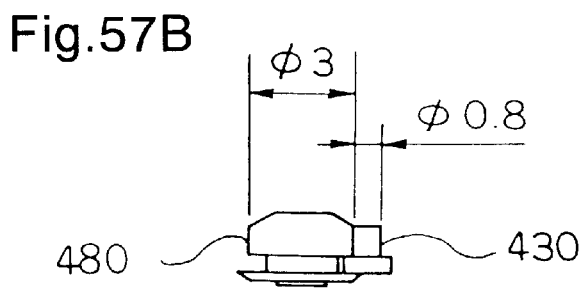
Fig.57D
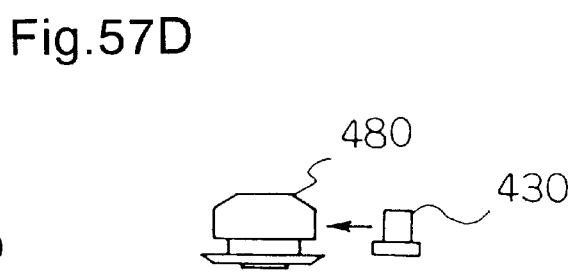

Fig.81

| STATE \ TERMINAL | | 115a | 115b | 115c | |
|---|---|---|---|---|---|
| DISK in | WRITE PROTECT ON | H | L | L | Fig.80A |
| | WRITE PROTECT OFF | L | L | L | Fig.80B |
| DISK out | | H | L | H | Fig.80C |

STORAGE DEVICE AND RECORDING MEDIUM CARTRIDGE

BACKGROUND OF THE INVENTION

1. Field of the Invention

The present invention relates to a storage device which can exchange a recording medium and a recording medium cartridge used in a personal computer, a portable information terminal and so forth.

2. Description of the Related Art

FIG. 82 shows a fragmentarily sectional perspective view of a storage device which can exchange the recording medium. The storage device is a conventional flexible disk drive (FDD) disclosed in a Japanese Unexamined Patent Publication No. Hei 06-119699. Specifically, FIG. 82 shows a 3.5 inch FDD. A recording medium cartridge is composed of a hard case with a shutter wherein the recording medium is contained. FIG. 83 shows a fragmentarily transverse cross section of the FDD.

In the figure, an FDD body 1, a read/write head 2, a carriage 3 for holding the read/write head 2 are provided. A head arm 4 for holding the read/write head 2 is connected with the carriage 3. A frame 10 has a fitting part 11 for mounting an external dedicated slot 80. The frame 10 has a guide groove 12. A cover (shield) 13 and a circuit board 14 are mounted on the frame 10. A cartridge holder 15 has cam followers 16 and a shutter opener 17. A slide cam 20 which has a cam groove 21 and an eject button 22 is engaged with an eject lever 23. The cam groove 21 and the guide groove 12 of the frame 10 are engaged with the cam followers 16.

The recording medium cartridge 30 has a recording medium 31 and a cartridge case 32. The recording medium 31 is held by a hub 33 and the cartridge case 32 has a shutter 34 and a window 35. A recording medium drive actuator 40 rotates the recording medium 31 and has a circuit board 14, a rotor 42, a drive pin 43, a chucking magnet 44, a bearing 46 and a spindle shaft 48.

The cartridge case 32 has a write protection hole 32c not to erase the data once recorded in the recording medium 31. The cartridge case 32 has a slide member 36 made of plastic, so that a write protection is presented when the write protection hose 32c is opened by the slide member 36 and the data can be written when the write protection hole 32c is closed-by the slide member 36. The circuit board 14 has a disk-in switch 37 for detecting that the recording medium 31 is set at a read/write position. The circuit board 14 has a write protect switch 38 for detecting the write protection of the recording medium 31.

A contacting point 38a at the top of the write protect switch 38 is pushed into the write protect switch 38 by the slide member 36 so that the information can be written on. On the other hand, in case of the write protection, the contacting point 38a is free.

The disk-in switch 37 has the same form with the write protect switch 38, or the disk-in switch 37 is integrated with the write protect switch 38. When the recording medium cartridge 30 is set at the read/write position, in a load state, a contacting point 37a at the top of the disk-in switch 37 is pushed down by the cartridge case 32. On the other hand, when the recording medium 31 is not possible to read/write, in an unload state, the contacting point 37a is free.

The operation is explained with reference to the figures.

At first, a transition from the unload state where it is not possible to read/write from/on the recording medium 31 to the load state where it is possible to read/write from/on the recording medium 31 is explained hereinafter.

When the recording medium cartridge 30 is inserted into the FDD body 1, the recording medium cartridge 30 is held in the cartridge holder 15 being pushed up by the cam groove 21 of the slide cam 20 and the cam follower 16. Then, the recording medium cartridge 30 is further inserted, keeping a height over a top of the spindle shaft 48 which is located at the center of the recording medium drive actuator 40. When the center of the recording medium cartridge 30 comes close to the spindle shaft 48, the shutter 34 is opened by the shutter opener 17. Then, the eject lever 23 is rotated and a latch of the slide cam 20 is released and the cartridge holder 15 is lowered by the cam groove 21. When the recording medium cartridge 30 is lowered to a fixed position, two holes 33a and 33b formed at the hub 33 holding the recording medium 31 are engaged with each of the spindle shaft 48 and the drive pin 43. Then, the position setting of the recording medium 31 is performed by rotating the rotor 42.

A hole 33a engaged with the spindle shaft 48 is a square and a hole 33b engaged with the drive pin 43 has line sides slanted to the direction of radius and the eccentric force is generated in the direction of the radius against the hub 33 by the rotation of the drive pin 43. Accordingly, the gap between a side of the hole 33a and a side of the spindle shaft 48 occurring in the hole 33a engaged with the spindle shaft 48 is removed. The hub 33 is composed of a magnetic material and chucked by the chucking magnet 44 provided in the recording medium drive actuator 40. After that, the read/write head 2 supported by the carriage 3 is moved to the recording surface of the recording medium 31. Then, the read/write operation is enabled for the recording medium 31 and the transition to the load state is completed.

Next, a transition from the load state to the unload state of the recording medium cartridge 30 is explained hereinafter.

By pressing the eject button 22 to a fixed position, the cartridge holder 15 is raised along the cam groove 21. When the recording medium cartridge 30 and the raised cartridge holder 15 reach to the position which can move over the top of the spindle shaft 48, the engagement with the shutter 34 and the shutter opener 17 is released and the shutter 34 is closed. The shutter opener 17 and the eject lever 23 eject the recording medium cartridge 30. The slide cam 20 is located by the eject lever 23. The cartridge holder 15 is restrained from lowering by the latch of the slide cam 20 and the eject lever 23. Then, the recording medium cartridge 30 assumes the unload state.

Further, FIGS. 84, 85, 86A, 86B and 87 show an FDD and a recording medium cartridge shown in the other related art (Japanese patent application No. Hei 07-302797, which is not laid open yet at the filing date of this application to Japanese Patent office). FIG. 84 shows a whole configuration of the FDD, the recording medium cartridge to be inserted into the FDD and a slot for mounting the FDD to the portable information terminal and so forth. FIG. 85 shows a sectional side view of the FDD when the recording medium cartridge is inserted into the FDD and is in the load state.

FIG. 86A is a partially broken plane view showing a state where the recording medium cartridge 30 is mounted on the FDD. FIG. 86B shows a cross sectional view taken on line I—I of FIG. 86A from the direction of the arrows. FIG. 87 is a perspective view showing the latch function of the recording medium cartridge 30.

In FIGS. 84–87, an FDD body 1, a read/write head 101, a carriage 102, a frame 110, a slot guide 111 and a cover (shield) 113 are provided.

Three convexities 314 are formed at the positions with equally divided angular on a hub 303. Three concavities 157 are formed on the spindle part 155 of the rotor and engaged with the convexities 314 with some allowance.

A recording medium drive actuator 140 has a rotor 150. The rotor 150 has a chucking magnet 154, which is a means for mounting the hub 303, and a spindle part 155, which is a means for setting the position of the recording medium. At the center of the spindle part 155, a centering ball 158 and a return spring (gimbal spring) 159 as a means for returning and pushing back the centering ball. A bearing 170 holds the spindle part 155 rotatably on the frame 110. Additionally, an insertion/ejection slot 180 of the recording medium cartridge 30 and an interface connector 181 according to a PCMCIA type 2 standard are provided. Grooves 182 and 183 are provided for preventing erroneous insertion of the FDD body 1 into the slot.

A slot 200 is a slot of PCMCIA (Personal Computer Memory Card Association) type 2 standard mounted on the information processing unit such as a portable information terminal. The slot 200 has an eject button 222 to eject the FDD body 1 and an insertion slot 280.

In general, this kind of memory card is also called PC card. PCMICA, which is an association for standardization of the extended IC (Integrated Circuit) card in the United States, determines the specification of the memory card. The width of the card according to the PCMICA is 54.0 mm for all types and the thicknesses are as follows.

Type 1: thickness 3.3 mm

Type 2: thickness 5.0 mm

Type 3: thickness 10.5 mm

A recording medium 301 is contained in the recording medium cartridge 30. A cartridge case 302 is composed of an upper shell 302*a* and a lower shell 302*b*. A shutter 304, a window 305, a connecting band 306, a slider 307 are provided. The one end of the connecting band 306 is connected with the shutter 304. The other end is connected with the slider 307. A restriction member 390 is provided and a taper 391 is mounted on the hub 303.

At first, a transition from the unload state where it is not possible to read/write from/on the recording medium 301 to the load state where it is possible to read/write from/on the recording medium 301 is explained hereinafter.

The FDD body 1 has the cover 113 fixed on the frame 110 which is integrated with the interface connector 181.

The recording medium cartridge 30 is inserted into the FDD body from the insertion/ejection slot 180. When the recording medium cartridge 30 is inserted into the FDD body 1, the recording medium cartridge 30 is moved with the same height in the inserting direction from the insertion/ejection slot 180.

When the recording medium cartridge 30 is inserted, the end of the recording medium cartridge 30 contacts the centering ball 158 being located at the center of the spindle part 155. The recording medium cartridge 30 pushes down the centering ball 158 which has been pushed up toward the recording medium cartridge 30. Therefore, the recording medium cartridge 30 can be inserted further. After the shutter 304 passes over the centering ball 158, the opener lever 121 mounted on the side wall of the insertion/ejection slot 180 is engaged with the slider 307 and the shutter 304 is slid. Then, the window 305 is opened and the recording medium 301 is exposed for access to the read/write head 101.

When the recording medium cartridge 30 is further inserted, the insertion of the recording medium cartridge 30 is almost completed. At this time, a hole part 313 of the hub 303 comes to the position of centering ball 158.

The centering ball 158 is pushed up by the return spring 159 and engages with the hole part 313. As a result, the recording medium 301 is placed at the center. Next, the spindle part 155 rotates and the convexities 314 and the concavities 157 are engaged. Since the hub 303 is made of magnetic material, when the chucking magnet 154 and the hub 303 are stuck together, the magnetic force by the chucking magnet 154 is strengthened. The centering of the recording medium 301 is precisely performed and the transition to the load state is completed by the chucking.

FIGS. 86A and 86B show a movable member 310 for recognizing a write protection state for not erasing the data once written in the recording medium 301. The member 310 is formed with a forked conductive metal piece 311 by integral molding. The conductive metal piece 311 is made of an elastic member such as a plate spring. The lower shell 302*b* fixes two conductive metal plates 312*a* and 312*b* separately by integral molding. Surfaces of the conductive metal plates 312*a* and 312*b* are exposed from the bottom of the lower shell 302*b*.

A contact terminal 115*a* (not illustrated) is provided under the conductive metal plate 312*a*. A contact terminal 115*b* is provided under the conductive metal plate 312*b*. The contact terminals 114*a* and 115*b* function as a write protect switch for recognizing the write protection state. Each of the contact terminals 115*a* and 115*b* is made of a plate spring of conductive metal. Each of the contact terminals 115*a* and 115*b* is fixed separately in the switch holder 116 which is made of an unconductive body of plastic or the like. The switch holder 116 is fixed on the frame 110. The contact terminals 115*a* and 115*b* are placed at locations where two of the conductive metal plates 312*a* and 312*b* exposed from the lower shell 302 contact respectively to the contact terminals 115*a* and 115*b* when the recording medium cartridge 30 is inserted into the FDD body 1 and positioned in the load state. A member 302*c* is mounted on the cartridge case 302 of the recording medium cartridge 30 so as to keep the position of the movable member 310.

Next, an operation of the write protect switch will be explained.

FIG. 86A shows a state where two portions 311*a* and 311*b* of the conductive metal piece 311 respectively contact the conductive metal plates 312*a* and 312*b*. Though it is not shown in the FIG. 86A, by sliding the movable member 310, it is possible to create a state where the portion 311*a* of the conductive metal piece 311 on the movable member 310 contacts only with the conductive metal plate 312*b* fixed on the lower shell 302*b*.

When the recording medium cartridge 30 is set in the FDD body 1 and in the load state where the read/write operation is possible, the contact terminals 115*a* and 115*b* of the write protect switch on the FDD body 1 respectively contact with the conductive metal plates 312*a* and 312*b* fixed on the lower shell 302*b*. When the conductive metal piece 311 contacts only with the conductive metal plate 312*b*, the contact terminals 115*a* and 115*b* connected with circuit on a circuit board (not shown in the figures) are not conducted. On the other hand, when the conductive metal piece 311 contacts with both of the conductive metal plates 312*a* and 312*b*, the contact terminals 115*a* and 115*b* are connected with a conductive state. The circuit on the circuit board determines whether write protection is performed or not by detecting the conductive state.

In FIGS. 86A and 87, a latch lever 410 is provided as a position setting member, to keep the recording medium cartridge 30 in the load state where the read/write operation is possible from/in the FDD body 1. The latch lever 410 is composed of a cylinder shaped stopper 410a and a U-shaped hooklike spring 410b. The hooklike spring 410b is stored below a surface 110s of the frame 110 and in a concavity 110p of the frame 110. When the recording medium cartridge 30 is loaded in the FDD body 1, the hooklike spring 410b is hidden under the recording medium cartridge 30.

An eject shaft 400 has a notch 403f for retracting the stopper 410a therein in the unload state. The notch 403f is provided so that the side of the stopper 410a of the latch lever 410 is contacted with the notch 403f. The stopper 410a is pushed by the hooklike spring 410b so that the stopper 410a always contacts the notch 403f.

On a side of the recording medium cartridge 30, a semicircular stopper notch 300a is provided. When the recording medium cartridge 30 is completely inserted into the FDD body 1, the side of the stopper 410a is engaged with the stopper notch 300a of the recording medium cartridge 30.

Thus, the latch lever 410 is engaged with the stopper notch 300a of the recording medium cartridge 30. Then, the latch lever 410 performs the position setting of the recording medium cartridge 30 in the inserting direction and the perpendicular to the inserting direction.

When the eject button 403 is pressed and the recording medium cartridge 30 is ejected, the stopper 410a of the latch lever 410 is removed from the stopper notch 300a by the pressure of the hooklike spring 410b and retracted to the notch 403f. Then, the recording medium cartridge 30 can be ejected.

PROBLEMS TO BE SOLVED BY THE INVENTION

Recently, as a storage device used in a portable information terminal, an IC memory card which is small and portable is often used. But, the IC card has the following problems.

(1) The recording medium in the IC memory card is the IC memory. Since the IC memory is not possible to exchange, the IC memory card itself needs to be exchanged.

(2) Since the price of the IC memory itself is expensive, the price of the IC memory card is also expensive.

(3) According to the above (1) and (2), cost is high when the IC memory card is used to exchange the recording medium.

There is an effort which makes the recording medium cartridge in lower price, easy to exchange, smaller and thinner to be a substitution of the IC memory card. However, in order to realize such recording medium cartridge, the FDD should correspond to the size applicable to the PCM-CIA type 2 standard (thickness 5.0 mm and width 54.0 mm). The FDD should be manufactured to be fitted to the size of the slot wherein the card of the PCMCIA type 2 standard could be inserted. There are following problems for manufacturing such FDD.

(1) When the recording medium cartridge is inserted into the FDD, there is a point of the recording medium cartridge where the read/write head 2 must pass over. Therefore, the head arm 4 has to move up and down greatly. Accordingly, a thickness of the FDD body 1 becomes a total of a thickness of the recording medium cartridge 30, a thickness of the read/write head 2, a thickness of the head arm 4 and a thickness of the carriage 3. Therefore, it is difficult to make the FDD thinner.

(2) In the chucking structure for the recording medium (disk) 31, the hub 33 is engaged with the spindle shaft 48 and the drive pin 43. When the recording medium cartridge 30 is loaded or unloaded, the recording medium cartridge 30 should be moved up and down more than the length of engagement of the hub 33 with the spindle shaft 48 and the drive pin 43. Accordingly, a place for up/down movement should be secured. Therefore, it is difficult to make the FDD thinner.

(3) The conventional FDD and the recording medium cartridge 30 needs a height at which each of the contacting points 37a and 38a of the disk in switch and the write protect switch 38 moves up and down. Therefore, it is difficult to make the FDD or the recording medium cartridge thinner.

(4) In the conventional FDD and the recording medium cartridge 30, the position setting of the hub 303 holding the recording medium 301 is performed by the ball 158 mounted retractably at the center of the spindle part 155 of the recording medium drive actuator 140. A thinner FDD can be realized adapting the ball 158. However, precise position setting of the hub 303 holding the recording medium 301 depends on a diameter of the centering ball, return force of the return spring 159 and magnetic force of the chucking magnet 154. Therefore, it is difficult to achieve the precise position setting.

Further, since the write protect switch recognizes the write prohibition state by detecting the place of the member 310 fixing the conductive metal piece 311 which contacts two conductive metal plates 312a and 312b, the structure is complicated.

SUMMARY OF THE INVENTION

It is an object of the present invention to solve problems for making a storage device, which can exchange the recording medium, smaller and thinner. In addition, it is an object of this invention to obtain a storage device and a recording medium cartridge which can be a substitution of the IC memory card. Furthermore, it is an object of this invention to obtain a storage device and a recording medium cartridge whose assembly is improved.

According to one aspect of this invention, a storage device being connected with an information processing device, comprises:

a frame for holding a recording medium cartridge containing the recording medium;

an insertion/ejection means for inserting/ejecting the recording medium cartridge into/from the frame;

a recording medium drive actuator, provided on the frame and for rotating and driving the recording medium, wherein the recording medium cartridge has a hub for holding the position setting hole and for supporting the recording medium, a restriction member provided at almost center of the recording medium cartridge, and a slide member, provided in the hub, for moving parallel to the frame wherein a moving range of the slide member is restricted by the restriction member;

wherein the recording medium drive actuator has a shaft, provided in the frame, for engaging with the position setting hole of the hub by moving vertically towards the recording medium when the recording medium cartridge is inserted into the frame and wherein the shaft a) is pressed by the slide member moving horizontally to the frame when the recording medium cartridge is inserted into the frame so that an engagement with the position setting hole is enabled; and, b) is pressed by the slide member moving parallel to the frame when the recording medium cartridge is ejected from the frame by the insertion/ejection means, so that the engagement with the position setting hole can be released.

According to another aspect of this invention, in a storage device, being connected with the information processing device, having an insertion/ejection means for inserting/ejecting the recording medium cartridge containing the recording medium, the recording medium cartridge has
a shutter, provided on the recording medium cartridge, for opening/closing a window exposing the recording medium to the recording medium cartridge;
a slider, provided on the side of the recording medium cartridge, for moving in an inserting/ejecting direction of the recording medium cartridge;
a connecting band for connecting the slider and the shutter;
a return spring for pressing the shutter in a closing direction of the window and for returning the shutter to a closed state;

the storage device comprises:
an arm member for engaging with the slider and for closing/opening the shutter at the time of inserting/ejecting the recording medium cartridge;
a slider, connected with the arm member, for moving in the inserting/ejecting direction of the recording medium cartridge;
a pressure spring for pressuring the arm member in the inserting direction of the recording medium cartridge.

According to one aspect of this invention, a storage device, being connected with the information processing device, comprises:

a frame for holding the recording medium cartridge containing the recording medium;
an insertion/ejection means for inserting/ejecting the recording medium cartridge into/from the frame; and
a position setting means for mounting the inserted recording medium cartridge at a fixed place, wherein
the recording medium cartridge has:
a sloped part formed at a corner of a case member in the side of insertion; and
a notch formed at the same side of the case member with the sloped part, wherein
the position setting means has:
a latch lever, held rotatably at one end to the frame, having a stopper at the other end, for engaging with the notch of the recording medium cartridge,
a pressure spring for pressing the latch lever in the direction of the center of the recording medium cartridge.

According to another aspect of this invention, a storage device, being connected with an information processing device, having a frame for holding a recording medium cartridge containing the recording medium, having an insertion/ejection means for inserting/ejecting the recording medium cartridge into/from the frame, and having a recording medium drive actuator, provided on the frame, for rotating and driving the recording medium, the storage device comprises:

a cylindrical shaft, which is placed at a center of rotation of the recording medium; and
a drive pin, which is contacted with an outer circumference of the cylindrical shaft, for rotating the recording medium.

According to another aspect of this invention, a recording medium cartridge used in a storage unit having a frame and a shaft by being inserted/ejected into/from the storage device containing a recording medium, comprises:

a hub for forming a position setting hole and for supporting the recording medium;
a restriction member provided at almost center of the recording medium cartridge;
a slide member provided in the hub,
wherein a moving range of the slide member is restricted by the restriction member,
and,
wherein the slide member
a) moves to an inserting direction when the recording medium cartridge is inserted into the frame and presses down the shaft of the storage device so as to enable an engagement of the shaft and the position setting hole; and,
b) moves to an ejecting direction when the recording medium cartridge is ejected from the frame and presses down the shaft of the storage device so as to release the engagement of the shaft and the position setting hole.

According to another aspect of this invention, a recording medium cartridge, being inserted/ejected into/from the storage device, for containing the recording medium, comprises:

a case member having a window for exposing the recording medium to the recording medium cartridge;
a shutter for opening/closing the window;
a slider, mounted on the side of the case member of the recording medium cartridge for moving in an inserting/ejecting direction of the recording medium cartridge;
a connecting band for connecting the slider and the shutter;
a return spring for pressing the shutter in a closing direction of the window and for returning the shutter to a closed state.

According to another aspect of this invention, a recording medium cartridge containing the recording medium, comprises:

a sloped part formed at a corner of insertion side of the recording medium cartridge; and
a notch on the same side of the recording medium cartridge where the sloped part is formed.

According to another aspect of this invention, in a recording medium cartridge containing the recording medium, wherein a size of the recording medium cartridge is 49.5 mm×47.0 mm×2 mm and the recording medium is about 1.7 inch flexible disk in diameter.

According to another aspect of this invention, a recording medium cartridge, being inserted/ejected into/from the storage device, for containing the recording medium, comprises:

a case member having a window for exposing the recording medium to the recording medium cartridge;
a shutter for opening/closing the window and having a shutter open tongue for opening the shutter;
an open slider mounted on the side of the case member of the recording medium cartridge, for moving in an inserting/ejecting direction of the recording medium cartridge;

a U-shaped holder, mounted on a side of the case member of the recording medium cartridge, for moving in an opening/closing direction of the shutter; and, a connecting band for connecting the open slider and the U-shaped holder;

and wherein the U-shaped holder releases engagement with the shutter open tongue when only the shutter is moved in the opening direction; and wherein the U-shaped holder engages with the shutter open tongue of the shutter in case of movement of the open slider so that the shutter is opened.

According to another aspect of this invention, a recording medium cartridge containing the recording medium, comprises:

a hub for holding the recording medium;

a position setting hole provided in the center of the hub;

a driving hole having a slanted line side continuously formed from the position setting hole and an opposite line side formed almost in parallel with the slanted line side.

According to another aspect of this invention, a recording medium cartridge containing the recording medium, comprises:

a hub for holding a position setting hole and for supporting the recording medium;

a restriction member provided at almost center of the recording medium cartridge;

a slide member provided in the hub, wherein a moving range of the slide member is restricted by the restriction member; and wherein the hub has a hub taper sloped to a center and the slide member has a slide member taper sloped according to the hub taper.

According to another aspect of this invention, a recording medium cartridge, being inserted/ejected into/from a storage device, for containing a recording medium, comprises:

a cartridge groove for preventing the recording medium cartridge from being thrown out in case of ejection of the recording medium cartridge.

Other objects features, and advantages of the invention will be apparent from the following description when taken in conjunction with the accompanying drawings.

BRIEF EXPLANATION OF THE DRAWINGS

In the drawings,

FIG. 8A shows an essential transverse cross sectional view broken at the rotation shaft of Embodiment 2;

FIG. 8B shows a plan view showing engagement of the hub and the shaft of FIG. 8A;

FIG. 11A shows an essential transverse cross sectional view broken at the rotation shaft of Embodiments 3 and 4;

FIG. 11B shows engagement of the hub and the shaft of FIG. 11A;

FIG. 22D shows a state table of Embodiment 8;

FIG. 23 shows an essential broken perspective view of Embodiment 9;

FIG. 35 shows an eject operation of the recording medium cartridge 300 of Embodiment 10;

FIG. 39A shows a view from each direction of the recording medium cartridge 300;

FIG. 39B shows a cross sectional view of a cross section V—V;

FIG. 41A shows a configuration wherein the case member 302a of Embodiment 11 is removed;

FIG. 41B shows a configuration wherein the case member 302a of Embodiment 11 is removed;

FIG. 46A shows a cross section of D of FIG. 40;

FIG. 46B shows a cross section of E of FIG. 40;

FIG. 46C shows a cross section of F of FIG. 41;

FIG. 46D shows a cross section of G of FIG. 41;

FIG. 46E shows a cross section of H of FIG. 47;

FIG. 46F shows a cross section of I of FIG. 48;

FIG. 56A shows a shape of the hub of Embodiment 11;

FIG. 56B shows a shape of the hub of Embodiment 11;

FIG. 56C shows a shape of the hub of Embodiment 11;

FIG. 57A shows a plan view of the shaft 480 and the drive pin 430 of Embodiment 12;

FIG. 57B shows a side view after the shaft 480 and the drive pin 430 are assembled;

FIG. 57C shows a plan view before the shaft 480 and the drive pin 430 are assembled;

FIG. 57D shows a side view before the shaft 480 and the drive pin 430 are assembled;

FIG. 81 shows a state table of Embodiment 13;

DETAILED DESCRIPTION

Figure 1:
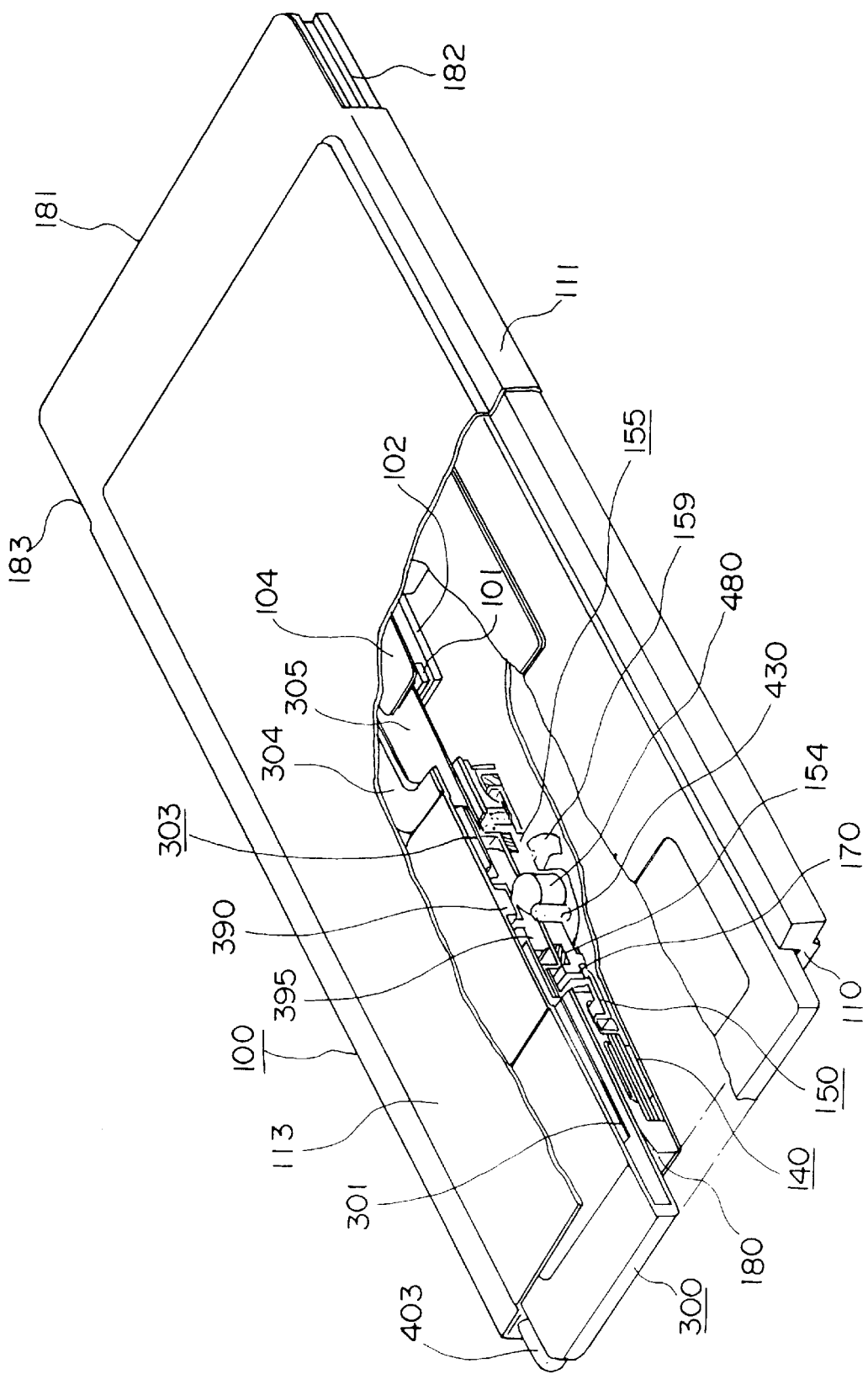
FIG. 1 shows a fragmentary cross perspective view of Embodiment 1.

In the following embodiments, the reference numerals equivalent to those already used in the related arts refer to the same parts or corresponding parts. However, in the following embodiments, though the same reference numerals may be used as in the related arts, different names may be used to describe those parts. In other words, equivalent parts to those of the related arts may be described by different names.

Embodiment 1

Figure 2B:
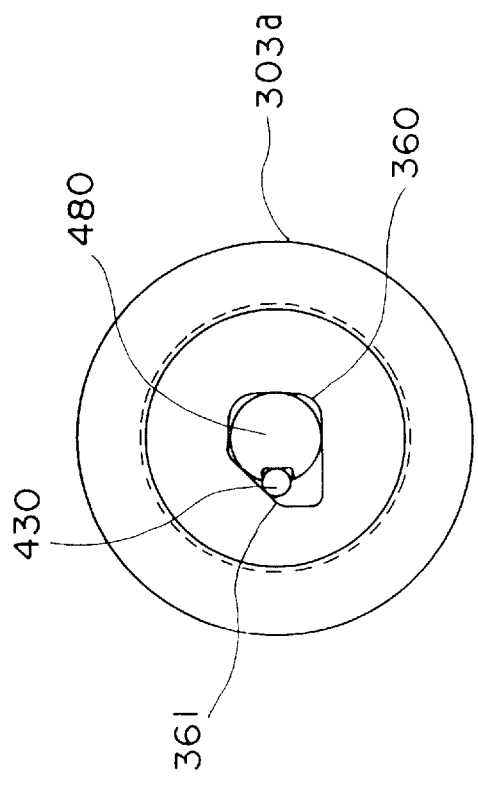
FIG. 2B shows an engagement of a hub and a shaft.
Figure 2A:
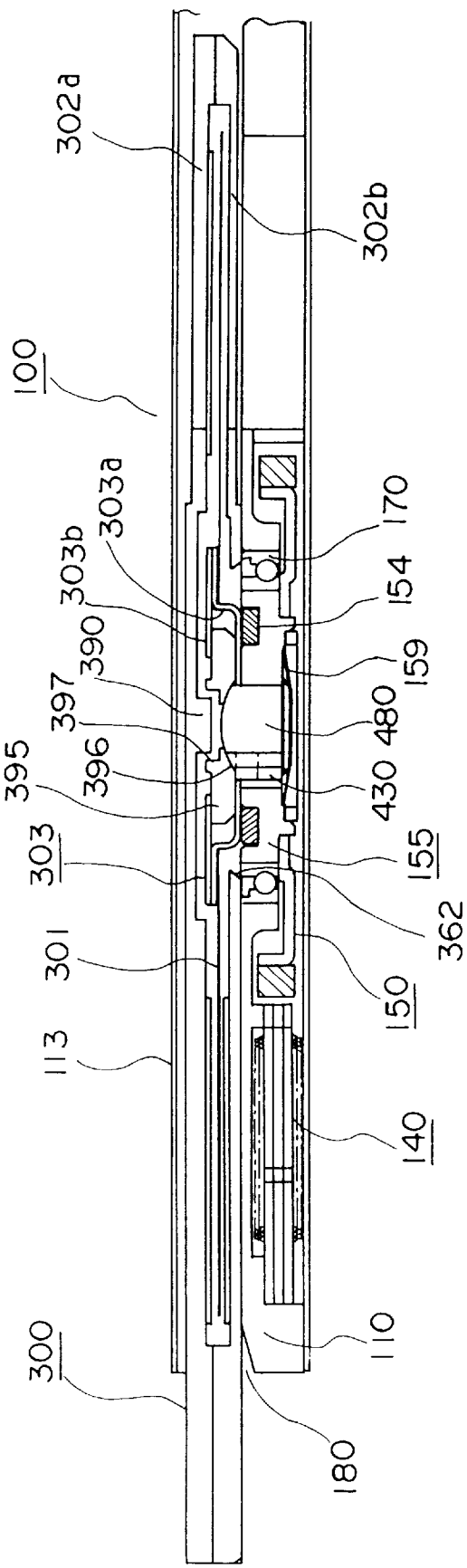
FIG. 2A shows a cross sectional view by broken at a rotation shaft of Embodiment 1.

FIGS. 1, 2A and 2B show configuration of Embodiment 1 of the present invention. FIG. 1 shows a partially broken perspective view of an FDD where insertion and position setting of the recording medium cartridge is performed. FIG. 2A shows an essential transverse cross section which includes a section of a rotating shaft for the recording medium. FIG. 2B shows a plan view of a hub which holds the recording medium, from the opposite side where the recording medium actuator is located and shows a state where a position setting hole of the hub is engaged with the rotating shaft of the recording medium actuator and a drive pin. In the figures, a removable storage device 100, has a frame 110 and a cover (shield) 113. An insertion slot 180 for inserting/ejecting the recording medium cartridge 300 is provided. The removable storage device 100 has an interface connector 181 for connecting the external information processor and reverse insertion protection grooves 182 and 183 for insertion of the body of removable storage device 100. When the recording medium cartridge 300 is ejected, an eject button 403 releases the latch of the recording medium cartridge 300 and the body of removable storage device 100.

The frame 110 of the removable storage device 100 has a recording medium drive actuator 140 and a carriage 102.

The carriage 102 couples two of head arms 104. Each of the head arms 104 has a read/write head 101 almost at the opposite place. The recording medium drive actuator 140 has a rotor 150 and a spindle part 155 coupled with the rotor 150 and held rotatably on the frame 110 by the bearing 170. A shaft 480 to be engaged with the recording medium cartridge 300 is held at the center of the spindle part 155. The shaft is held retractably in the direction of a shaft axis. The drive pin 430 is placed at the side of the shaft 480. A magnet member (chucking magnet) 154 is placed at the outer circumference of the spindle part 155 on the side of the recording medium cartridge. The spindle part 155 has a return spring 159 for pushing back the retractably mounted shaft 480 and drive pin 430.

The recording medium cartridge 300 has a hub 303 for holding the recording medium 301. The recording medium cartridge 300 has a case (cartridge case) 302. The case has a case member (upper shell) 302a on the side of the cover 113 and a case member (lower shell) 302b on the side of the spindle part 155. The hub 303 is exposed from an opening 362 at the center of a case member (lower shell) 302b and mounted to the spindle part 155. The hub 303 has a slide member 395, which is held in a space between a mounting member 303a and a cover member 303b which compress the hub 303. The slide member 395 has a taper shaped hole 396 at the center of the mounting side to the spindle part 155. The slide member 395 has a circular hole 397 at the opposite side. The cylindrical restriction member 390 to be engaged with the circular hole 397 is mounted on the case member (upper shell) 302a of the recording medium cartridge 300. When the recording medium cartridge 300 is mounted, the center axis of the restriction member 390 almost matches with the center axis of the shaft 480. At the center of the mounting member 303a which composes the hub 303, a position setting hole 360 is engaged with the shaft 480 and has two line sides to be contacted with the shaft 480. The two line sides are almost orthogonally placed. The position setting hole 360 also has a driving hole 361 continuously following the position setting hole 360. The driving hole 361 has a line side slanted to the direction of radius and is engaged with the drive pin 430. The slanted direction of the line side of the driving hole 361 is formed for pressing the orthogonalized two line sides of the position setting hole 360 of the hub 303 to the side of the shaft 480, when the spindle part 155 coupled with the rotor 150 of the recording medium drive actuator 140 rotates.

Next, the operation will be described.

Figure 3:
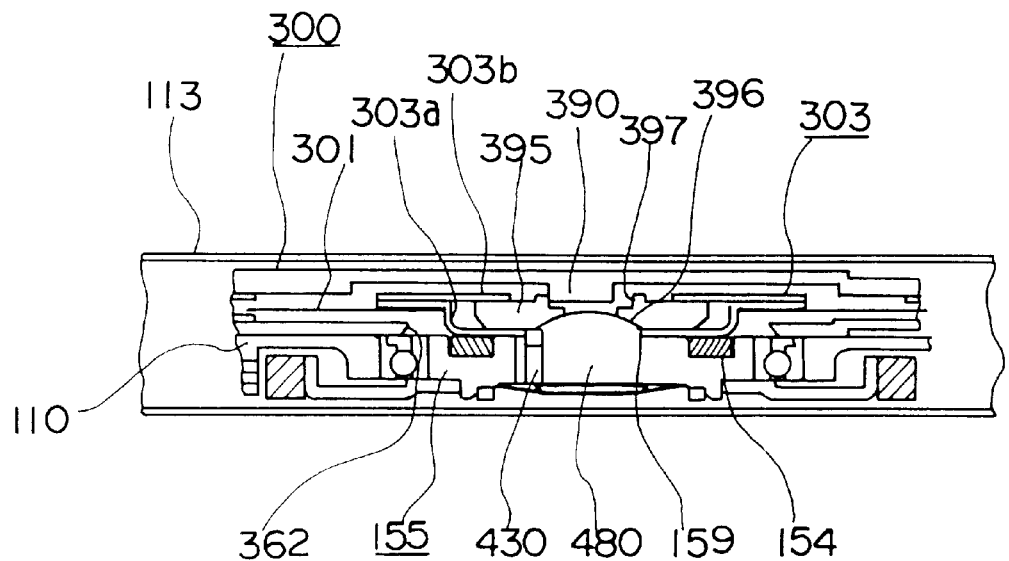
FIG. 3 shows an essential transverse cross sectional view broken at the rotation shaft of Embodiment 1.

FIGS. 3 to 7 show the operation of the present embodiment. FIG. 3 shows a state where the recording medium cartridge 300 moves toward the insertion slot 180 from the states of FIGS. 1 and 2 and the restriction member 390 contacts the circular hole 397 of the slide member 395.

Figure 4:
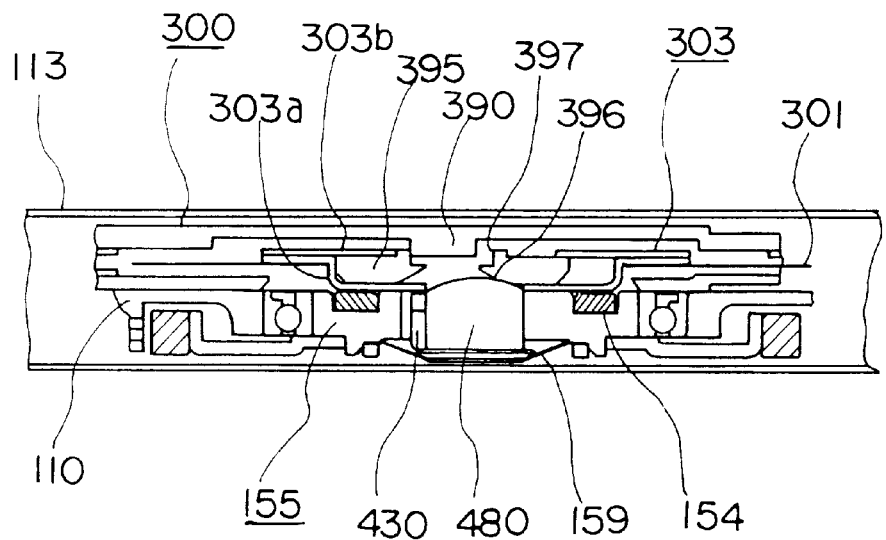
FIG. 4 shows an essential transverse cross sectional view broken at the rotation shaft of Embodiment 1.

FIG. 4 shows a state where the recording medium cartridge 300 further moves toward the insertion slot 180 from the state of FIG. 3 and the slide member 395 slides in the hub 303 and the taper shaped hole 396 of the slide member 395 is lifted up on the top of the shaft 480 and the shaft 480 is retracted into the spindle part 155.

Figure 5:
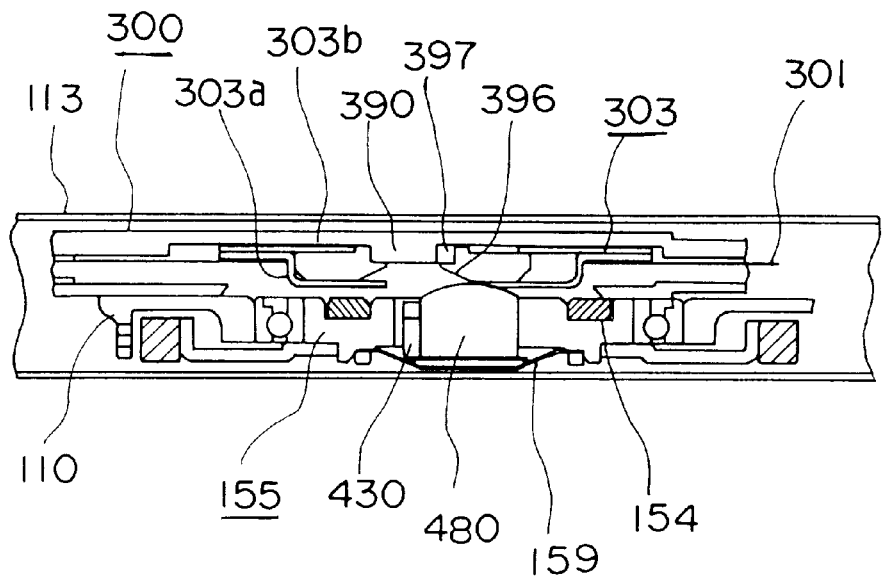
FIG. 5 shows an essential transverse cross sectional view broken at the rotation shaft of Embodiment 1.

FIG. 5 shows a state where the recording medium cartridge 300 is further moved toward the insertion slot 180 and the cylindrical outside part of the shaft 480 is buried into the spindle part 155 completely and the engagement of the hub 303 to the shaft 480 is removed and the hub 303 is lifted up on the shaft 480.

When the eject button 403 is pushed and the recording medium cartridge 300 is ejected, the latch of the removable storage device 100 and the recording medium cartridge 300 is released and a lock state of the recording medium cartridge 300 is released. Then, when the recording medium cartridge 300 is pulled out, the restriction member 390 provided on the recording medium cartridge 300 moves toward the insertion slot 180. The restriction member 390 contacts the circular hole 397 of the slide member 395 in the hub 303 holding the recording medium 301 and forces the slide member 395 to move toward the insertion slot 180. Here, the taper shaped hole 396 formed on the slide member 395 is lifted up on the top of the shaft 480. Accordingly, the shaft 480 is pushed down and retracted into the spindle part 155. When the cylindrical side of the shaft 480 is pushed down into the spindle part 155 from the mounting member 303a of the hub 303, engagement of the shaft 480 with the hub 303 is removed. The chucking force of the magnet member 154 placing and holding the hub 303 is stronger in the direction of the shaft axis, but weaker in the perpendicular direction toward the insertion slot 180 which is the sliding direction of the hub 303. Therefore, the hub 303 holding the recording medium 301 easily slides with the recording medium cartridge 300.

Figure 6:
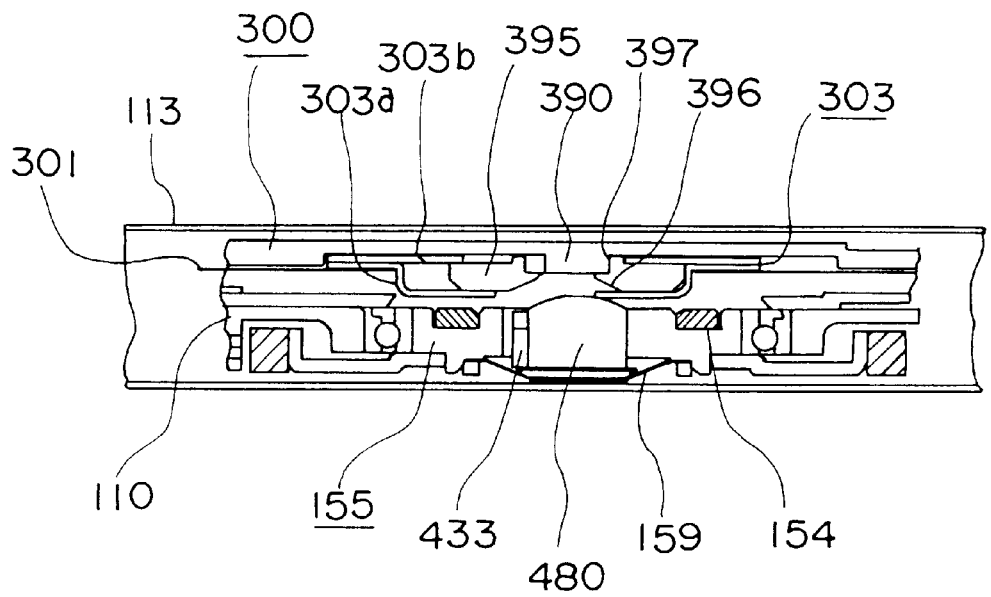
FIG. 6 shows an essential transverse cross sectional view broken at the rotation shaft of Embodiment 1.
Figure 7B:
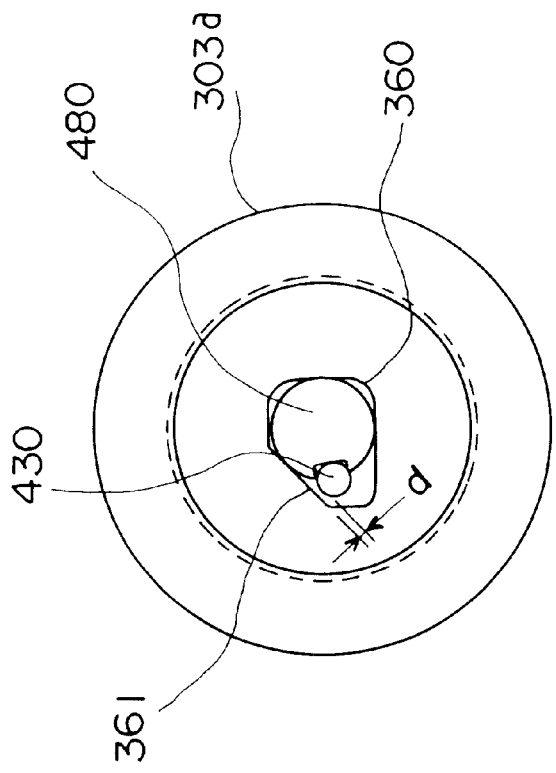
FIG. 7B shows a plan view of an engagement of the hub and the shaft of FIG. 7A.
Figure 7A:
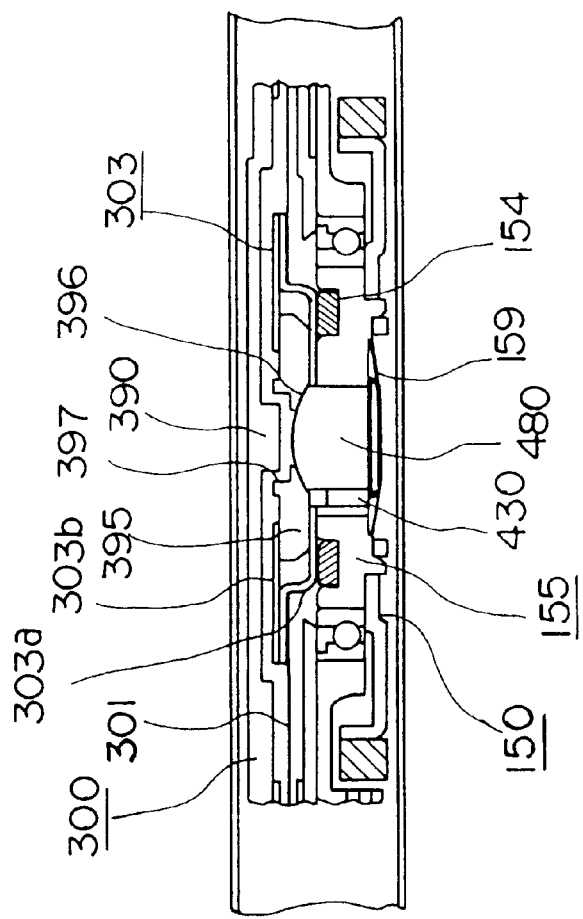
FIG. 7A shows an essential transverse cross sectional view broken at the rotation shaft of Embodiment 1.

When the recording medium cartridge 300 is inserted from the insertion slot 180 of the removable storage device 100, it enters into a state of FIG. 6. That is to say, the slide member 395 held in the hub 303 contacts with the restriction member 390 formed in the recording medium cartridge 300. The hub 303 holding the recording medium 301 is pressed by the slide member 395. The hub 303 passes the shaft 480 mounted on the spindle part 155 by retracting the shaft 480. The position setting hole 360 mounted at the center of the hub 303 is engaged with the shaft 480. As shown in FIGS. 7A and 7B, the shaft 480 and the hub 303 are engaged with a gap d between the drive pin 430 and the slanted line edge of the driving hole 361. Then, by driving the recording medium drive actuator 140, the drive pin 430, which is provided on the spindle part 155, rotates together with the shaft 480 and is engaged with the slanted line side of the driving hole 361. The two othogonalized line sides of the position setting hole 360 of the hub 303 are pressed to the shaft 480 and the hub 303 holding the recording medium 301 set the position precisely.

That is, in the recording medium cartridge 300, the position setting hole 360 is mounted at the center of the hub 303 holding the recording medium 301. The driving hole 361 is provided beside the position setting hole 360 on the hub 303 and includes the slanted line side. The restriction member 390 is formed at the center of the recording medium cartridge 300. The slide member 395 is held in the space in the hub 303 and restricted the slide range by the restriction member 390. As a means for inserting/ejecting and position setting of the recording medium cartridge 300, the shaft 480, the return spring 159, and the drive pin 430 are provided. The shaft 480 is retracted into the recording medium drive actuator 140 in case of inserting/ejecting the recording medium cartridge 300. At the time of mounting the recording medium cartridge 300, the shaft 480 to be engaged with the position setting hole 360 is pushed back from a retracting state by the return spring 159 provided in the recording medium drive actuator 140. The drive pin 430 engaged with the slanted line side of the driving hole 361 transmits the driving force to the hub 303.

Thus, the removable storage device 100, the spindle part 155 of the recording medium drive actuator 140 and the recording medium cartridge 300 have the above configuration and a thinner removable storage device than the conventional one can be realized. As the result, the removable storage device 100 less than 5.0 mm thickness which is mountable on the PCMCIA type 2 standard slot can be obtained. Further, it is possible to perform position setting of the recording medium 301 precisely because the hub 303 holding the recording medium 301 can be mounted precisely.

Embodiment 2

In Embodiment 1, the slide member 395 having a taper shaped hole 396 in the hub 303 holding the recording medium 301 are provided. The taper face of the taper shaped hole 396 retracts the shaft 480. Adopting above structure, the insertion/ejection means of the recording medium cartridge 300 and the position setting means applicable to the thin removable storage device are obtained. In the present embodiment, a ball for retracting the shaft 480, namely a sphere, is provided in the recording medium cartridge 300.

FIG. 8A has an essential transverse cross section where the recording medium cartridge in Embodiment 2 is mounted and the position setting is performed. FIG. 8B is a plan view of the hub which holds the recording medium, from the opposite of the side where the hub is placed.

In the figure, a hub 303c holds the recording medium 301 and a restriction member 390b is engaged with the hub 303c with a gap. When the recording medium cartridge 300 is mounted, a ball or sphere 392 is placed almost at the center axis of the spindle part 155 and rotatably held by the holding member 393 in the recording medium cartridge 300. The spindle part 155 has a retractable shaft 480b held having a taper hole 482 which contacts the ball 392 provided at the top of the center of the shaft 48b which is the side opposite where the return spring 159 is provided. At outer circumference of the top, there is a taper 483. The explanations of the other elements already described in Embodiment 1 are omitted by using the same reference numbers.

Next, the operation will be described.

Figure 9:
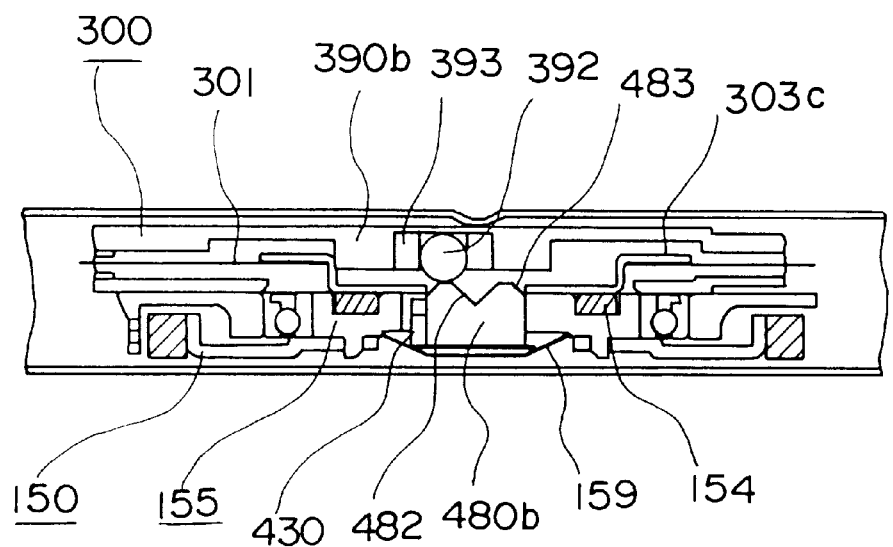
FIG. 9 shows an essential transverse cross sectional view broken at the rotation shaft of Embodiment 2.
Figure 10:
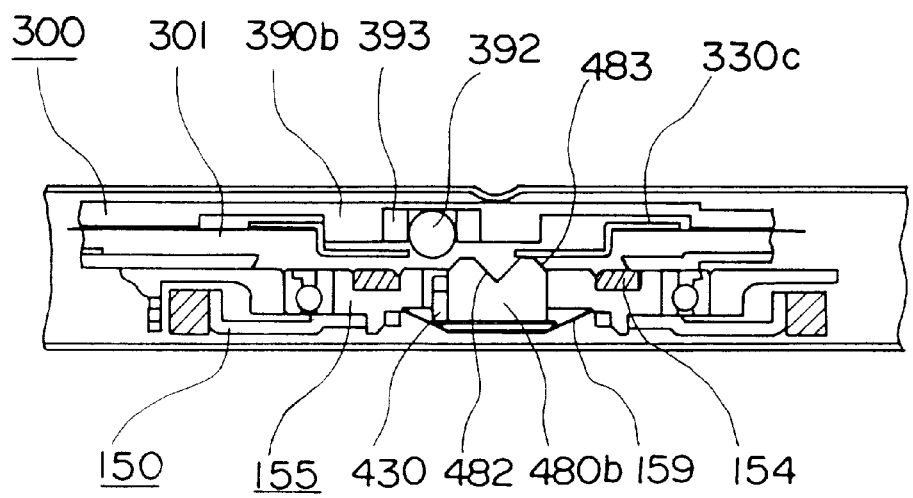
FIG. 10 shows an essential transverse cross sectional view broken at the rotation shaft of Embodiment 2.
Figure 12B:
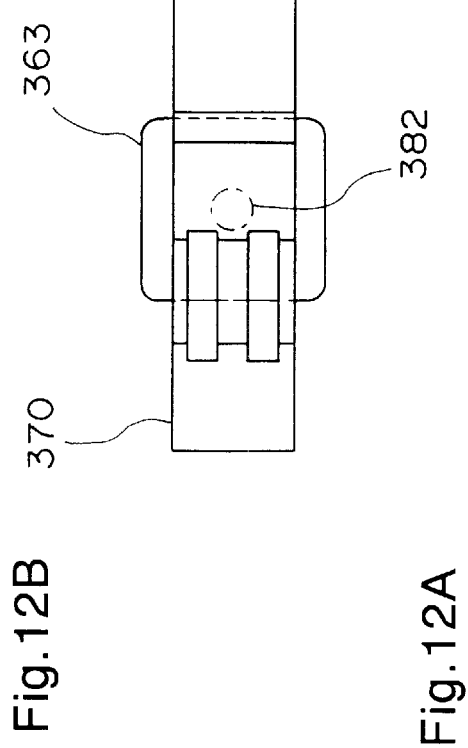
FIG. 12B shows a plan view of engagement of the pressurized spring and the recording medium cartridge.
Figure 12A:
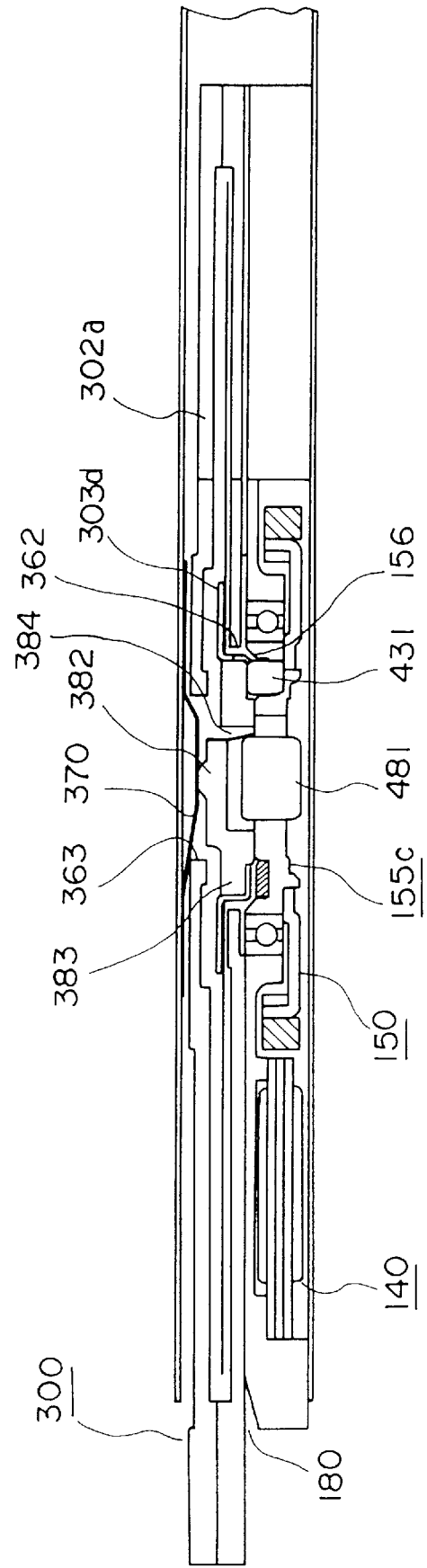
FIG. 12A shows an essential transverse cross sectional view broken at the rotation shaft of Embodiments 3 and 4.

FIGS. 8A and 8B show a state where the recording medium cartridge 300 is mounted in the removable storage device 100. FIGS. 9 and 10 show a process by which the recording medium cartridge 300 is ejected.

To eject the recording medium cartridge 300 from a state of FIGS. 8A and 8B, the eject button 403 of FIG. 1 is pushed to release the lock by the latch and the recording medium cartridge 300 starts to eject. The taper face of the taper hole 482 of the shaft 480b is contacting with the ball 392. When the ball 392 presses the taper face, the shaft 480b is retracted into the spindle part 155. As shown in FIG. 9, when the shaft 480b is pushed into the spindle part 155 further, the position setting hole 360 of the hub 303 is disengaged from the shaft 480b. The hub 303c is thus released from the magnet member 154 which magnetically holds the hub 303c. As shown in FIG. 10, the hub 303c is lifted up along the taper 483 at the outer circumference of the top. Then, the hub 303c holding the recording medium 301 moves with the recording medium cartridge 300 toward the insertion slot.

When the recording medium cartridge 300 is inserted, the hub 303c holding the recording medium 301 is also inserted by the restriction member 390b. The hub 303c and the ball 392 climb over the taper 483 of the outer circumference at the top of the shaft 480b. The shaft 480b is retracted into the spindle part 155. When the ball 392 is placed at almost center axis of the shaft 480b, the shaft 480b is pushed back by the return spring 159 and the ball 392 contacts the taper hole 482 at the top of the center of the shaft 480b. The position setting hole 360 of the hub 303c and the cylindrical part of the shaft 480b are engaged. The position setting is performed by the drive pin 430 and the slanted line side of the driving hole 361 provided on the hub 303c, as described in Embodiment 1, when the recording medium drive actuator 140 is driven.

In short, in the recording medium cartridge 300, the position setting hole 360 is provided at the center of the hub 303c holding the recording medium 301. In addition, the driving hole 361 having a slanted line side is provided besides the position setting hole. The restriction member 390b is provided on the recording medium cartridge 300 and engaged with the hub 303c with a gap. The ball 392 is held rotatably at the center of the recording medium cartridge 300. As a means for inserting/ejecting and position setting of the recording medium cartridge 300, the shaft 480b, the return spring 159, the taper hole 482, and the drive pin 430 are provided. The shaft 480b is retracted into the recording medium drive actuator 140 in case of inserting/ejecting the recording medium cartridge 300. At the time of mounting the recording medium cartridge 300, the shaft 480 to be engaged with the position setting hole 360 is pushed back from a retracting state by a return spring 159 provided in the recording medium drive actuator 140. The taper hole 482 is formed at the top of the shaft 480b whereat the recording medium cartridge 300 engages. In case of position setting of the recording medium 301, the taper hole 482 engages with the ball (sphere) 392 held at the recording medium cartridge 300. The drive pin 430 is engaged with the slanted line side of the driving hole 361 and transmits driving force to the hub 303c.

According to the present embodiment, a thinner removable storage device than a conventional one can be provided. Accordingly, the removable storage device 100 of less than 5.0 mm thickness, which can be mounted on the PCMCIA type 2 standard slot, can be obtained. Further, it is possible to mount the hub 303c holding the recording medium 301 precisely, and to simplify the structure of the hub 303c. It is also possible to know the completion of the insertion of the recording medium cartridge 300 by sensing a click of the ball when the ball 392 enters to the taper hole 482 of the shaft 480b. Therefore, it is possible to prevent over-insertion.

Embodiment 3

In Embodiments 1 and 2, the shaft is retracted. In the present embodiment, as shown in FIGS. 11A, 11B, 12A, and 12B, a shaft 481 is fixed on a spindle part 155c. A drive pin 431 is fixed on the spindle part 155c. The drive pin 431 is placed on the outskirts of the shaft 481. A hub 303d is held in the recording medium cartridge 300 and holds the recording medium 301. A position setting member 383 is provided in the hub 303d. The position setting member 383 has an almost V-shaped position setting hole 381 having two faces contacting with the shaft 481 at the center. A contacting part 382 is fixed with the position setting member 383 and has a convexity at the center so as to cover the position setting hole 381. The convexity contacts a pre-load spring 370 fixed to the cover 113 of the removable storage device 100. An opening 363 is provided in the case member 302a of the recording medium cartridge 300 so that the pre-load spring 370 can contact the contacting part 382. A pressure spring 384 is provided on the opposite side of the V-shaped part of the position setting hole 381. The driving hole 385 is provided on the hub 303d placed on the outskirts of the position setting hole 381. The explanations of the other elements already described in the previous embodiments are omitted by using the same reference numbers.

Next, the operation of the present embodiment will be described.

Figure 13A:
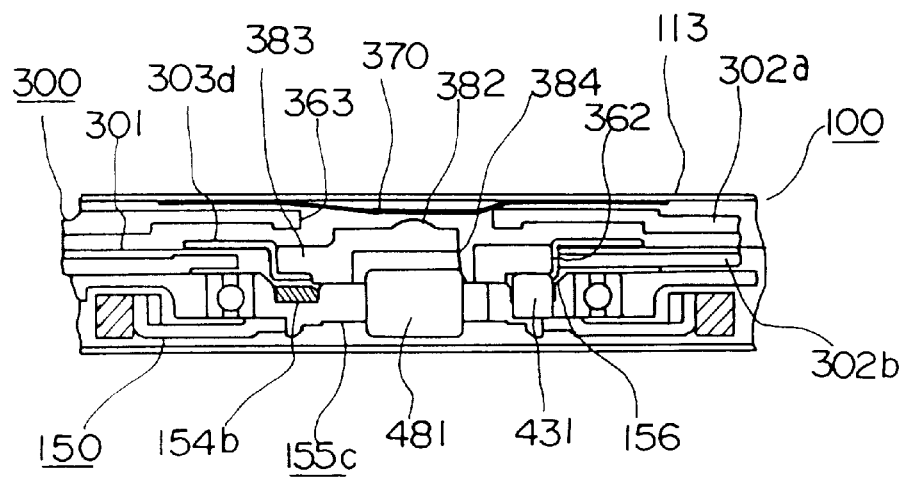
FIG. 13A shows an essential transverse cross sectional view broken at the rotation shaft of Embodiments 3 and 4.
Figure 13B:
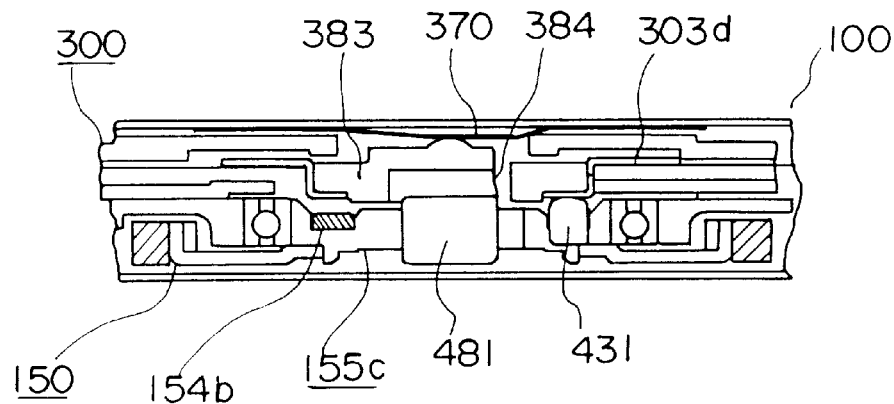
FIG. 13B shows an essential transverse cross sectional view broken at the rotation shaft of Embodiments 3 and 4.
Figure 13C:
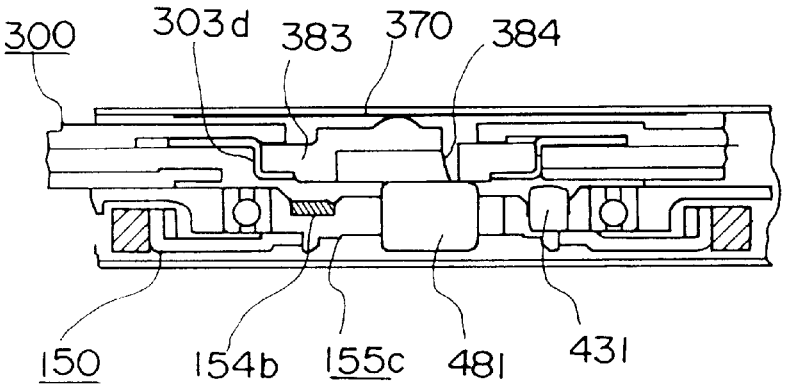
FIG. 13C shows an essential transverse cross sectional view broken at the rotation shaft of Embodiments 3 and 4.

FIGS. 11A and 11B show a state where the recording medium cartridge 300 is mounted on the spindle part 155c of the removable storage device 100 and the position setting is performed. The drive pin 431 transmits a driving force to the hub 303d by engaging with the driving hole 385 of the hub 303d. The drive pin 431 does not have a function of the position setting. In case that the recording medium cartridge 300 is ejected from the state, the latch of the removable storage device 100 and the recording medium cartridge 300 is released by pressing the eject button 403 as shown in FIG. 1. Then, recording medium cartridge 300 is ejected. FIGS. 13A–13C show the ejection operation. The opening 363 provided in the case member 302a of the recording medium cartridge moves along according to the movement of the recording medium cartridge 300. The edge of opening 363 lifts up the pre-load spring 370 toward the cover 113 of the removable storage device 100. The pre-load spring 370 leaves from the contacting part 382 of the position setting member 383. The pressure spring 384 presses the shaft 481 to the almost V-shaped part of the position setting hole. When the pressure to the contacting part 382 is released, the pressure spring 384 pushes the shaft 481 so as to release the engagement of the shaft 481 and the position setting hole. When the recording medium cartridge 300 is moved further, the edge of the opening 362 provided on the case member 302b of the recording medium cartridge 300 contacts the hub 303d. The hub 303d holding the recording medium 301 is moved from a state of chucking by the magnet member 154b and ejected with the recording medium cartridge 300.

In short, the position setting hole 381 is provided at the center of the hub 303d holding the recording medium 301 and has almost V-shaped parts whose two faces contact the cylindrical shaft 481. A pressure spring 384 is provided at the position opposite to the almost V-shaped part of the position setting hole 381. The contacting part 382 attached to the hub 303d is provided on the center of the shaft 481. The driving hole 385 is provided on the hub 303d and placed on the outskirts of the position setting hole 381. The opening 363 is provided on the case member of the recording medium cartridge 300 corresponding to the contacting part 382. As the means for inserting/ejecting and position setting, the shaft 481, the drive pin 431 and pre-load spring 370 are provided. The recording medium cartridge 300 has the shaft 481 engaged with the position setting hole 381. The drive pin 431 is engaged with the driving hole 385 and placed on the outskirts of the shaft 481. The pre-load spring 370 is provided on the frame of the removable storage device 100, for pressing the contacting part 382 through the opening 363 of the recording medium cartridge 300, and the pre-load spring 370 retracts from the opening 363 of the recording medium cartridge in case of inserting/ejecting the recording medium cartridge 300. The recording medium cartridge 300 can be mounted on the shaft 481 with a slight movement of the hub 303d. The shaft 481 is fixed on the spindle part 155c.

According to the present embodiment, when the recording medium cartridge 300 is inserted and mounted, the pre-load spring 370 is placed in the opening 363 of the case member 302a of the recording medium cartridge 300 and contacts with the contacting part 382 of the hub 303d. At this time, a click can be sensed and it tells that the mounting of the recording medium cartridge 300 is completed. Since the shaft 481 is fixed on the spindle part 155c without retracting operation, the axis of the shaft does not deflect and position setting of the hub 303d holding the recording medium cartridge is precise. Since the position setting member 383 is fixed on the hub 303d, it is possible to form the position setting member 383 with the hub together by using a plastic.

Embodiment 4

Figure 14:
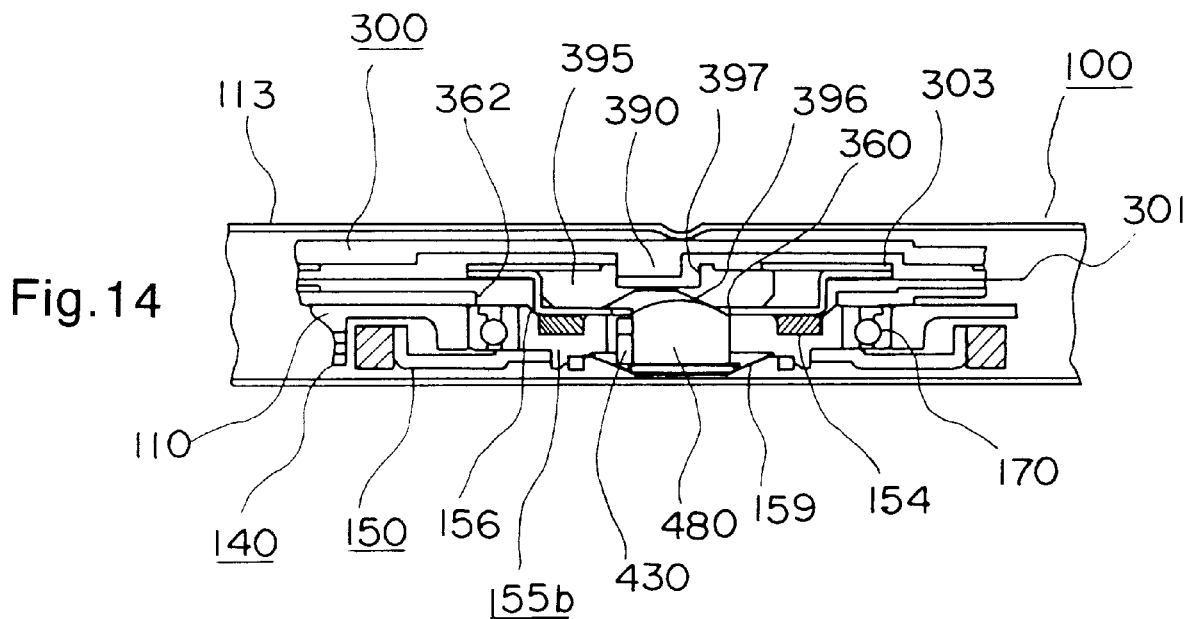
FIG. 14 shows an essential transverse cross sectional view broken at the rotation shaft of Embodiment 4.
Figure 15:
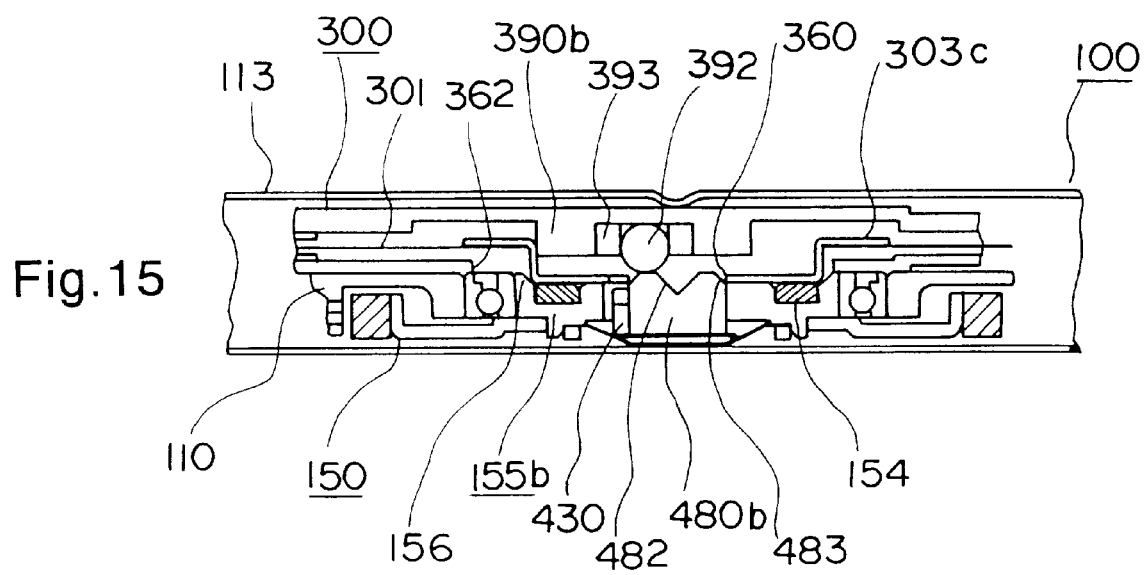
FIG. 15 shows an essential transverse cross sectional view broken at the rotation shaft of Embodiment 4.

FIGS. 14 and 15 show another embodiment. A taper 156 is formed at the outer circumference of the spindle part 155b of Embodiments 1 or 2, where the hub 303 or 303c of the recording medium cartridge 300 is mounted. The spindle part 155b is held rotatably by the bearing 170 on the frame 110 of the removable storage device 100. The mounting side of the spindle part 155b for the recording medium cartridge 300 is a bottom of the concavity formed by the taper 156. At the bottom, the hub 303 or 303c is mounted. At the bottom, the magnet member 154 made of magnetic material is fixed for chucking the hub 303 or 303c. The center of the taper 156 of the spindle part 155b has the shaft 480 and the drive pin 430 to engage with both the position setting hole 360 and the driving hole 361 of the hub 303 or 303c respectively. The shaft 480 and the drive pin 430 are held by the return spring 159 and able to retract toward the opposite of the mounting side of the hub 303 or 303c.

FIGS. 14 and 15 show a state where the recording medium cartridge 300 is ejected from the removable storage device 100. In FIG. 14, the restriction member 390 mounted on the case member of the recording medium cartridge 300 is engaged with the slide member 395 provided in the hub 303. The shaft 480 is retracted by the taper shaped hole 396 of the slide member 395 into the spindle part 155b. When the position setting hole 360 of the hub 303 is removed from the shaft 480, the taper 156 of the outer circumference of the spindle part 155b is engaged with the hub 303. Then, the hub 303 is lifted up along a sloped face of the taper 156. In FIG. 15, the ball 392 held at the center of the restriction member 390b provided in the case member of the recording medium cartridge 300 retracts the shaft 480b. When the shaft 480b is removed from the position setting hole of the hub 303c, the restriction member 390b is engaged with the hub 303c. The hub 303c is lifted up along the taper 156 provided on the outer circumference of the spindle part and the position setting hole 360 of the hub 303 is lifted up along the taper 483 on the outer circumference over the top of the shaft 480b. Then, the hub 303c is removed from the magnet member 154 for chucking and is ejected.

When the recording medium cartridge 300 is inserted, as shown in FIG. 14, the restriction member 390 pushes the slide member 395 in the hub 303 and the hub 303 holding the recording medium 301 reaches the almost center of the spindle part 155b, the hub 303 is chucked by the magnet member 154 and placed at the bottom of the taper 156 of the spindle part 155b. At this time, the taper 156 performs position setting to the center of rotation of the spindle part 155b. The position setting hole 360 of the hub 303 is engaged with the shaft 480 of the spindle part. In FIG. 15, the restriction member 390b pushes the hub 303c. The hub 303 holding the recording medium 301 reaches the almost center of the spindle part 155b. The hub 303c is chucked by the magnet member 154 and placed at the bottom of the taper 156 of the spindle part 155b. Here, the taper 156 performs position setting to the center of rotation of the spindle part 155b of the hub 303c. The position setting hole 360 of the hub 303c is engaged with the shaft 480 of the spindle part 155b.

In short, as the means for inserting/ejecting and position setting of the recording medium cartridge 300, the taper 156 is provided on the outer circumference of the spindle part 155b of the recording medium drive actuator 140 to engage with the hub 303 of the recording medium cartridge.

According to the present embodiment, the hub 303 and 303c holding the recording medium 301 can be easily chucked on the spindle part 155b. Further, the hub 303 or 303c is pulled out along the sloped face of the taper 156. It is possible to pull the hub 303 or 303c out easily by making the taper 156 smooth. By providing the magnet member 154 on the bottom of the taper 156 of the spindle part 155b, in case of inserting/ejecting the recording medium 301, the recording medium 301 moves away from the magnet member and data written in the recording medium 301 is not erased by the magnetic field provided by the magnet member. When the strength of the magnetic field of the magnet member is less than the strength allowed by the recording medium 301, a magnet member which provides stronger magnetic field can be used. Then, it is possible to chuck the hub 303 or hub 303c strongly. Since the cylindrical part of the shafts 480 and 480b can be longer for the position setting of the hub 303 or 303c, it is possible to perform the position setting of the recording medium surely even in the thin removable storage device.

As shown in FIGS. 11A to 13C, in Embodiment 3, which uses a fixed shaft 481, a taper 156 can be formed at an outer circumference on the mounting side of the hub 303d of the spindle part 155c.

By providing the magnet member 154b on the bottom of the taper 156 in the spindle part 155c, in case of inserting/ejecting the recording medium 301, the recording medium 301 moves away from the magnet member. Therefore, data written in the recording medium 301 is not erased by the magnetic field provided by the magnet member. In another case, when the strength of the magnetic field of the magnet member is less than the strength allowed by the recording medium 301, a magnet member which provides stronger magnetic field can be used. It is possible to chuck the hub 303d strongly. Since the cylindrical part of the shaft 481 can be longer for position setting of the hub 303d, it is possible to perform the position setting of the recording medium surely even in the thin removable storage device.

Embodiment 5

Figure 16B:
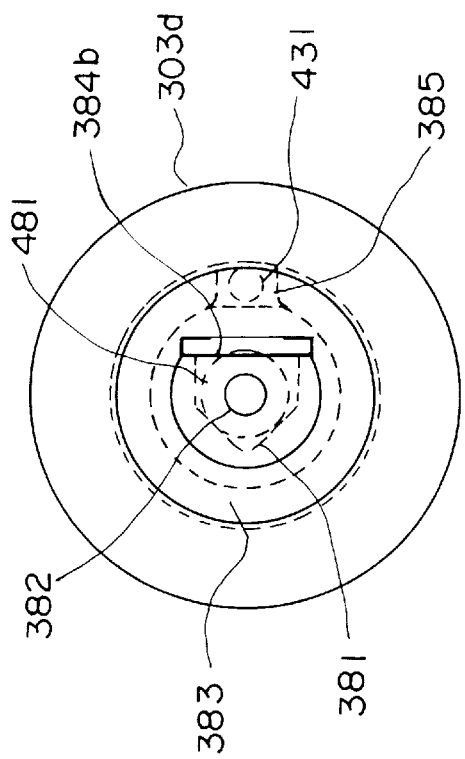
FIG. 16B shows a plan view of engagement of the hub and the shaft of FIG. 16A.
Figure 16A:
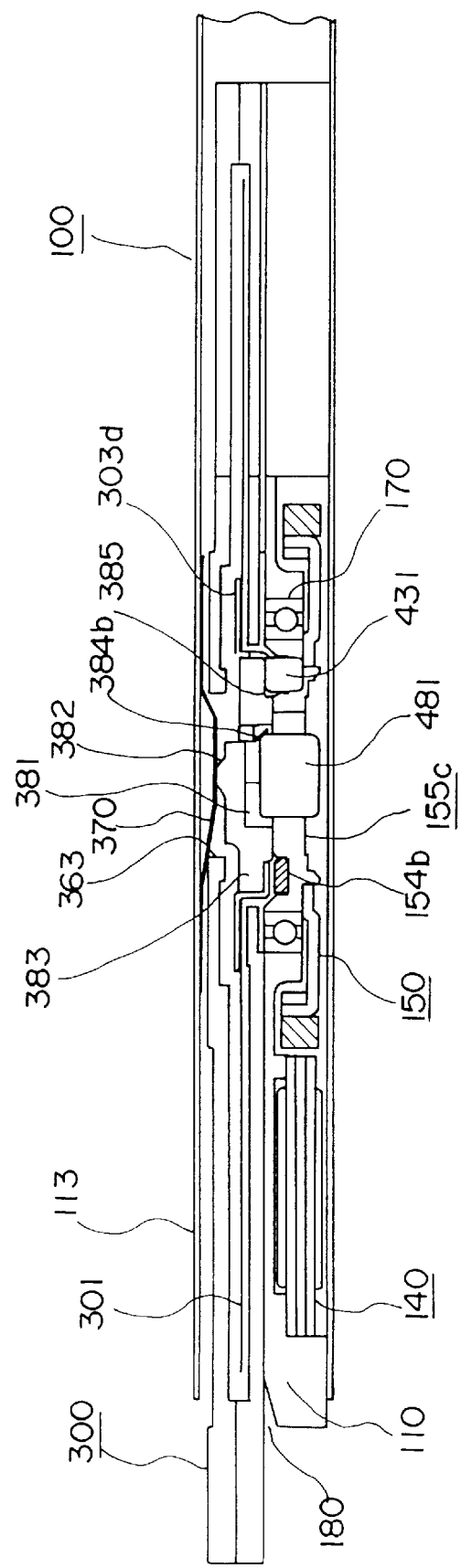
FIG. 16A shows an essential transverse cross sectional view broken at the rotation shaft of Embodiment 5.

In Embodiment 3, the position setting member 383 and the pressure spring 384 were used for chucking the hub. The position setting member 383 was provided in the hub 303d and had the almost V-shaped position setting hole 381 whose two faces contacts the shaft 481 at the center. The pressure spring 384 was provided to sandwich the shaft 481 with the almost V-shaped part of the position setting hole 381. The pressure spring 384 was mounted so as to press the side of the shaft 481 vertically. In the present embodiment, as shown in FIGS. 16A and 16B, the pressure spring 384 diagonally presses the edge of the top of the shaft 481 being fixed on the spindle part 155c.

In the figure, a pressure spring 384b presses the shaft 481. The explanations of the other elements already described in the previous embodiments are omitted by using the same reference numbers.

The operation is similar to that of Embodiment 3. However, since a force for lifting up the hub 303d over the shaft 481 by the pressure spring 384b is much larger, when the recording medium cartridge 300 is ejected and the pre-load of the contacting part 382 is released, the force for pushing out the shaft 481 from the almost V-shaped position setting hole of the position setting hole 381 is enlarged and it is possible to pull out the recording medium cartridge easily. The pressure spring 384b reaches up to the edge of the top of the shaft 481 and the contacting part is curved. In Embodiment 3, the pressure spring reaches up to the cylindrical part of the shaft 481. In this Embodiment 5, the pressure spring gets shortened. Accordingly, it is possible to make the thickness of the recording medium cartridge 300 smaller.

In short, the pressure spring 384b mounted on the hub 303d of the recording medium cartridge 300 is sloped at the edge of the top of the shaft 481 of the recording medium drive actuator 140.

Embodiment 6

Figure 17:
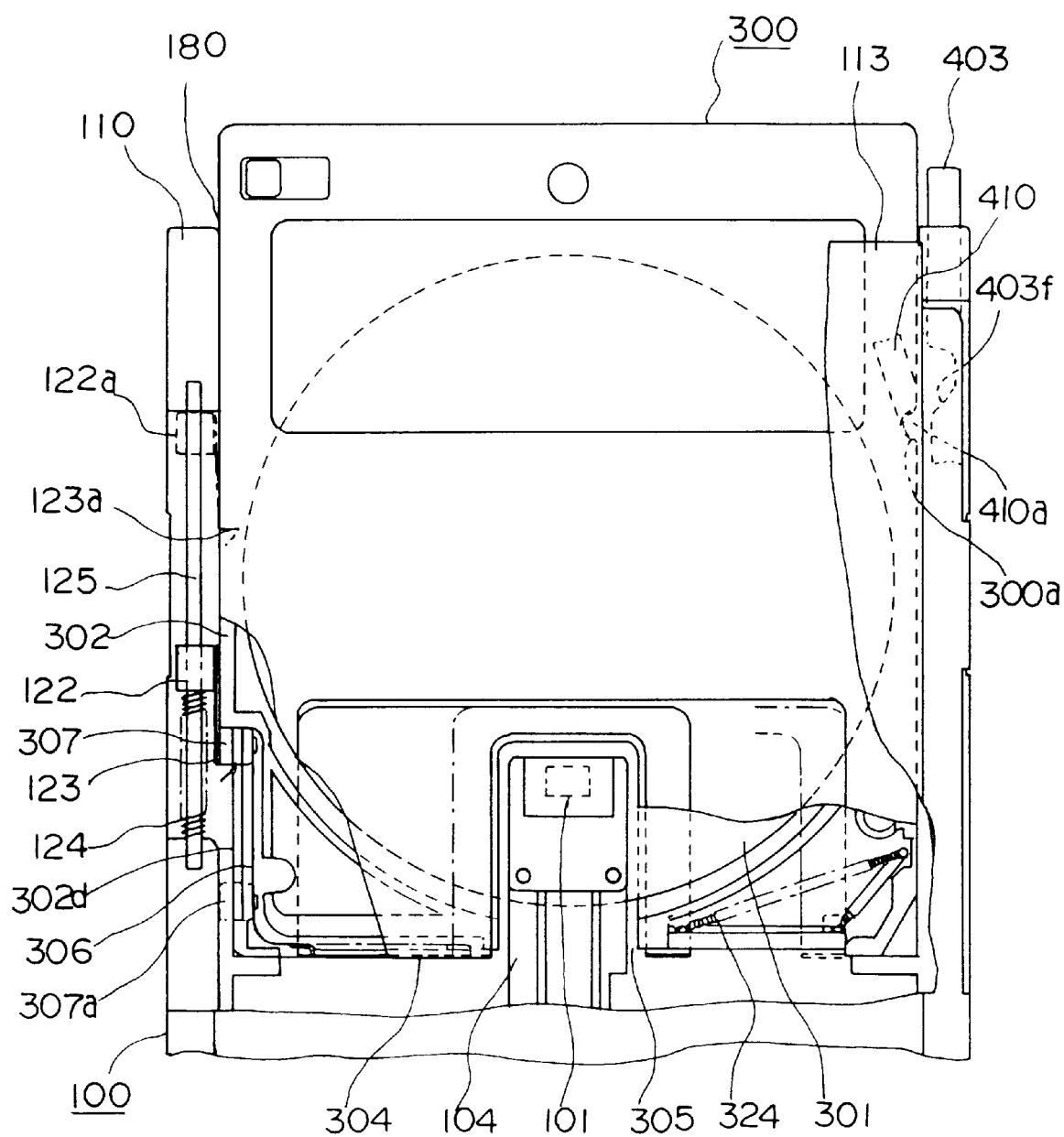
FIG. 17 shows an essential broken plan view of Embodiment 6.

FIG. 17 shows another embodiment of the present invention. FIG. 17 shows a partially cross sectioned plan view of the cover 113 and the recording medium cartridge 300 where the recording medium cartridge 300 is mounted on the removable storage device 100.

In the figure, a slider 122 can move freely along a guide member 125 fixed on the frame 110 of the removable storage device 100. An arm member 123 is engaged with the slider 307 of the recording medium cartridge 300 at one end and connected with the slider 122 at the other end. A return spring 124 returns the slider 122 toward the insertion slot 180 when the recording medium cartridge 300 is ejected. A return spring 324 returns the shutter 304 to a closed state when the recording medium cartridge 300 is ejected. The explanations of the other elements already described in the previous embodiments are omitted by using the same reference numbers.

Next, the operation of the present embodiment will be described.

Before inserting the recording medium cartridge 300, the slider 122 and the arm member 123 are pressed toward the insertion slot 180 by the return spring 124 and located at places shown by 122a and 123a. When the recording medium cartridge 300 is inserted from the insertion slot 180, a slider 307 positioned at a place shown by 307a is engaged with the arm member 123 positioned at the place 123a. With little shortening of the return spring 124, the slider 307 is moved along a guide rail 302d provided on the case member 302 of the recording medium cartridge 300. Then, the connecting band 306 for connecting the slider 307 and the shutter 304 pulls the shutter 304 and before the recording medium cartridge 300 reaches the read/write head 101, the window 305 is opened and exposes the recording medium 301. In the removable storage device 100, the returning force of the return spring 324, which is provided in the recording medium cartridge 300, to close the shutter 304 is smaller than the pushing force of the return spring 124 to press the arm member 123. Therefore, while the shutter 304 of the recording medium cartridge 300 is being opened, the slider 122 does not move from the place 122a. When the recording medium cartridge 300 is being inserted further, the stopper 410a of the latch lever engages with the notch 300a of the recording medium cartridge. Then, the eject button 403 is pushed out, a lock state is made ready and the mounting of the recording medium cartridge 300 is completed.

In short, The shutter 304, the slider 307, connecting band 306, arm member 123, the slider 122 and the return spring 324, are provided in the recording medium cartridge 300. The shutter 304 opens/closes the window 305 which exposes the recording medium 301 to the recording medium cartridge. The slider 307 moves in the inserting/ejecting direction of the recording medium cartridge. The connecting band 306 (means for connecting) connects the slider 307 and the shutter 304. The return spring 324 always tries to return the shutter to close the window. In the removable storage device 100, the slider 122, the arm member 123 and the return spring 124 are provided. The arm member 123 engages with the slider 307 and opens/closes the shutter 304 at the time of inserting/ejecting the recording medium cartridge 300. The slider 122 provided with this arm member can move in the inserting/ejecting direction of the recording medium cartridge 300. The return spring 124 presses the arm member 123 in the direction of insertion slot 180 of the recording medium cartridge 300.

According to the present embodiment, since the return spring 324 of the shutter 304 is provided, when the recording medium cartridge 300 is outside of the removable storage device 100, it is possible to prevent accidental damage to the recording medium 301 caused by not closing the shutter 304. Since the arm member 123 engaged with the slider 307 for opening the shutter 304 is equipped with the slider 122 and pressed by the return spring 124, the precision of setting position of the arm member 123 is eased and the flexible setting position can be allowed. When the recording medium cartridge 300 is ejected, that is, the eject button 403 is pressed and the latch lever 410 is released, it is possible to help the eject operation of the recording medium cartridge 300 by the return spring 124.

Embodiment 7

Figure 18:
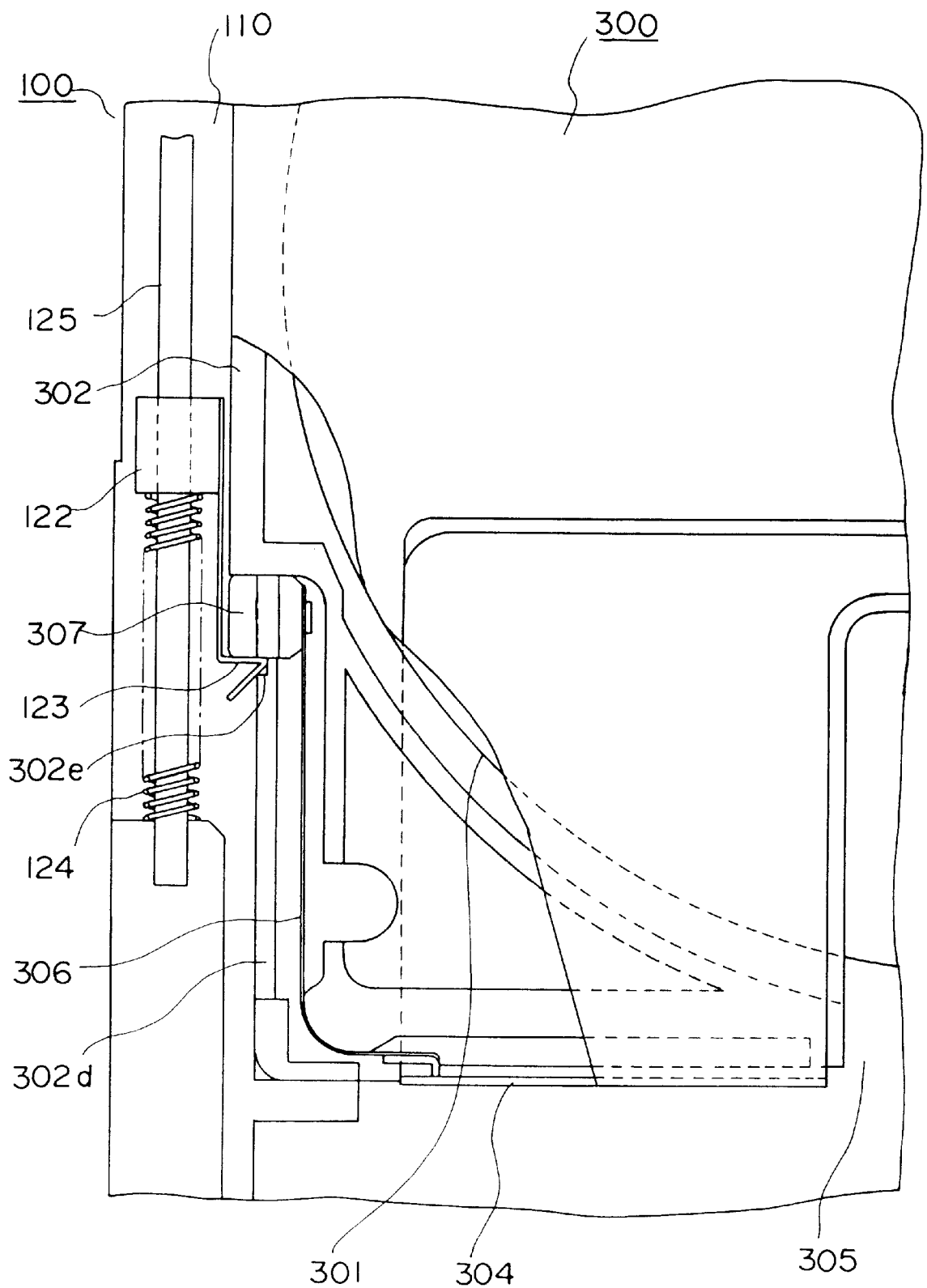
FIG. 18 shows an essential broken plan view of Embodiment 7.

FIG. 18 shows an essential cross sectional plan view of another embodiment. In Embodiment 6, the arm member 123 simply contacted with the slider 307 of the recording medium cartridge 300. In the present embodiment, a concavity 302e is provided at the end of the guide rail 302d provided on the case member 302 of the recording medium cartridge 300 for guiding the slider 307. When the slider 307 is at the position where the shutter 304 is opened, the arm member 123 is pushed down to the concavity 302e. When insertion of the recording medium cartridge 300 is finished, the arm member 123 is sandwiched by the edge of the concavity 302e and the slider 307.

In short, the concavity 302e engages with the arm member 123 at the end of the guide rail 302d for the slider on the side of the recording medium cartridge 300 when the insertion of the recording medium cartridge 300 is completed.

In the present embodiment, the concavity 302e is provided on the recording medium cartridge 300 and engages with the arm member 123. Therefore, when the shutter 304 is opened, the arm member 123 is held steadily. As the result, it is possible to obtain a stable opening/closing mechanism applicable in the thin removable storage device 100 and the thin recording medium cartridge 300.

Embodiment 8

Figure 19:
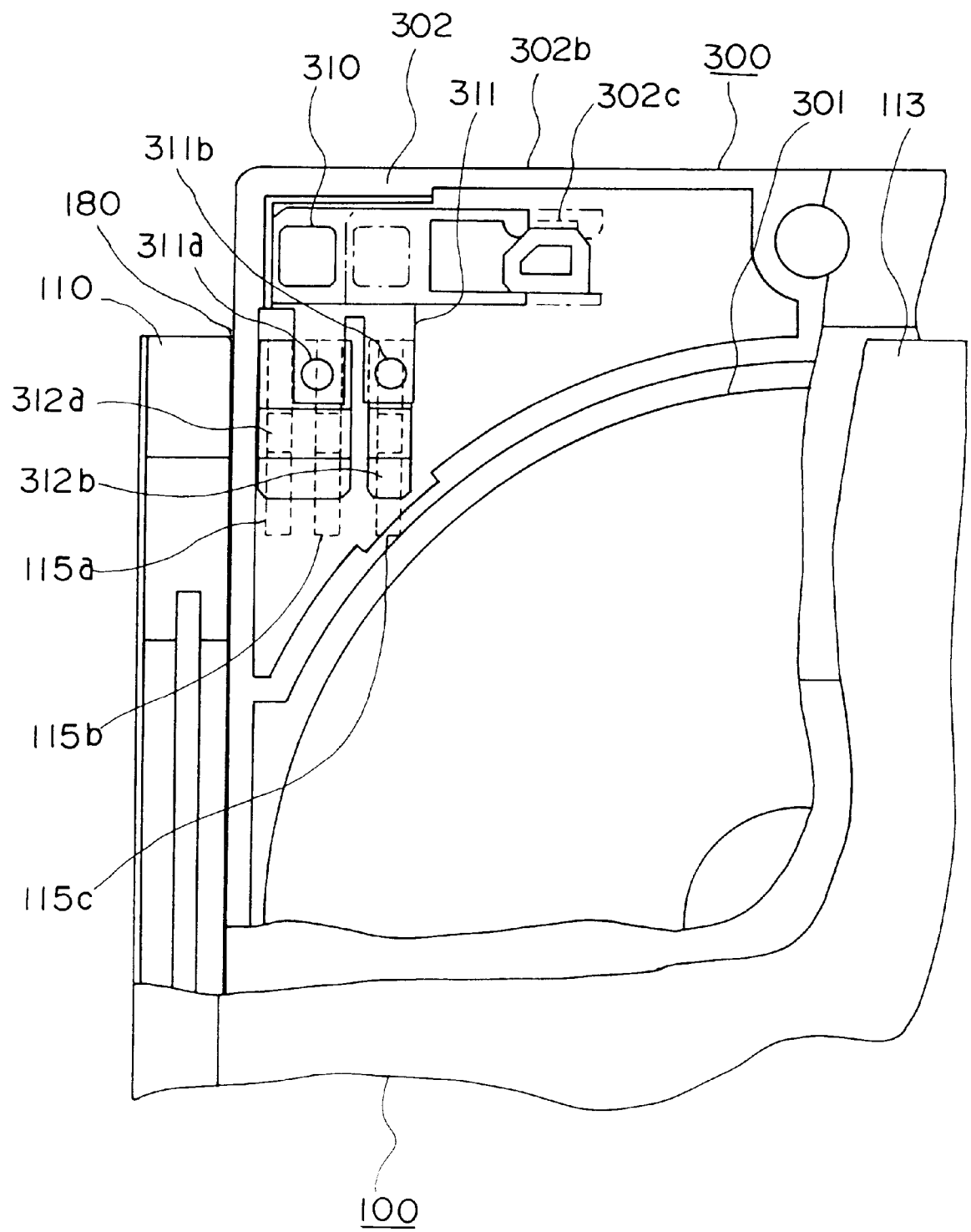
FIG. 19 shows an essential broken plan view of Embodiment 8.
Figure 20:
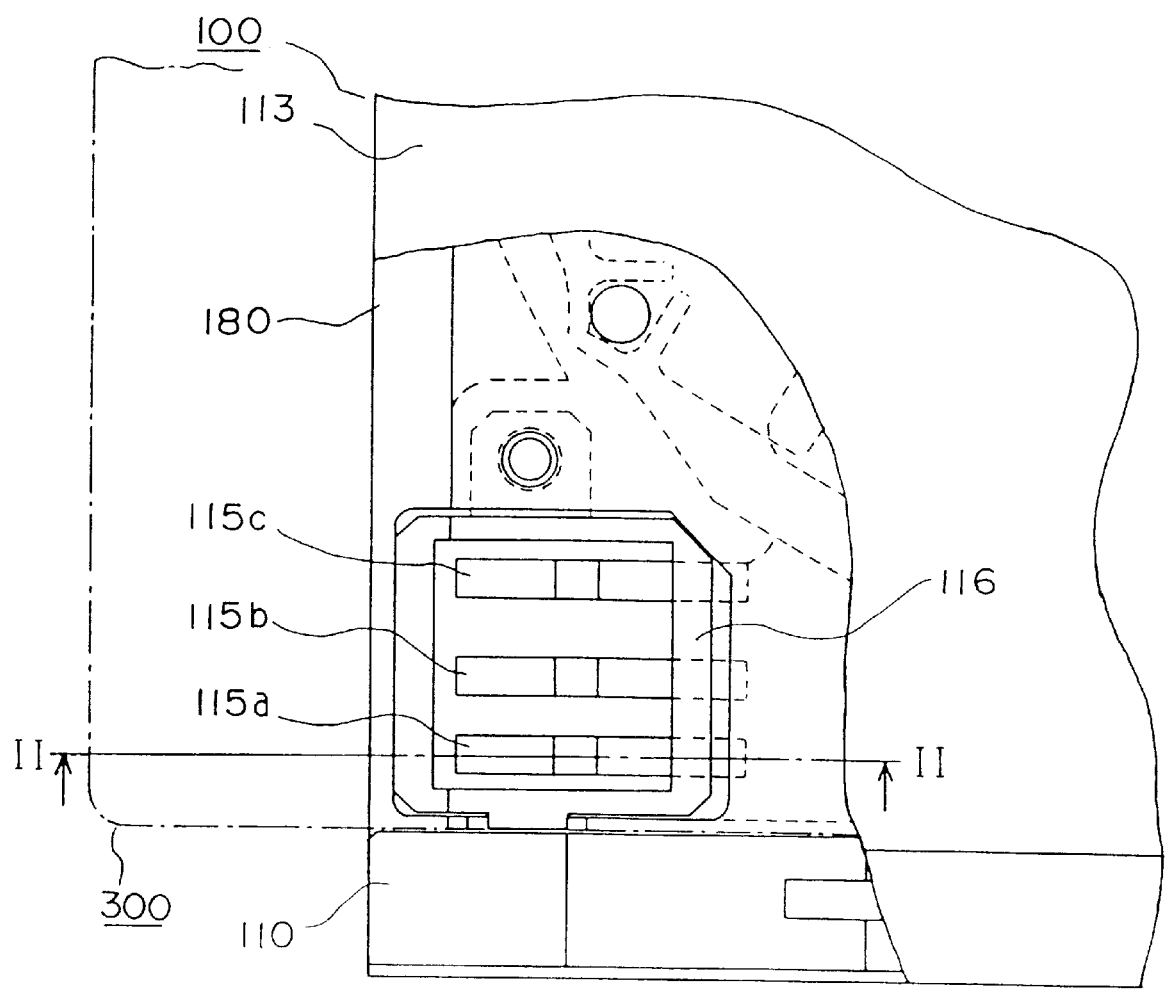
FIG. 20 shows an essential broken plan view of Embodiment 8.

FIGS. 19 to 22D show another embodiment of the present invention. FIG. 19 shows an essential broken plan view where the recording medium cartridge 300 is mounted on the removable storage device 100. FIG. 20 shows an essential broken plan view which shows the same state. In FIG. 20, the removable storage device 100 can be seen by showing the recording medium cartridge 300 in an imaginary line.

Figure 21:
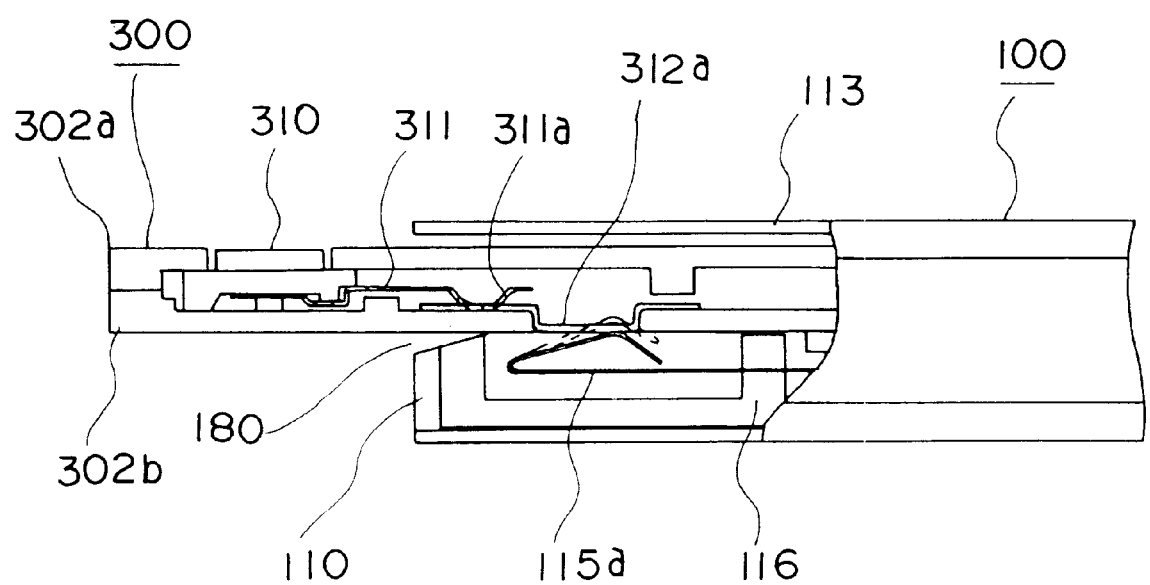
FIG. 21 shows a transverse cross sectional view taken on line II—II of FIG. 20 seen from an arrow direction.

FIG. 21 shows an essential transverse cross sectional view taken on line B—B of FIG. 20 seen from the direction of the arrows.

Figure 22A:
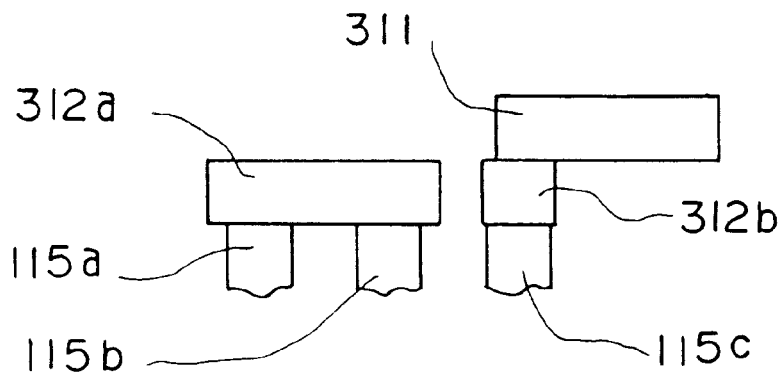
FIG. 22A shows an explanatory view of the operation of Embodiment 8.
Figure 22B:
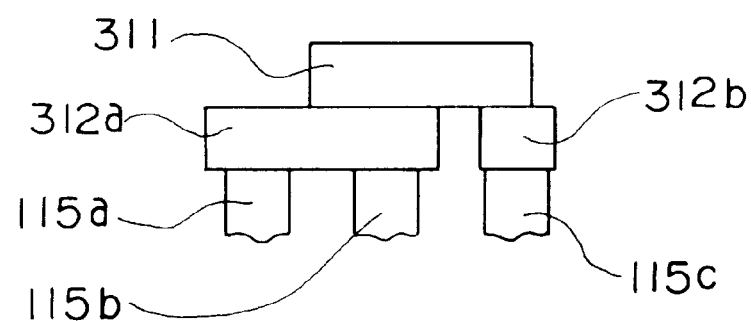
FIG. 22B shows an explanatory view of the operation of Embodiment 8.
Figure 22C:
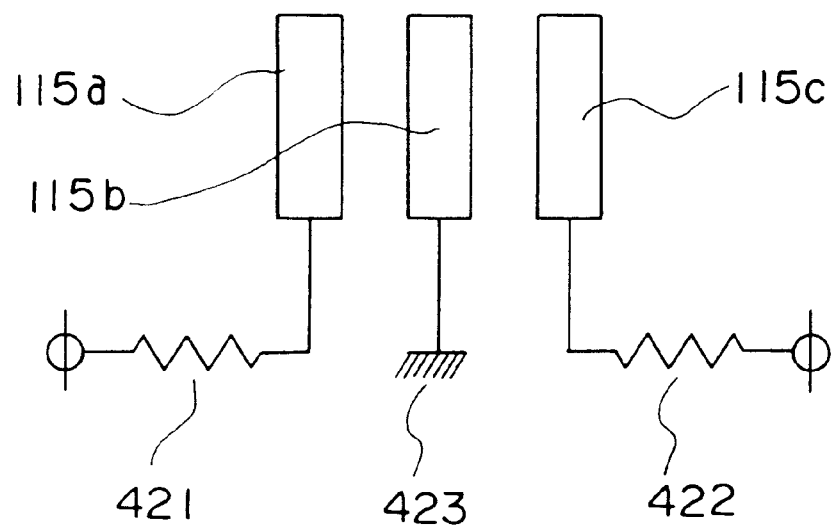
FIG. 22C shows an explanatory view of the operation of Embodiment 8.

FIGS. 22A, 22B and 22C show a disk-in switch to know whether the recording medium is inserted or not, a write protect switch for preventing the important record from being erased by erroneous writing on the recording medium, and conditions to generate on/off state.

Furthermore, in FIG. 22D shows a relation table of voltage level of the contact terminals configuring each switch and on/off state of the switch.

In the figures, a movable member 310 configures the write protect switch for preventing erroneous writing. The holding part 302c is provided on the case member 302 of the recording medium cartridge 300 and holds the movable member 310 at a stable position by engaging with the movable member 310. A conductive metal piece 311 is fixed to the movable member 310 to be able to contact with two conductive metal plates 312a and 312b exposed from the case member of the recording medium cartridge 300. The conductive metal piece has two contact points 311a and 311b. Contact terminals 115a, 115b and 115c made of spring are held and provided in the switch holder 116 of the frame 110 of the removable storage device 100. Parts of contact terminals 115a, 115b and 115c, that is, contact points with the conductive metal plates 312a and 312b provided in the recording medium cartridge 300 are stuck out on the side of the recording medium cartridge 300. A power source 421 is connected with the contact terminal 115a and a power source 422 is connected with the contact terminal 115c. The contact terminal 115b is grounded to an earth 423.

Next, FIGS. 22A, 22B, and 22C show the operation of the present embodiment with reference to the table in FIG. 22D.

When the recording medium cartridge 300 is mounted on the removable storage device 100, contact terminals 115a and 115b provided on the removable storage device 100 contact with the conductive metal plate 312a provided on the recording medium cartridge 300. The contact terminal 115c contacts with the conductive metal plate 312b. The contact terminals 115a and 115b become low voltage level (L) and "disk in" state, wherein the recording medium cartridge 300 is inserted, can be obtained. Further, as shown in FIG. 22A, when the movable member 310 provided on the recording medium cartridge 300 is moved to the position where the conductive metal piece 311 contacts with the conductive metal plate 312b, the contact terminal 115c becomes high voltage level (H). Then, "write protect ON" state, wherein writing on the recording medium is prohibited, can be obtained. Further, as shown in FIG. 22B, the conductive metal piece 311 is moved to the position where the conductive metal plates 312a and 312b are short-circuited, the contact terminal 115c becomes low voltage level (L) and "write protect OFF" state, wherein writing on the recording medium is allowed, can be obtained. As shown in FIG. 22C, when the recording medium cartridge 300 is pulled out from the removable storage device 100, the contact terminals 115a and 115c becomes high voltage level (H) and the contact terminal 115b becomes low voltage level (L). Then, "disk out" state, wherein the recording medium is not inserted, can be obtained.

In short, on the case member 302 of the recording medium cartridge case on the mounting side of the recording medium cartridge 300, one conductive metal plate 312a is exposed. On the same case member 302 of the recording medium cartridge case, another conductive metal plate 312b is exposed away from the conductive metal plate 312a. The movable member 310 is mounted on the case member 302 of the recording medium cartridge and has another conductive metal piece 311 which moves to contact with the conductive metal plates 312a and 312b. Three contact terminals are provided in the switch holder 116 of the frame 110 corresponding to the conductive metal plates 312a and 312b. Two of the contact terminals contact with the conductive metal plate 312a and the other contact terminal contacts with the conductive metal plate 312b.

According to the present embodiment, without the contacting point which moves in the direction of the thickness of the removable storage device 100, it is possible to get a switch which can get three states required for the removable storage device. Therefore, the recording medium cartridge does not need to be moved in the direction of the thickness. As the result, the removable storage device can be made thinner.

Embodiment 9

FIG. 23 shows an essential broken perspective view showing another embodiment of the present invention. FIG. 23 shows a mechanism for stopping the recording medium cartridge on the way of insertion when it is inserted into the removable storage device in a wrong way.

In the figure, a sloped part 300b is formed in one corner of the recording medium cartridge 300. A pressure spring 412 presses the latch lever 410 mounted on a concave notch loop of the frame 110 of the removable storage device 100. A recording medium cartridge 300z shown by a broken line is inserted upside down in a wrong way. The explanations of the other elements already described in the previous embodiments are omitted by using the same reference numbers.

Next, the operation of the present embodiment will now be described.

When the recording medium cartridge 300z is inserted into the removable storage device 100 as shown in the figure, the stopper 410a of the latch lever 410 pressed toward the center of the removable storage device 100 by the pressure spring 412 prevents further insertion. When the recording medium cartridge 300 is inserted in a normal way, the sloped part 300b of one corner engages with the stopper 410a. The stopper 410a is retracted into the notch 403f of the eject shaft 400 along the sloped part 300b and further insertion is realized.

In short, one corner of the insertion side of the case member 302 of the recording medium cartridge has a sloped part 300b and the notch 300a is formed on the same side. The recording medium cartridge 300 having the sloped part 300b and the notch 300a is inserted and ejected. In the removable storage device 100, the latch lever 410 is provided close to the insertion slot of the recording medium cartridge 300. One end of the latch lever 410 is held rotatably and the other end is engaged with the notch 300a of the recording medium cartridge. The pressure spring 412 presses the latch lever toward the center of the recording medium cartridge 300.

According to the present embodiment, with the simple mechanism as shown in FIG. 23, it is possible to prevent damage of the precision elements used in the removable storage device such as the read/write head 101, which may be caused by an erroneous insertion of the recording medium cartridge 300. Since it has the simple mechanism, it is possible to implement in a thinner removable storage device to prevent an inverse insertion of the recording medium cartridge.

Embodiment 10

The following is another embodiment of the recording medium cartridge 300 and the removable storage device 100.

Figure 24:
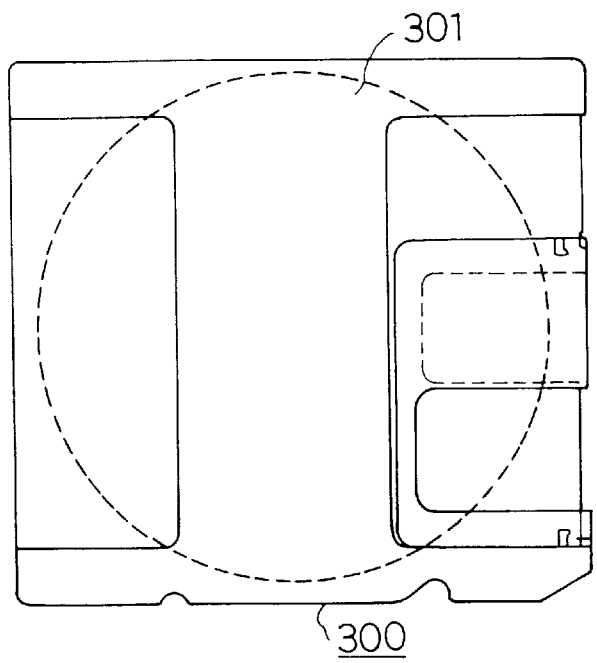
FIG. 24 shows a recording medium cartridge 300 of Embodiment 10.

FIG. 24 shows the recording medium cartridge 300.

Figure 25:
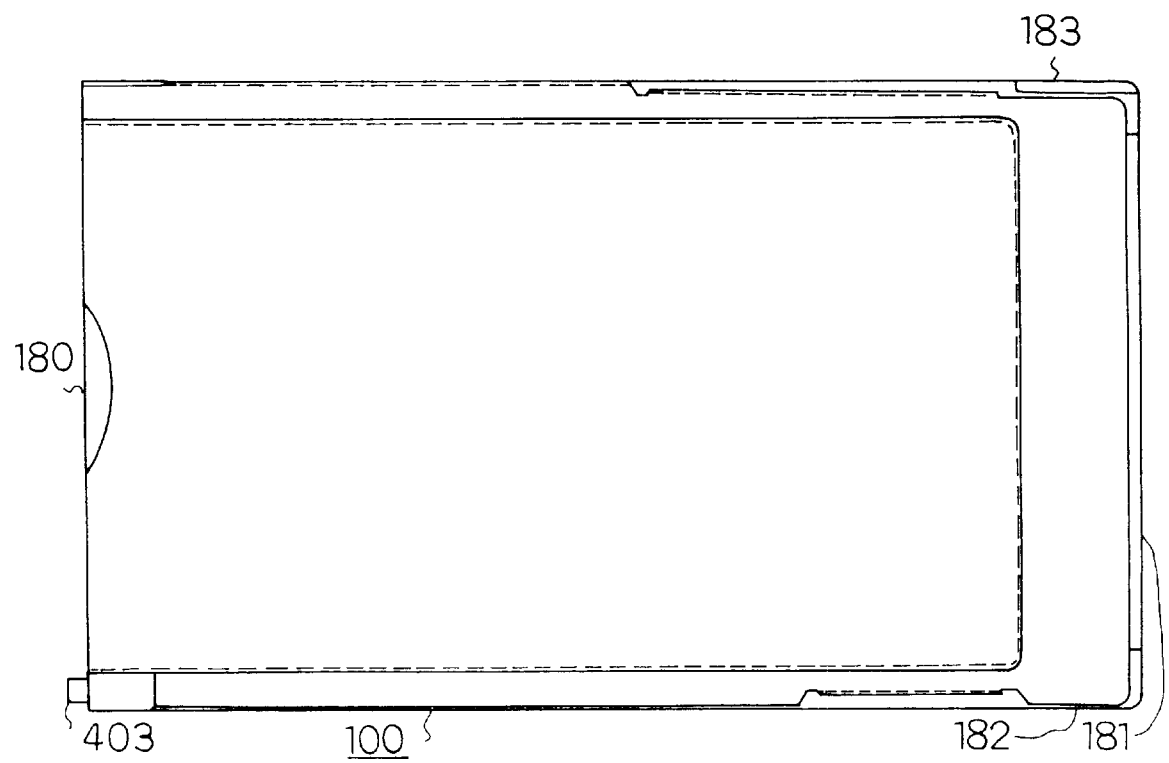
FIG. 25 shows a removable storage device 100 of Embodiment 10.

FIG. 25 shows the removable storage device 100.

Figure 26:
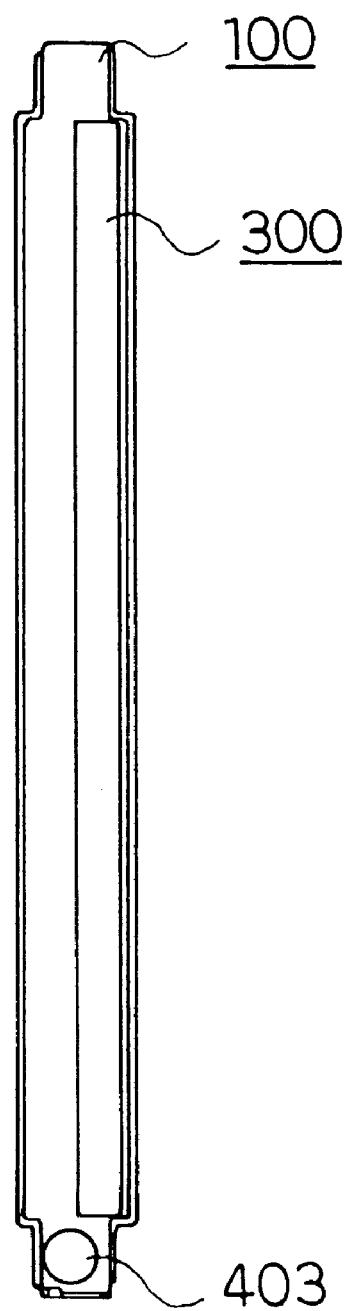
FIG. 26 shows a side view of a removable storage device 100 in which insertion and position setting of the recording medium cartridge 300 of Embodiment 10 is performed.

FIG. 26 shows a side view of the removable storage device 100 in which insertion and position setting of the recording medium cartridge 300 is performed.

Figure 27:
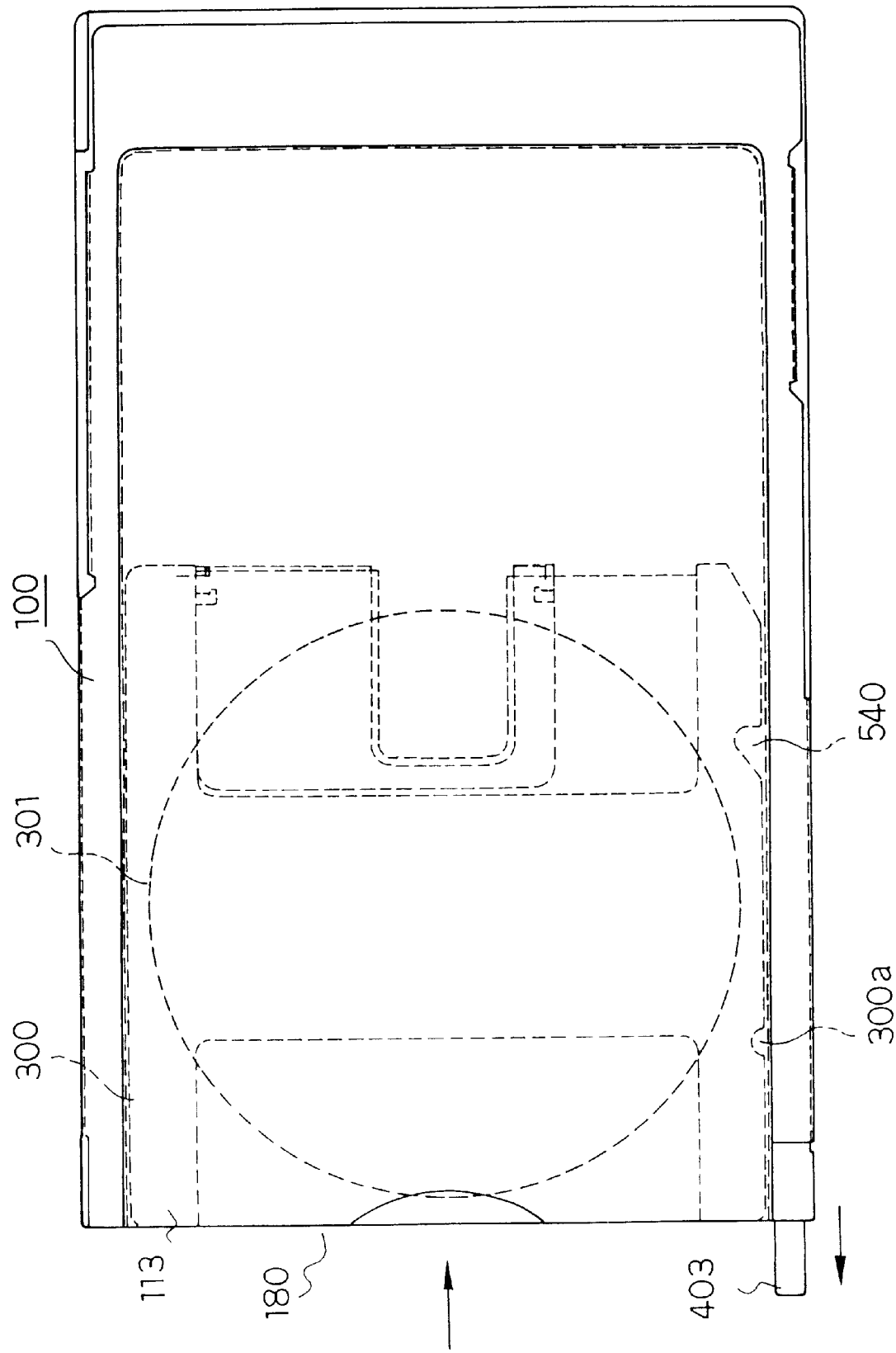
FIG. 27 shows a plan view of a removable storage device 100 in which the position setting of the recording medium cartridge 300 of Embodiment 10 is performed.

FIG. 27 shows a plan view of the removable storage device 100 which performs insertion and position setting of the recording medium cartridge 300.

Figure 28:
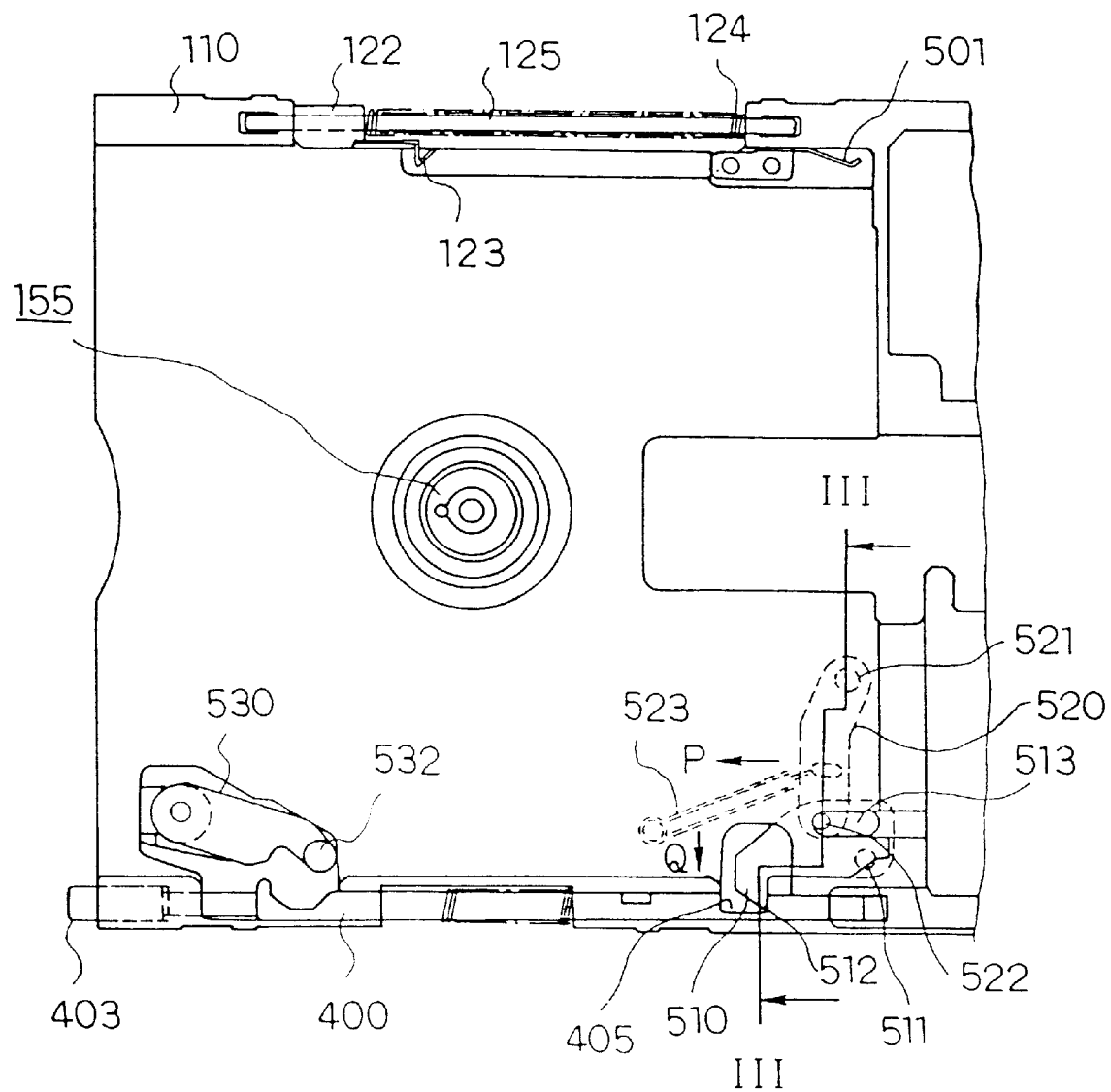
FIG. 28 shows a plan view of the removable storage device 100 of Embodiment 10 whose cover is removed.

FIG. 28 shows a plan view of the removable storage device whose cover is removed.

Figure 29:
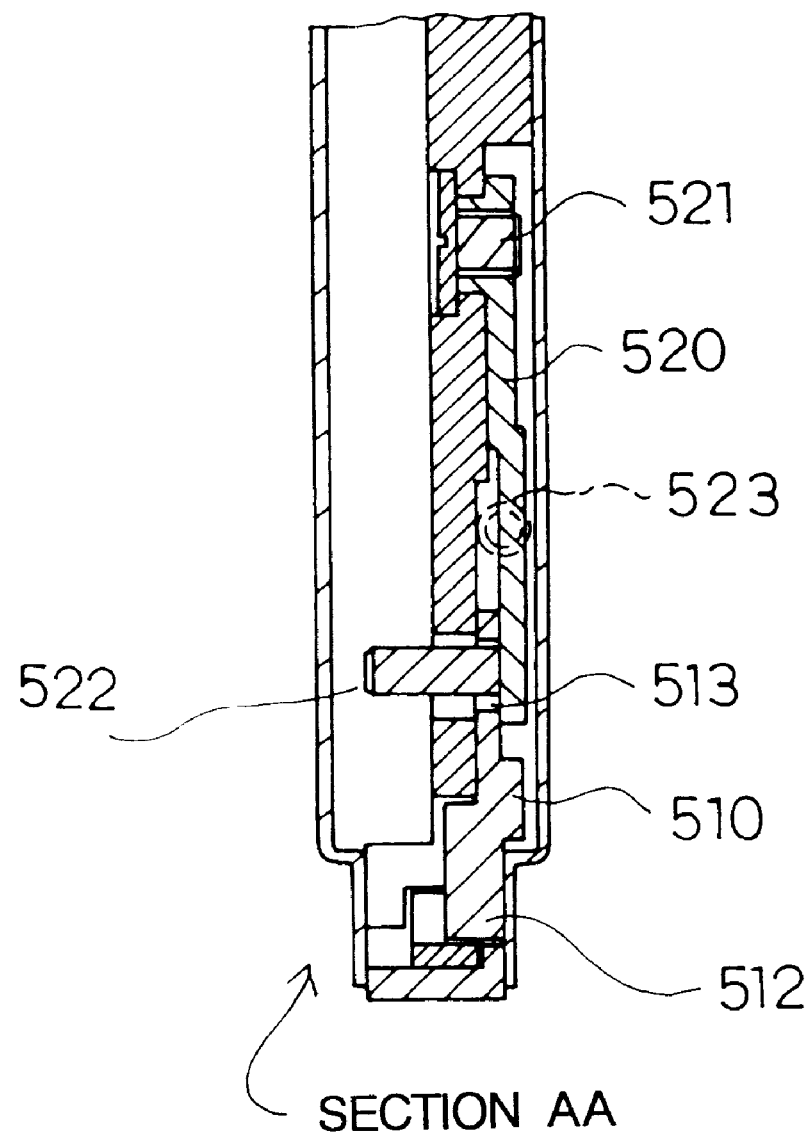
FIG. 29 shows a cross sectional view taken on line III—III of FIG. 28 of Embodiment 10.

FIG. 29 shows a cross section taken on line A—A of FIG. 28.

Figure 30:
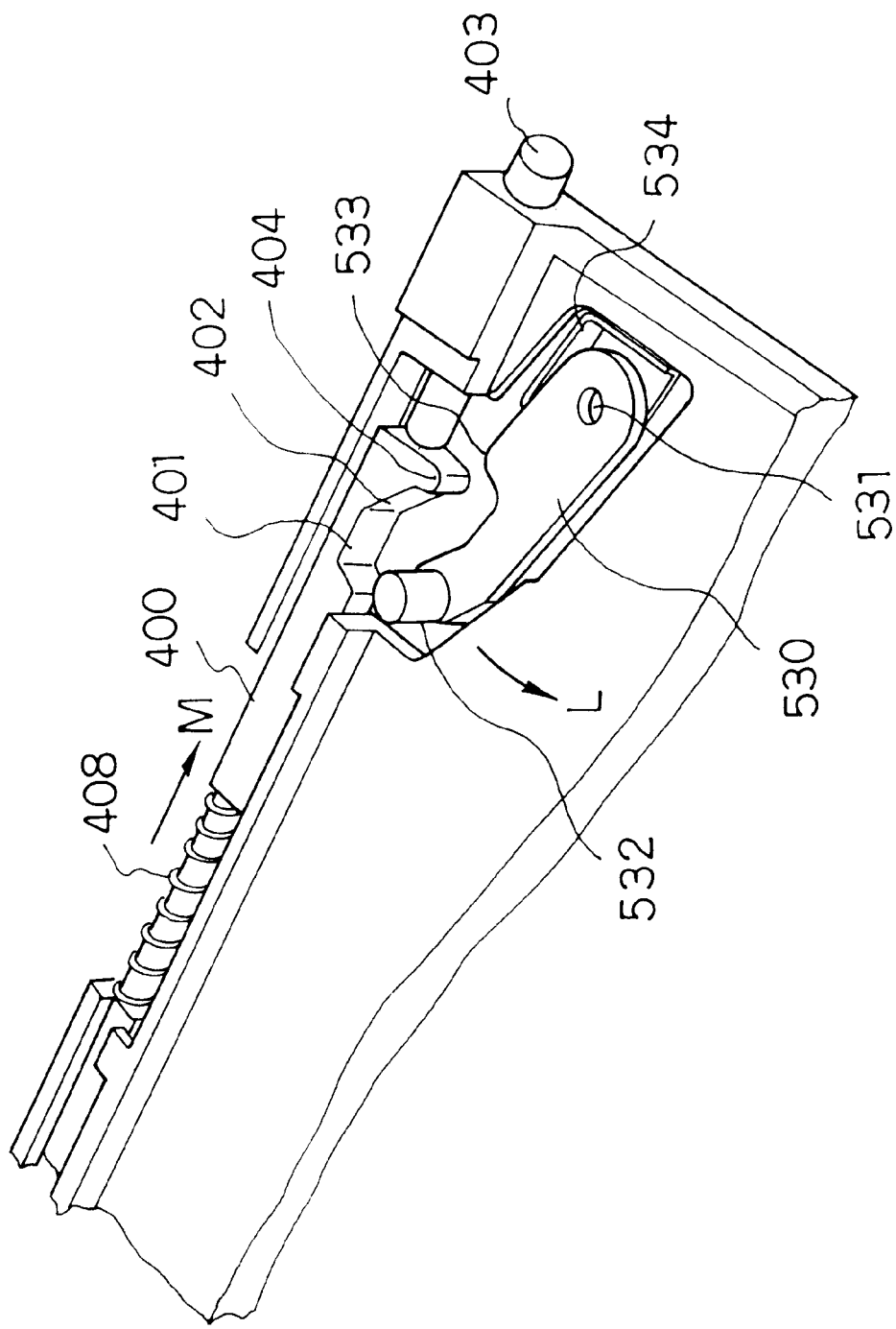
FIG. 30 shows a configuration of an eject shaft 400 and a latch lever 530 of Embodiment 10.

FIG. 30 shows a configuration of the eject shaft 400 and a latch lever 530.

Figure 31:
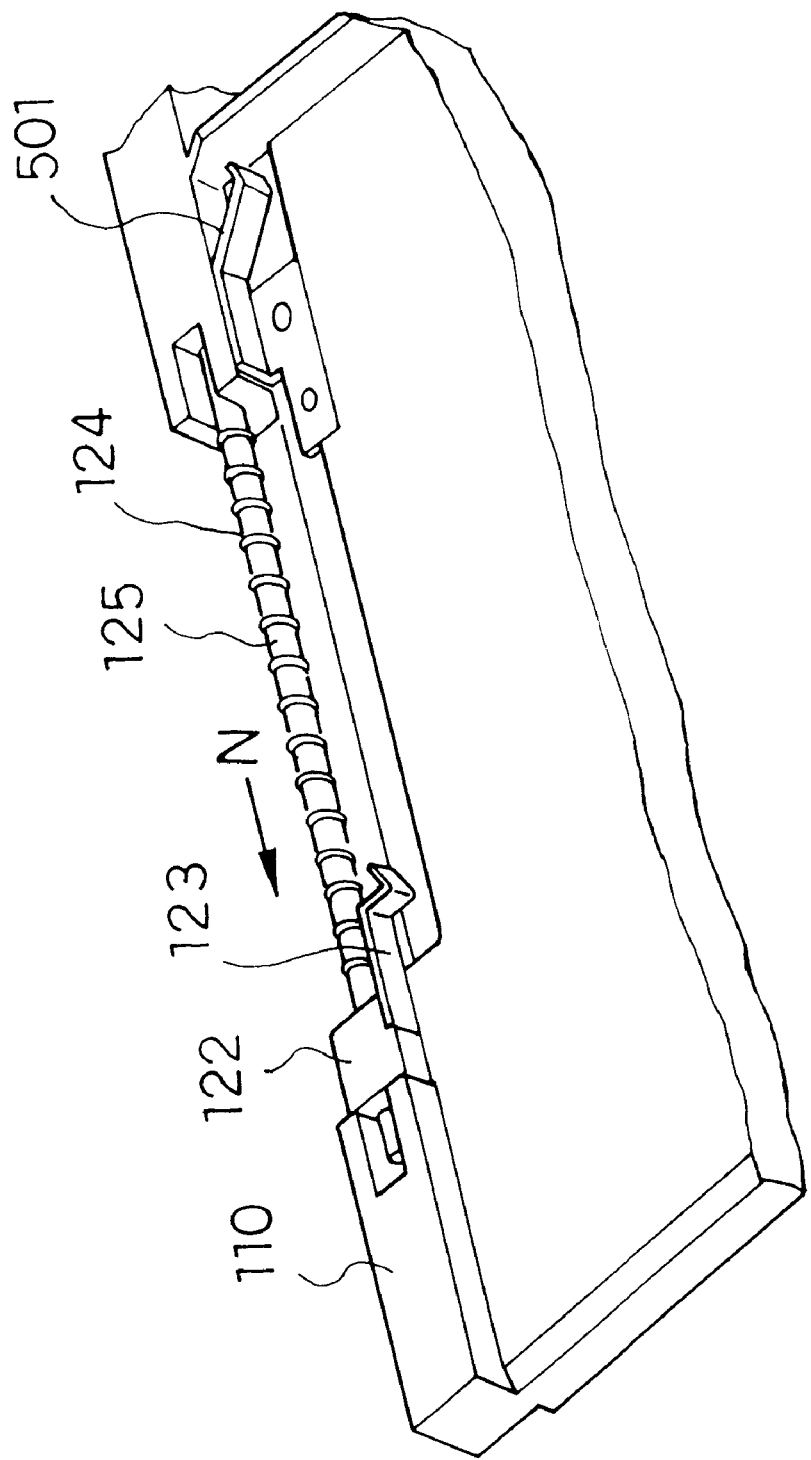
FIG. 31 shows a configuration of an arm member 123 and a cartridge side position setting spring 501 of Embodiment 10.

FIG. 31 shows a configuration of the arm member 123 and a cartridge side position setting spring 501.

Figure 32:
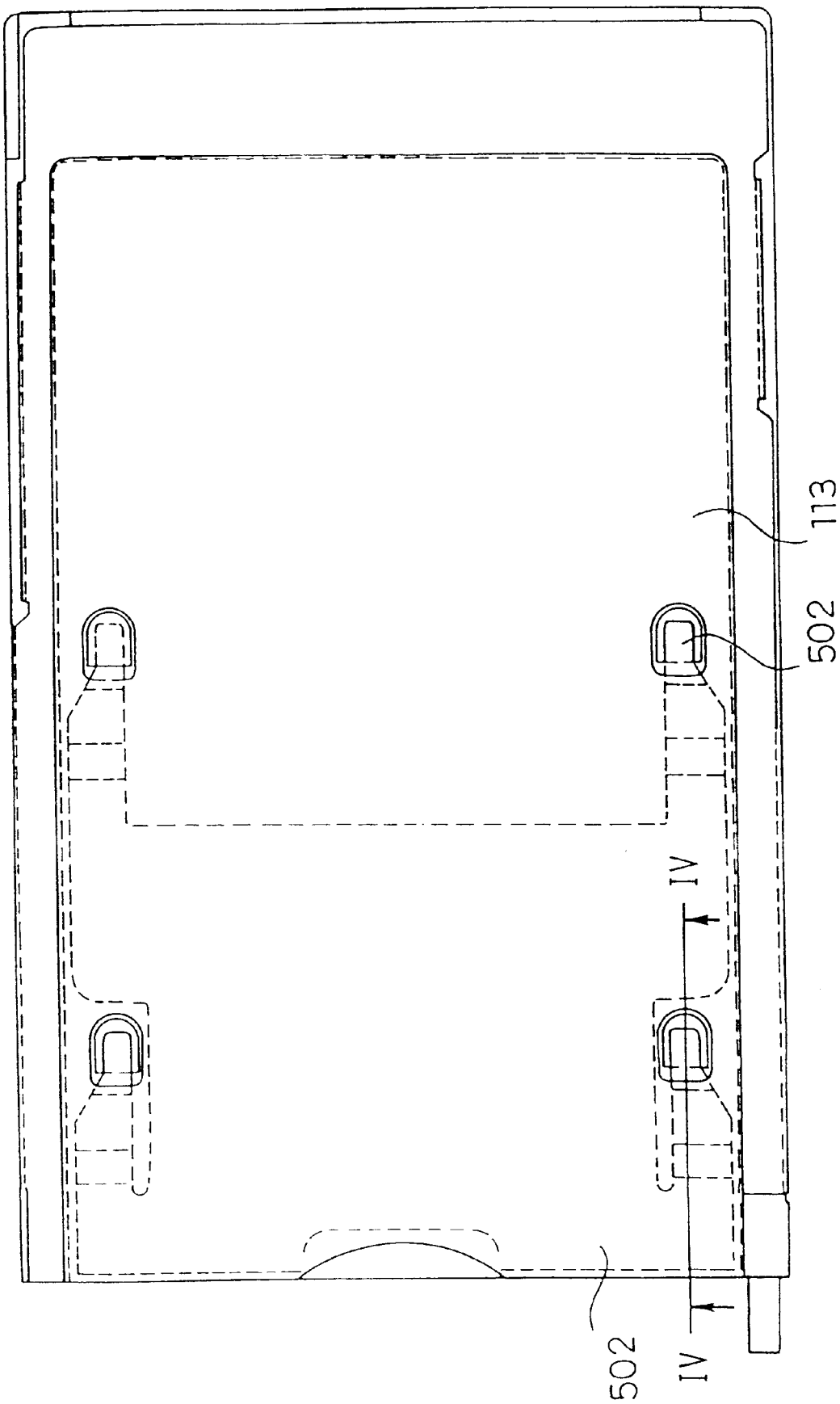
FIG. 32 shows a plan view of the cartridge vertical position setting spring of Embodiment 10.

FIG. 32 shows a plan view of a cartridge vertical position setting spring 502.

Figure 33:
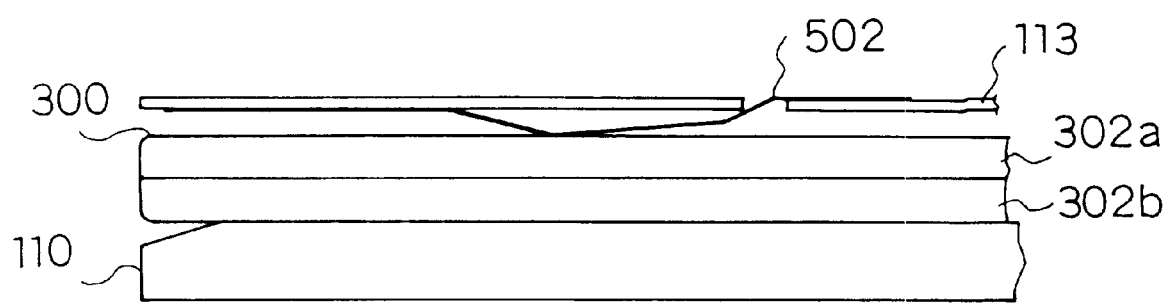
FIG. 33 shows a cross sectional view taken on line IV—IV of FIG. 32 of Embodiment 10.

FIG. 33 shows a cross section at the line B—B of FIG. 32.

Figure 34:
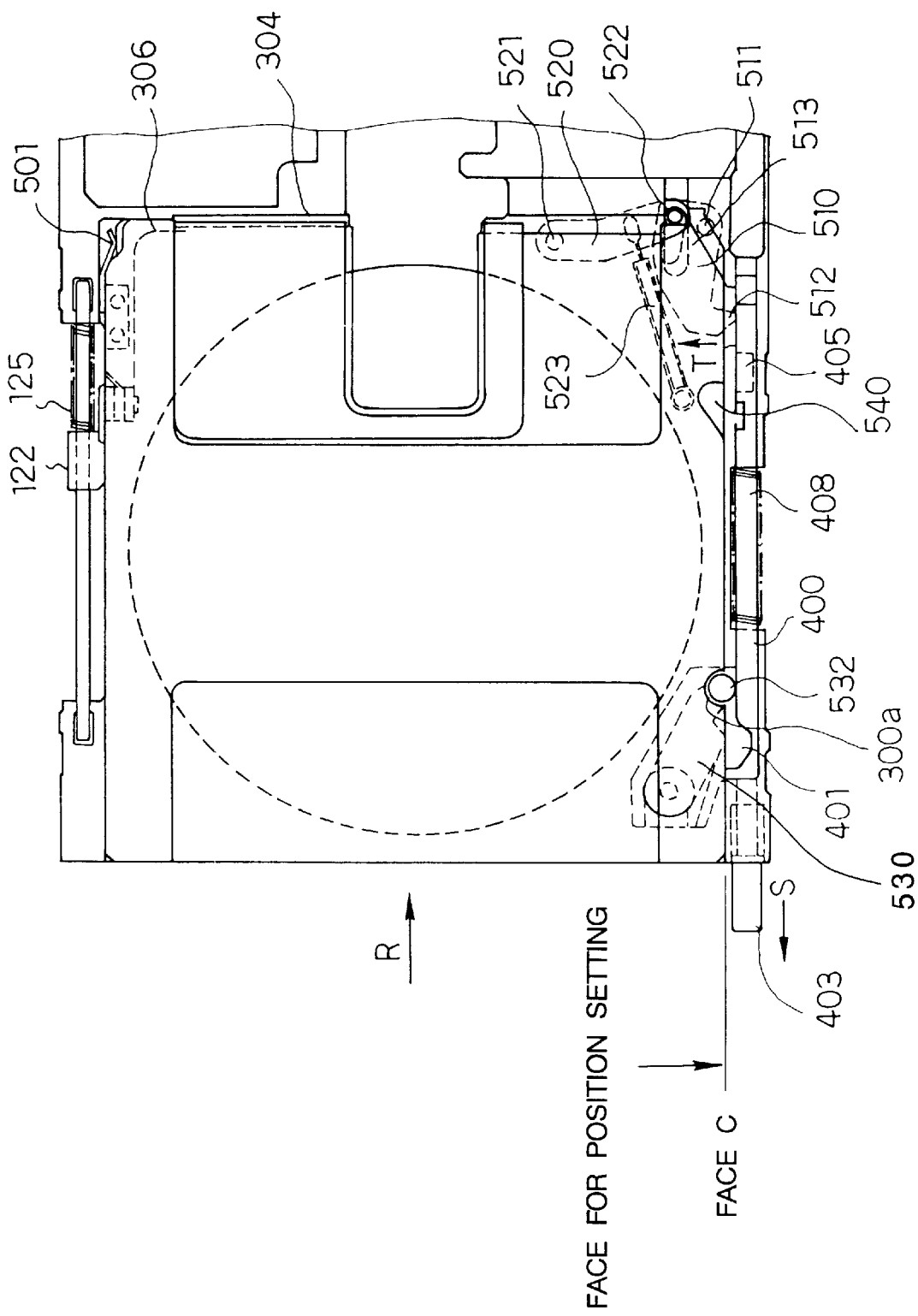
FIG. 34 shows a state where position setting of the recording medium cartridge 300 of Embodiment 10 is performed.

FIG. 34 shows a state where an insertion and position setting of the recording medium cartridge 300 is completed.

FIG. 35 shows an eject operation of the recording medium cartridge 300.

FIG. 36 shows a detailed eject operation of the recording medium cartridge 300.

Figure 37:
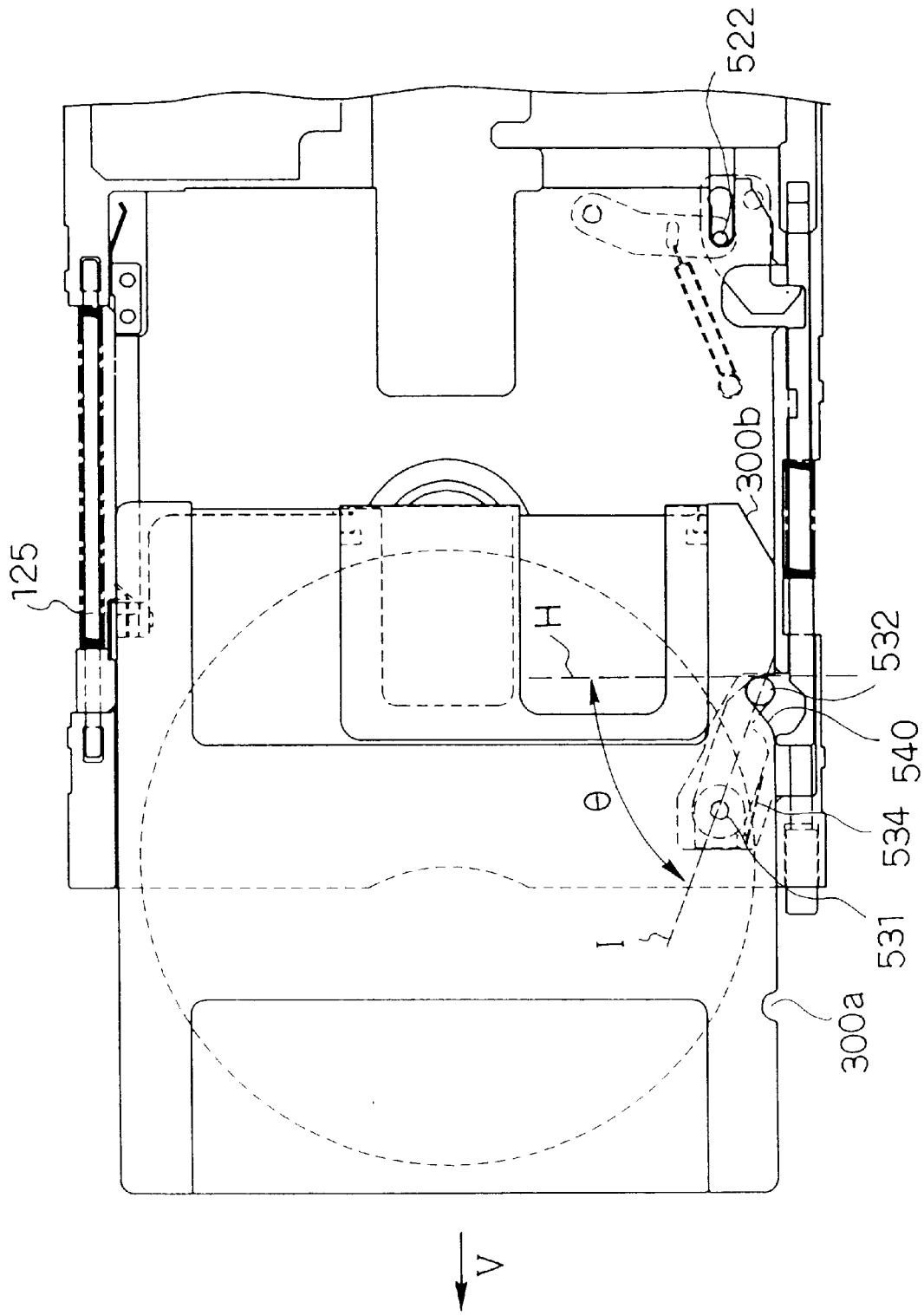
FIG. 37 shows an explanatory view of protection of throwing away the recording medium cartridge 300.

FIG. 37 shows a view which prevents the recording medium cartridge 300 from being pushed out.

Figure 38:
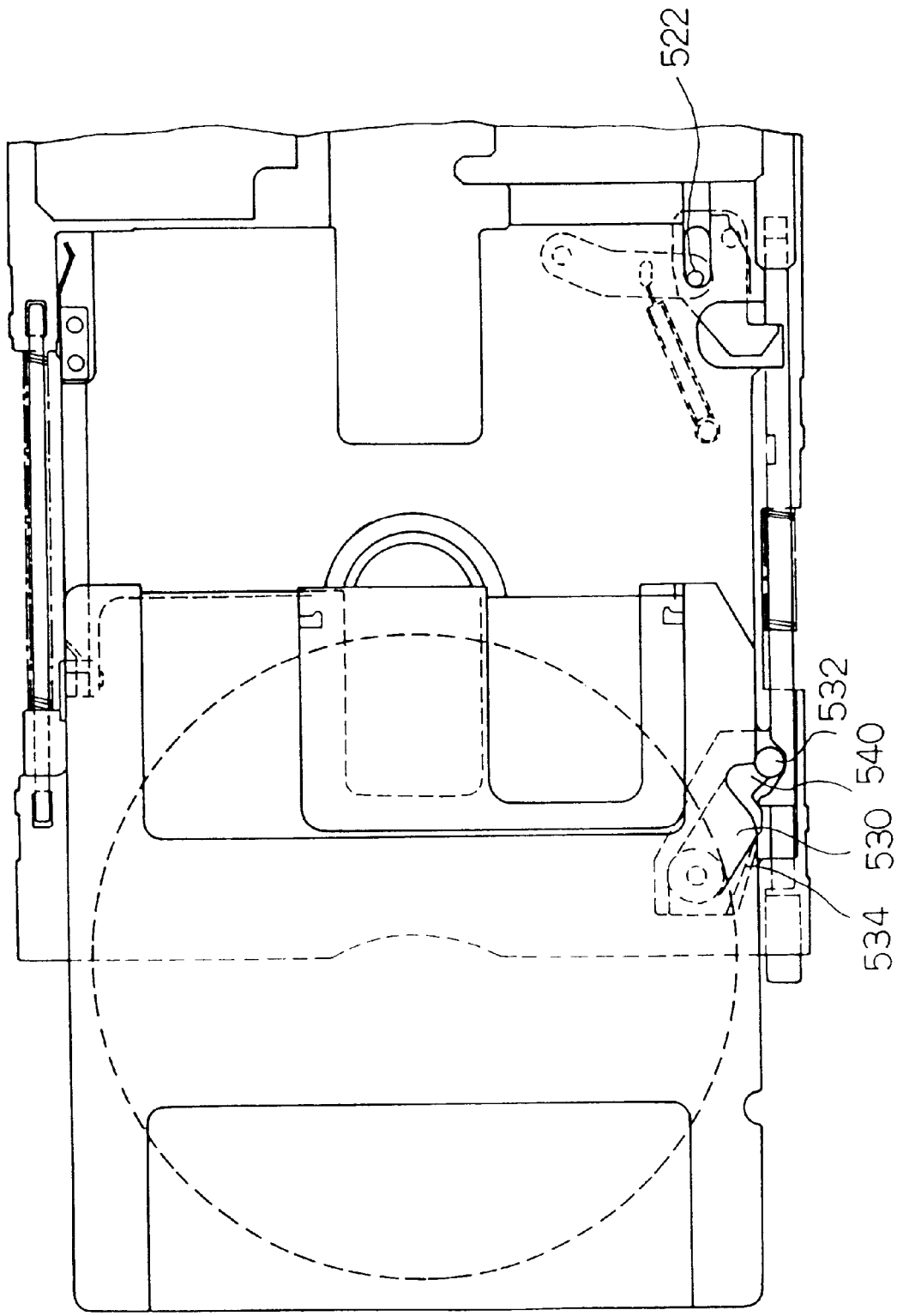
FIG. 38 shows an explanatory view of protection of throwing away the recording medium cartridge 300.

FIG. 38 shows a view which prevents the recording medium cartridge 300 from being pushed out.

The explanations of the other elements already described in the previous embodiments are omitted by using the same reference numbers.

An appearance of the removable storage device and the recording medium cartridge 300 in the present embodiment is as shown in FIGS. 24 to 27.

FIGS. 28 and 29 show a position setting means and an insertion/ejection means of the present embodiment.

FIG. 30 shows a position setting means.

The latch lever 530 is mounted rotatably around a shaft 531. A pressure spring 534 presses the latch lever 530 in the direction of the arrow L. The latch lever 530 has a stopper 532. The stopper 532 is a pin for setting the position of the recording medium cartridge 300. The latch lever 530 has a lever projection 533. The lever projection 533 delays retraction of the stopper 532 into a retract groove 401 by contacting with a shaft projection 404 of the eject shaft 400. The detailed explanation will be described later. The eject shaft 400 is pressed in the direction of the arrow M according to a shaft spring 408. The retract groove 401 and the shaft projection 404 are formed continuously through the taper face 402. The eject button 403 is mounted on the top of the eject shaft 400 and is stuck out from the removable storage device 100. The operation of position setting will now be described.

FIG. 31 shows the position setting means.

When the recording medium cartridge 300 is inserted, the cartridge side position setting spring 501 sets the position of the recording medium cartridge 300 on one side by pushing the other side of the recording medium cartridge 300.

FIG. 31 shows a part of the insertion/ejection means.

The arm member 123 is for opening the shutter. When the recording medium cartridge 300 is ejected, the force of the return spring 124 always works in the direction of the arrow N. Then, the slider 122 and the arm member 123 are always pressed in the ejecting direction and the force in the direction of the arrow N helps to eject the recording medium cartridge 300. Accordingly, the return spring 124 is used for opening/closing the shutter and used for ejecting the recording medium cartridge 300.

FIGS. 32 and 33 show the cartridge vertical position setting spring 502 as the position setting means.

The cartridge vertical position setting spring 502 is an elastic spring mounted on the cover 113. By processing the cover 113 itself, the cartridge vertical position setting spring 502 can be formed. However, since the cover 113 is made of steel materials and thick, it is difficult to precisely control the pressure force to the recording medium cartridge 300. Therefore, the cartridge vertical position setting spring 502 is separately provided in addition to the cover 113. As shown in a transverse cross section of FIG. 33, the cartridge vertical position setting spring 502 has tapers in both of the inserting and ejecting directions so that the cartridge vertical position setting spring 502 will not bother the insertion/ejection of the recording medium cartridge 300. The cartridge vertical position setting spring 502 is provided on the cover 113 and presses the recording medium cartridge 300 toward the side of the frame 110. That is, the cartridge vertical position setting spring 502 performs position setting of the recording medium cartridge 300 to the mounting side of the removable storage device 100 for the recording medium cartridge 300, that is, to the side of the frame 110.

Referring to FIGS. 28 and 29, it is explained about the insertion/ejection means.

In the present embodiment, as shown in FIG. 28, an eject pin 522 is provided. In the present embodiment, as shown in FIG. 27, the recording medium cartridge 300 is completely inserted into the removable storage device 100. Accordingly, when the recording medium cartridge 300 is ejected from the removable storage device 100, means for pushing back the recording medium cartridge 300 is required. The eject pin 522 is provided for pushing back the recording medium cartridge 300. The recording medium cartridge 300 is surely pushed out from the removable storage device 100. As shown in FIGS. 28 and 29, the eject pin 522 is fixed on the eject cam 520. The eject cam 520 is mounted rotatably by the shaft 521. The eject cam 520 is pressed in the direction of the arrow P by the eject spring 523. Accordingly, the eject pin 522 is always pressed in the direction of the arrow P. A shaft latch 510 is mounted and linked to the eject pin 522. The shaft latch 510 is mounted rotatably by the shaft 511. The shaft latch 510 is linked with the eject pin 522 by the eject pin hole 513. Further, the shaft latch 510 has a latch tip 512. The latch tip 512 is engaged with a latch groove 405 of the eject shaft 400. Since the eject pin 522 is always pressed in the direction of the arrow P, the latch tip 512 is always pressed in the direction of the arrow Q.

Next, with reference to FIG. 34, a detailed explanation of the inserting operation of the recording medium cartridge 300 according to the insertion/ejection means is shown.

When the recording medium cartridge 300 is inserted in the direction of the arrow R, the stopper 532 of the latch lever 530 is retracted into the retract groove 401 of the eject shaft 400. Under the state where the stopper 532 is retracted into the retract groove 401, when the recording medium cartridge 300 is inserted in the direction of the arrow R, the eject shaft 400 is moved in the direction of the arrow S as described later. Based on the movement of the eject shaft 400, the stopper 532 is moved out from the retract groove 401 and the stopper 532 is fixed between the notch 300a and the eject shaft 400. Namely, the stopper 532 sets position of the recording medium cartridge 300. Since the stopper 532 is situated between the recording medium cartridge 300 and the eject shaft 400, the recording medium cartridge 300 is not able to be ejected and the position setting is maintained.

On the other hand, the eject pin 522, when the recording medium cartridge 300 is inserted in the direction of the arrow R, moves in the direction of the arrow R. By the eject pin 522 moving in the direction of the arrow R, the latch tip 512 moves in the direction of the arrow T and engagement of the latch tip 512 and the latch groove 405 is released. According to the release of the latch, the eject shaft 400 is moved in the direction of the arrow S by the pressure of the shaft spring 408, as has been described. The eject pin 522 always tries to eject the recording medium cartridge 300 according to the pressure of the eject spring 523. However, based on the position setting by the stopper 532, the recording medium cartridge 300 is not ejected and kept in the removable storage device 100.

Next, with reference to FIG. 35, a detailed explanation of the ejecting operation of the recording medium cartridge 300 according to the insertion/ejection means is shown.

When the operator pushes the eject button 403 in the direction of the arrow U, the ejecting operation is started. When the eject shaft 400 is pressed in the direction of the arrow U, the stopper 532 becomes retractable into the retract groove 401. Since the recording medium cartridge 300 is pushed out in the direction of the arrow V by the eject pin 522, engagement of the notch 300a and the stopper 532 is released and the stopper 532 is retracted into the retract groove 401. Accordingly, the recording medium cartridge 300 becomes ejectable in the direction of the arrow V. The eject pin 522 ejects the recording medium cartridge 300 in the direction of the arrow V based on the pressure of the eject spring 523. As has been described, since the pressure of the return spring 124 is also transmitted to the recording medium cartridge 300 through the arm member 123 and the slider 122, the recording medium cartridge 300 is helped to move in the direction of the arrow V. The eject pin 522 and the arm member 123 should be located at different places apart from each other. Due to the force of ejecting the recording medium cartridge 300 from different positions, it is possible to eject the recording medium cartridge 300 surely. In the present embodiment, a case where the recording medium cartridge 300 is ejected by pressing the two different sides of the cartridge case is shown. When the eject shaft 400 is moved in the direction of the arrow U, the latch groove 405 and the latch tip 512 are engaged and the eject button 403 is fixed under the pushed state.

Thus, when the recording medium cartridge 300 is inserted, the latch tip 512 allows the eject button 403 to be pushed out. When the recording medium cartridge 300 is not inserted, the latch tip 512 keeps a state where the eject button 403 is pushed in.

Figure 36A:
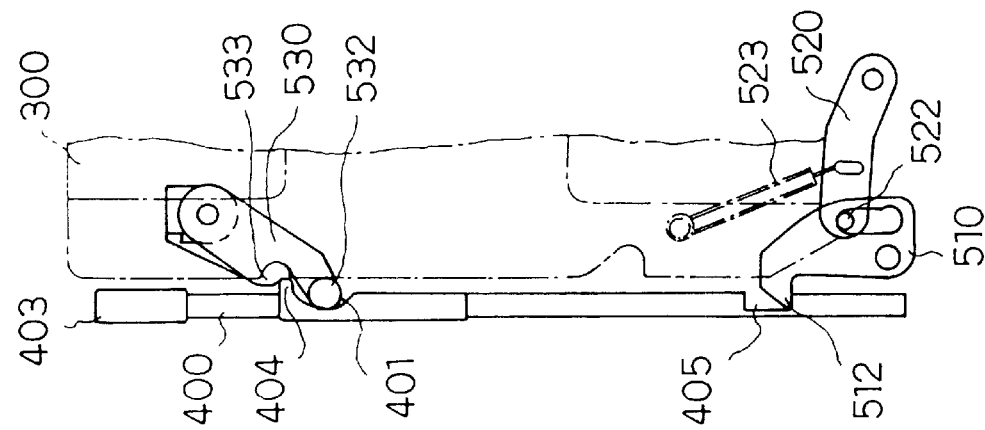
FIG. 36A shows a detailed operation of ejection of the recording medium cartridge 300 of Embodiment 10.
Figure 36B:
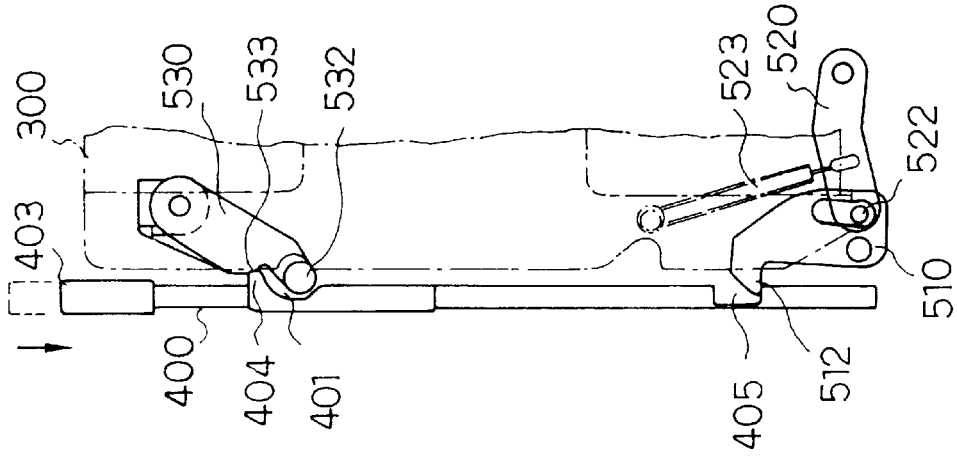
FIG. 36B shows a detailed operation of ejection of the recording medium cartridge 300 of Embodiment 10.
Figure 36C:
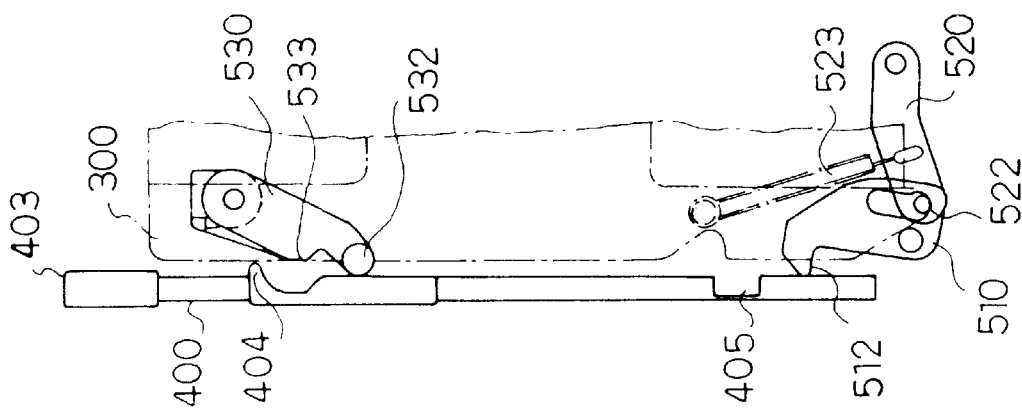
FIG. 36C shows a detailed operation of ejection of the recording medium cartridge 300 of Embodiment 10.

FIGS. 36A, 36B and 36C show a mechanism which does not eject the recording medium cartridge 300 before the latch groove 405 of the eject shaft 400 is latched by the latch tip 512.

As has been described, the latch tip 512 keeps a state where the eject button 403 is pushed into. A state where the eject button 403 is pushed into is a state where the recording medium cartridge 300 is not inserted. Accordingly, when the recording medium cartridge 300 is ejected, the latch tip 512 should latch the latch groove surely. If the latch is not performed surely, the eject button 403 is pushed out, though the recording medium cartridge 300 is not inserted. In order to prevent such state, the recording medium cartridge 300 should not be ejected before the latch groove 405 of the eject shaft 400 is latched by the latch tip 512.

FIG. 36A shows a state where the position setting is performed for the recording medium cartridge 300. FIG. 36B shows a case where the eject button is pushed. When the eject button is pushed, by contacting the shaft projection 404 with the lever projection 533, the stopper 532 will not be retracted to the retract groove 401 promptly. Namely, when the shaft projection 404 contacts the lever projection 533, rotation of the latch lever 530 is prohibited. Contact of the shaft projection 404 and the lever projection 533 will last until the latch tip 512 latches the latch groove 405. As shown in FIG. 36C, after the latch groove 405 is surely latched by the latch tip 512, contact of the lever projection 533 and the shaft projection 404 is released and the latch lever 530 can rotate. As a result, the stopper 532 can be retracted into the retract groove 401.

Thus, in the present embodiment, the position setting of the recording medium cartridge 300 by the stopper 532 will not be released until the eject shaft 400 is surely latched by the shaft latch 510.

Thus, the recording medium cartridge 300 will not be ejected before the eject shaft 400 is latched by delaying the release of the position setting of the recording medium cartridge 300 than the latch of the eject shaft 400 and the shaft latch 510.

Next, the prevention of throwing out the recording medium cartridge 300 from the storage device at the time of ejection, is explained with reference to FIGS. 37 and 38.

The recording medium cartridge 300 has a cartridge groove 540. The cartridge groove 540 is provided between the notch 300a and the sloped part 300b. According to the eject force of the eject pin 522, the recording medium cartridge 300 is pushed out in the direction of the arrow V. When the force is too strong, the recording medium cartridge 300 is thrown out completely from the storage device. In order to prevent the recording medium cartridge 300 from being thrown out, the cartridge groove 540 is provided. When the recording medium cartridge 300 is moved in the direction of the arrow V, the stopper 532 pressed by the pressure spring 534 is engaged with the cartridge groove 540. Based on the engagement, the movement of the recording medium cartridge 300 in the direction of the arrow V is stopped.

FIG. 37 shows a state where the recording medium cartridge 300 is stopped according to the engagement of the cartridge groove 540 and the stopper 532.

An angle θ between a line H on the side of the sloped part of the cartridge groove 540 and a line I through the shaft 531 and the center of the stopper 532 is less than 90 degrees. When the operator tries to pull out the recording medium cartridge 300 by using hands, in the state of FIG. 37, the engagement of the cartridge groove 540 and the stopper 532 is released as shown in FIG. 38 and it is possible to pull out the recording medium cartridge 300 easily.

Embodiment 11

In the present embodiment, the recording medium cartridge 300 is described in detail.

FIG. 39A shows a view from each direction of the recording medium cartridge 300 and FIG. 39B is a cross section taken on line C—C of FIG. 39A.

The recording medium cartridge 300 is inserted into the unit about the size of a name card. The size of the recording medium cartridge 300 in the present embodiment is assumed to be 49.5 mm×47 mm×2 mm. The recording medium stored in the recording medium cartridge 300 is about 1.7 inch flexible disk in diameter. Any size of the recording medium can be allowed if it is contained in the recording medium cartridge 300. The recording medium cartridge 300 has a case member (upper shell) 302a and a case member (lower shell) 302*b*. Further, it has the shutter 304. The case member 302*b* has a return slide slit 562 and an open slide slit 563. Additionally, it has a hole 586 and a conductive metal piece 312 is mounted movably.

Figure 40A:
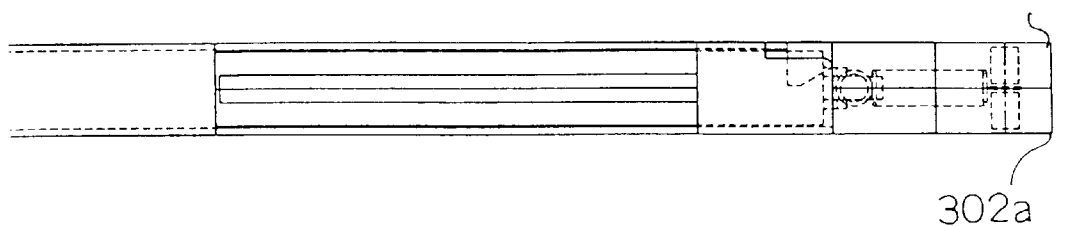
FIG. 40A shows a configuration of closing a shutter 304 of Embodiment 11.
Figure 40B:
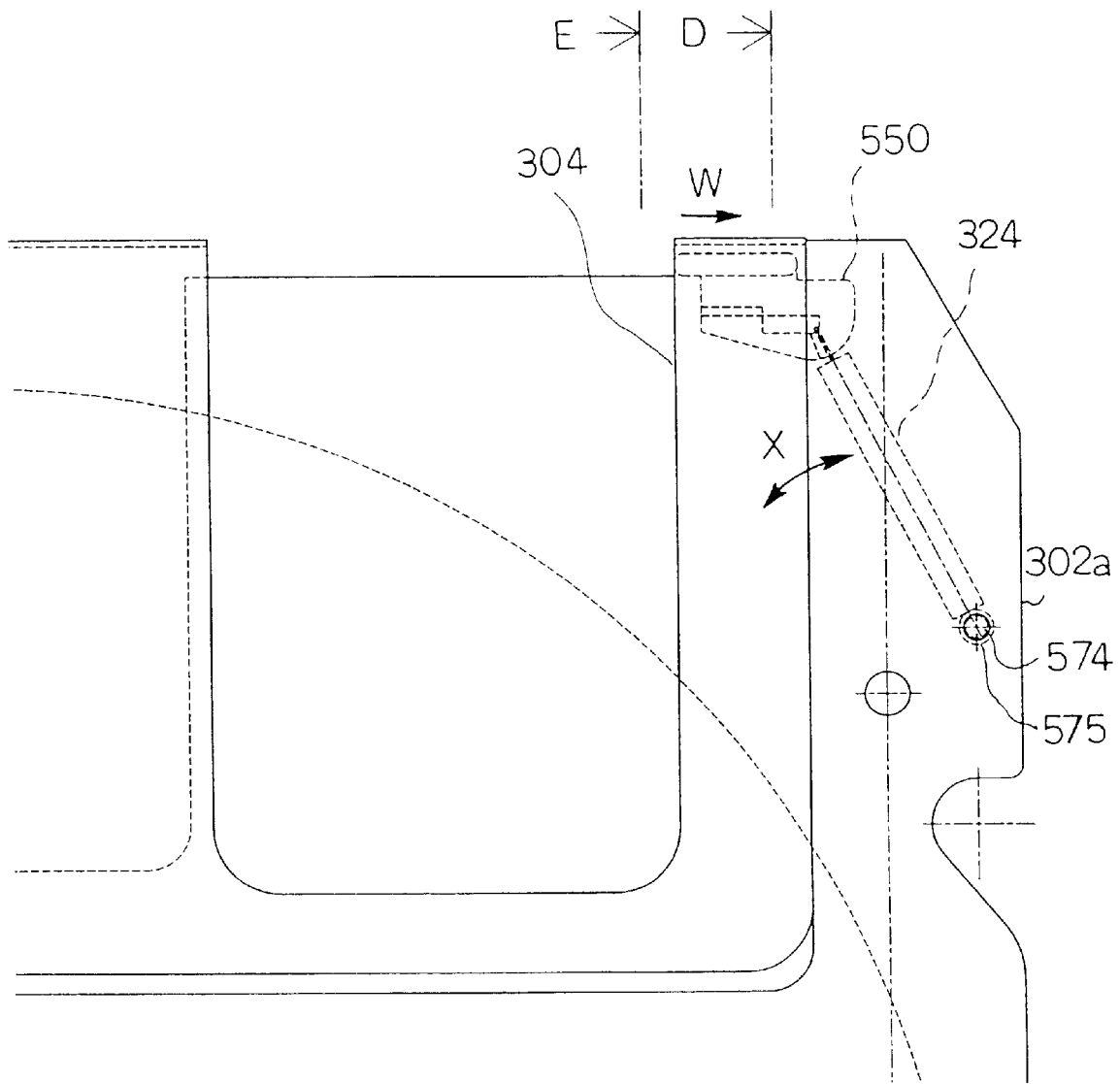
FIG. 40B shows a configuration of closing a shutter 304 of Embodiment 11.

FIG. 40 shows a mechanism for closing the shutter 304.

FIG. 41 shows a mechanism where the case member 302*a* is removed.

Figure 42:
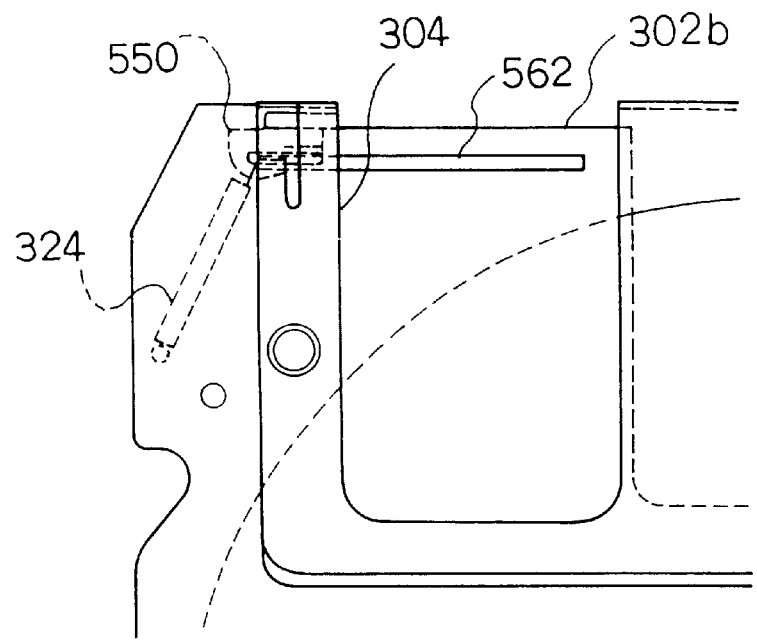
FIG. 42 shows a configuration when the shutter of Embodiment II is provided, seen from the case member 302b.

FIG. 42 shows a mechanism with the shutter seen from the side of the case member 302*b*.

Figure 43:
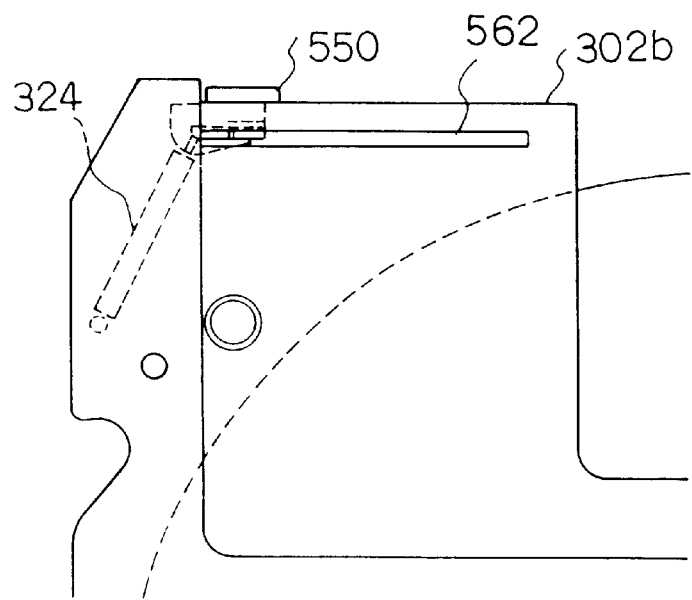
FIG. 43 shows a configuration when the shutter of Embodiment 11 is not provided, seen from the case member 302b.

FIG. 43 shows a mechanism without the shutter and seen from the side of the case member 302*b*.

Figure 44:
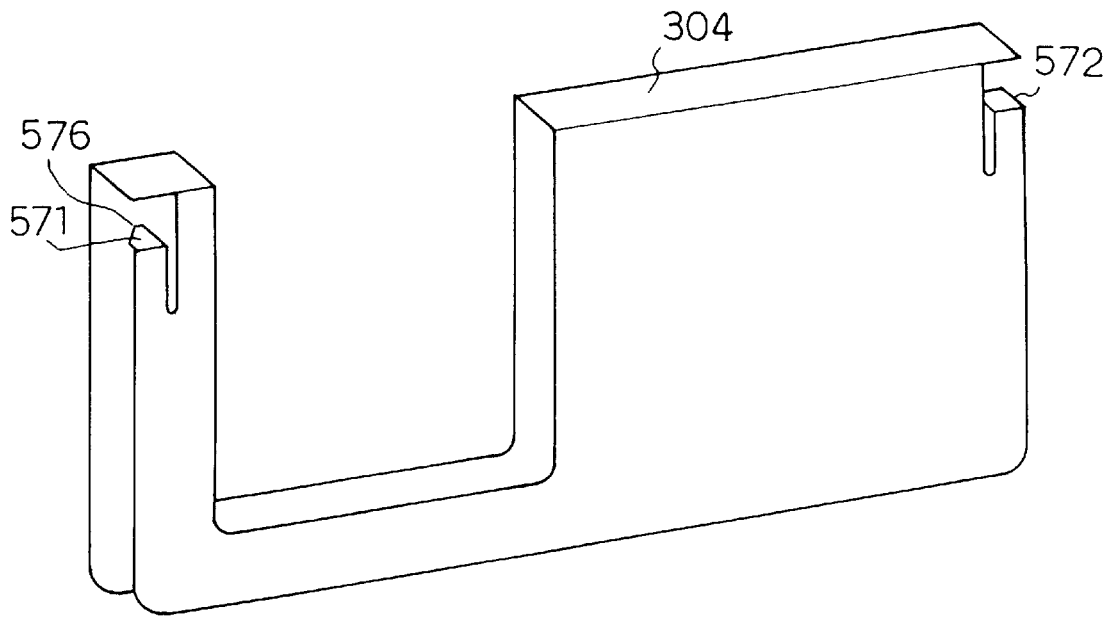
FIG. 44 shows a perspective view of the shutter of Embodiment 11.

FIG. 44 shows a perspective view of the shutter.

Figure 45:
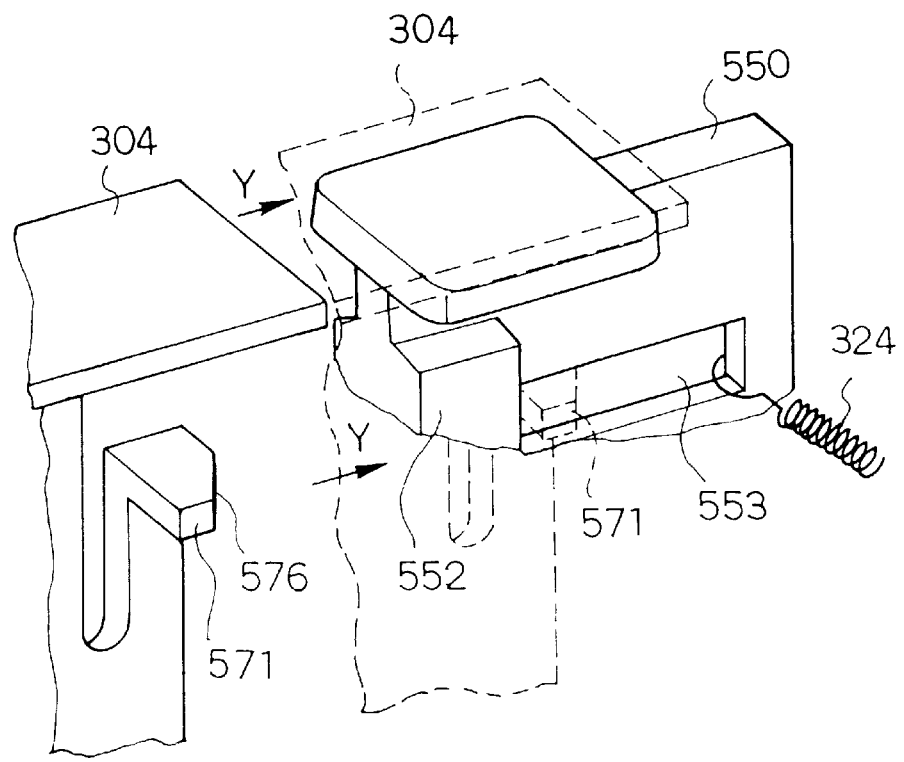
FIG. 45 shows a perspective view of a return slider 550 of Embodiment 11.

FIG. 45 shows a perspective view of the returning slider 550.

FIG. 46A shows a cross section of D of FIG. 40.

FIG. 46B shows a cross section of E of FIG. 40.

FIG. 46C shows a cross section of F of FIG. 41.

FIG. 46D shows a cross section of G of FIG. 41.

FIG. 46E shows a cross section of H of FIG. 47, which is described later.

FIG. 46F shows a cross section of I of FIG. 48, which is described later.

A return slider 550 is pressed in the direction of the arrow W by the return spring 324. The return spring 324 is mounted rotatably in the direction of the arrow X by a spring pin 574. The spring pin 574 is formed together with the case member 302*a*. The spring pin 574 is inserted into a pin hole 575 provided on the case member 302*b*.

Thus, by forming the spring pin 574 with the case member 302*a* and the pin hole 575 with the case member 302*b*, it is possible to mount the return spring 324 rotatably by a simple mechanism. Further, it is possible to prevent the spring pin 574 to be bent by the return spring 324. Here, the spring pin 574 can be provided on the case member 302*b* and the pin hole 575 can be provided on the case member 302*a*. By forming the spring pin 574 on the case member 302*a* or the case member 302*b*, it is possible to reduce the cost of the recording medium cartridge 300 and make assembly operation simple.

As shown in FIG. 44, the shutter 304 has a shutter return tongue 571. The shutter return tongue 571 has a sloped part 576. As shown in FIG. 45, the return slider 550 has a slider hole 553. The shutter return tongue 571 is engaged with the slider hole 553. So that the slider hole 553 and the shutter return tongue 571 are engaged, the shutter 304 moves as shown by the arrow Y. The sloped part 576 is for engaging the shutter return tongue 571 and the slider hole 553 smoothly. As shown in FIGS. 45 and 46A, the return slider 550 is mounted movably along the ends of the case member 302*a* and the case member 302*b*. The shutter return tongue 571 is engaged with the slider hole 553 from the outside of the case member 302*b* through the return slide slit 562. As has been described, it is possible to press the shutter 304 in the closing direction by the return spring 324.

Next, a mechanism of opening the shutter 304 is shown.

Figure 47A:
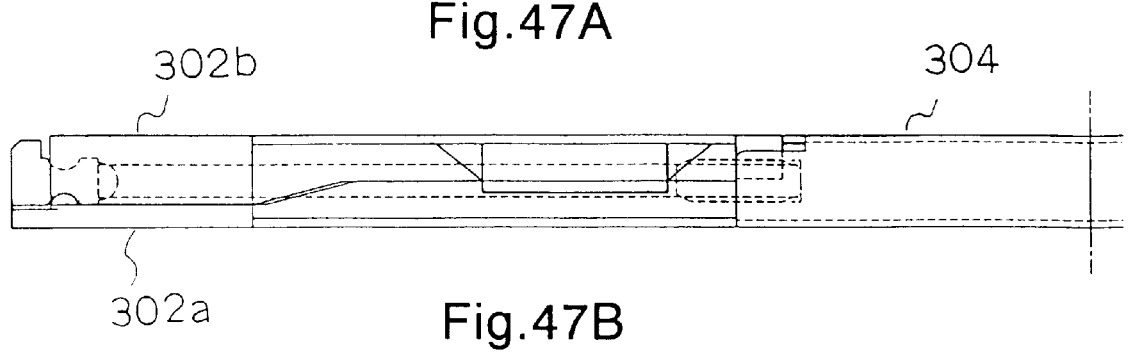
FIG. 47A shows a configuration where the shutter of Embodiment 11 is opened.
Figure 47B:
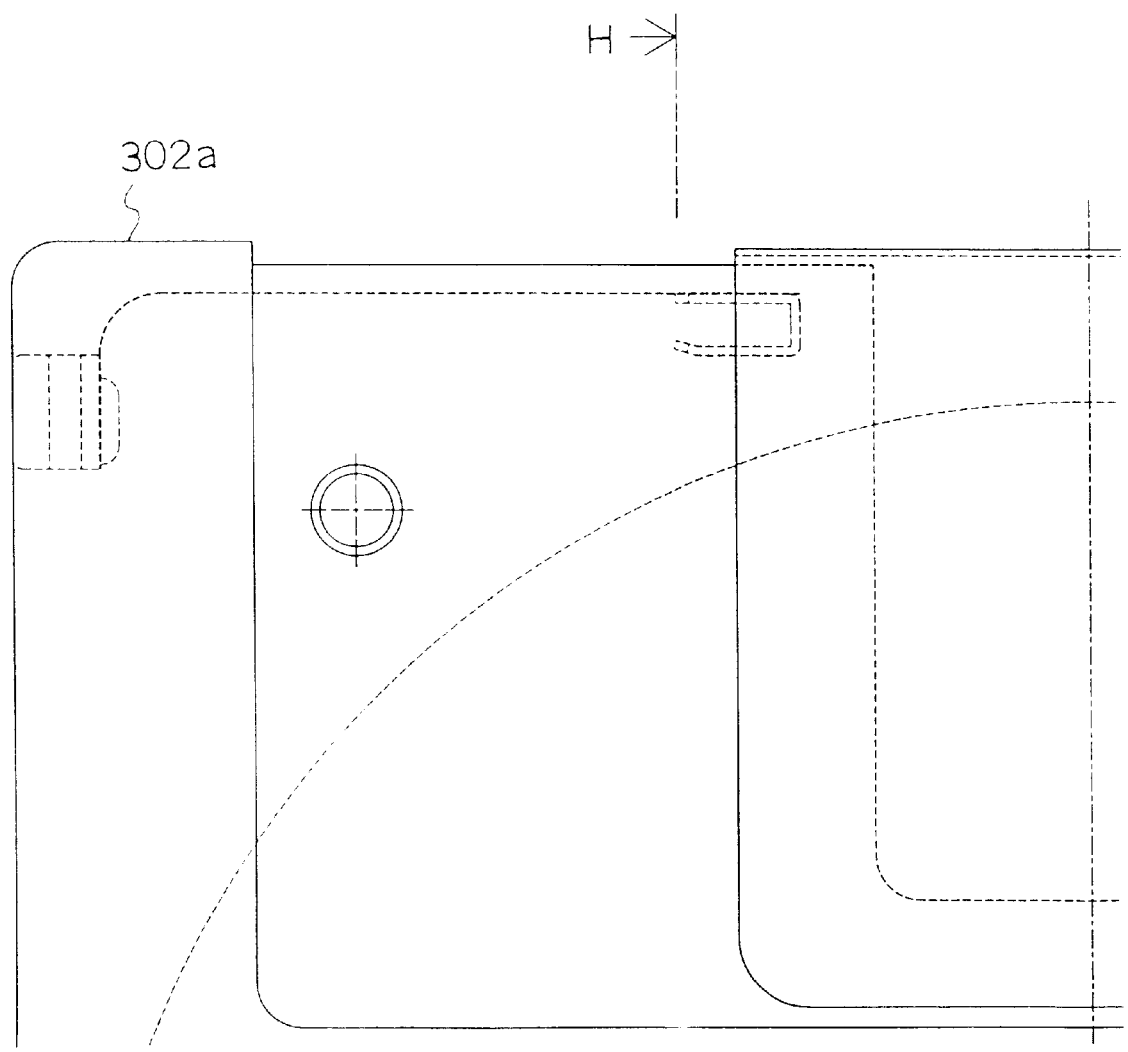
FIG. 47B shows a configuration where the shutter of Embodiment 11 is opened.

FIG. 47 shows a mechanism of opening the shutter.

Figures 48A, 48B:
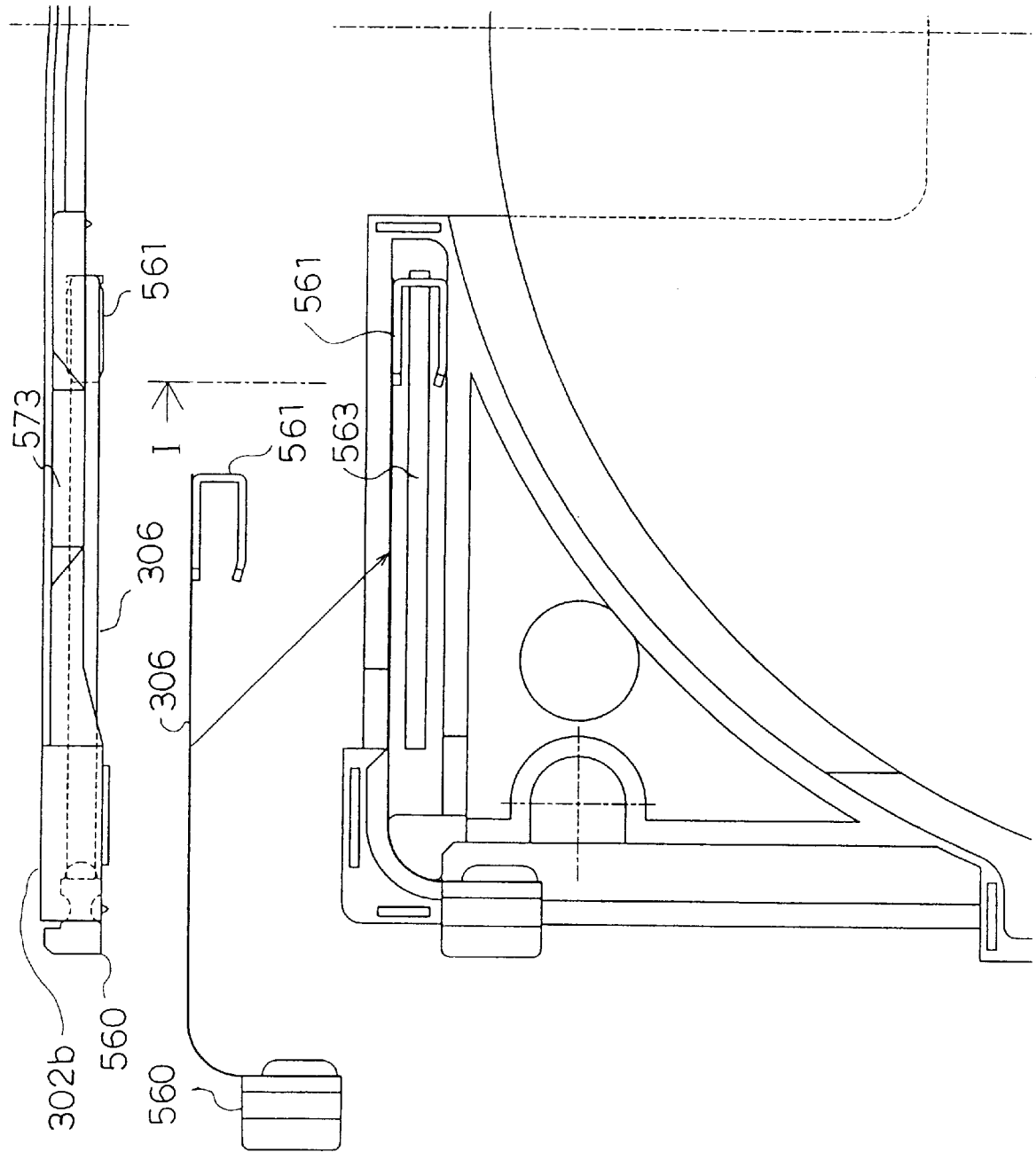
FIG. 48A shows a configuration where the case member 302a of Embodiment 11 is removed.
FIG. 48B shows a configuration where the case member 302a of Embodiment 11 is removed.

FIG. 48 shows a mechanism without the case member 302*a*.

Figure 49:
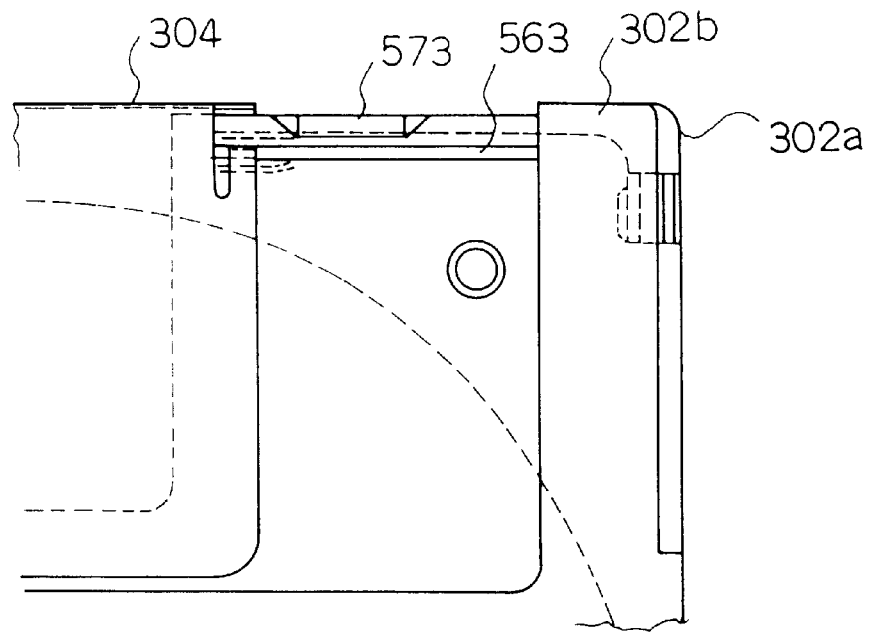
FIG. 49 shows a configuration seen from the case member 302b of Embodiment 11.

FIG. 49 shows a mechanism seen from the case member 302*b*.

Figure 50:
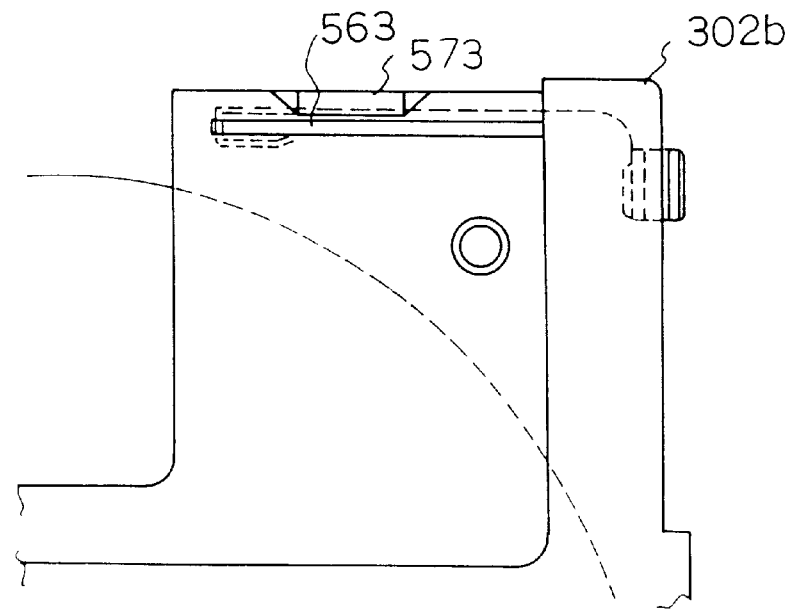
FIG. 50 shows a configuration where the case member 302a and the shutter 304 of Embodiment 11 are removed.

FIG. 50 shows a mechanism where the case member 302*a* and the shutter 304 are removed.

Figure 51:
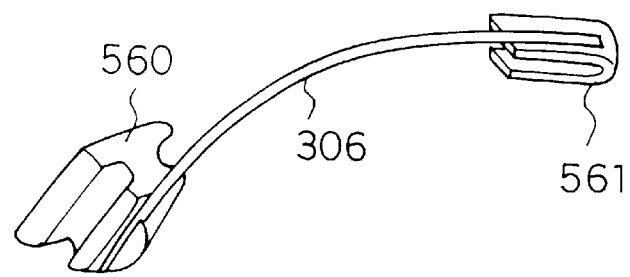
FIG. 51 shows a perspective view of an open slider 560, connecting band 306 and an U-shaped holder 561.

FIG. 51 shows a perspective view of the open slider 560, the connecting band 306 and the U-shaped holder 561.

Figure 52:
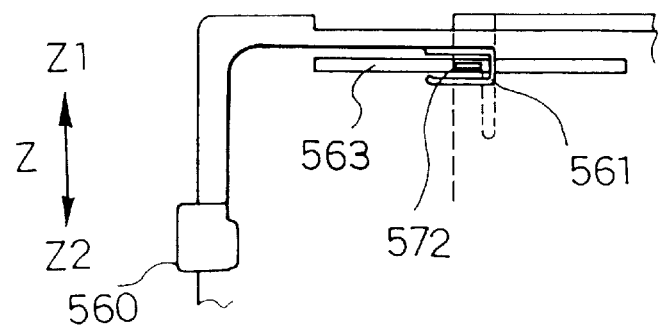
FIG. 52 shows a state where the shutter 304 of Embodiment 11 is opened.

FIG. 52 shows a state where the shutter 304 is opened.

Figure 53:
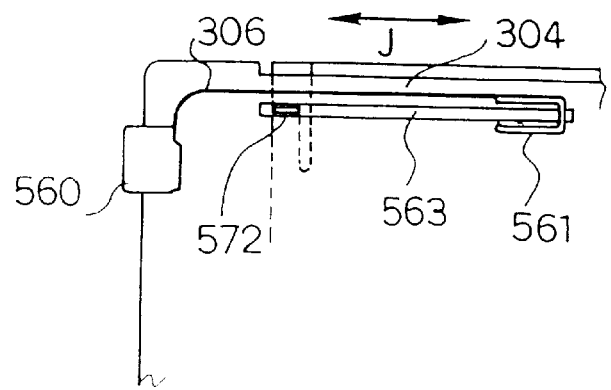
FIG. 53 shows a state where the shutter 304 of Embodiment 11 alone is opened.

FIG. 53 shows a state where the shutter 304 alone is slid.

The U-shaped holder 561 and the open slider 560 are connected by the connecting band 306. The open slider 560 is mounted movably in the direction of the arrow Z. The U-shaped holder 561 is U-shaped. As shown in FIG. 44, the shutter 304 has a shutter open tongue 572 on the other end. When the U-shaped holder 561 and the shutter open tongue 572 are engaged only in one direction and cannot be engaged with the other end, the following operation will be performed.

That is, as shown in FIG. 52, when the open slider 560 moves in the direction of the arrow Z2, the shutter 304 is opened by engagement of the U-shaped holder 561 and the shutter open tongue 572. When the open slider 560 returns in the direction of the arrow Z1, the shutter 304 is closed by the return spring 324.

As shown in FIG. 53, when only the shutter 304 moves in the direction of the arrow J, engagement of the U-shaped holder 561 and the shutter open tongue 572 is released and the open slider 560 and the U-shaped holder 561 do not move at all. That is, only the shutter 304 moves in the direction of the arrow J.

Thus, when engagement of the U-shaped holder 561 and the shutter open tongue 572 is released and the shutter 304 alone moves in the direction of the arrow J, it is possible to prevent the connecting band 306 from being destroyed. When only the shutter 304 is moved in the direction of the arrow J by the operator, if engagement of the U-shaped holder 561 and the shutter open tongue 572 is not released, the connecting band 306 may be warped. If the open slider 560 does not move in the direction of the arrow Z2 according to the warp, it will be in danger of bending. In order to prevent the connecting band 306 from bending, engagement of the U-shaped holder 561 and the shutter open tongue 572 should be released. Therefore, the holder has to be U-shaped.

Figure 54:
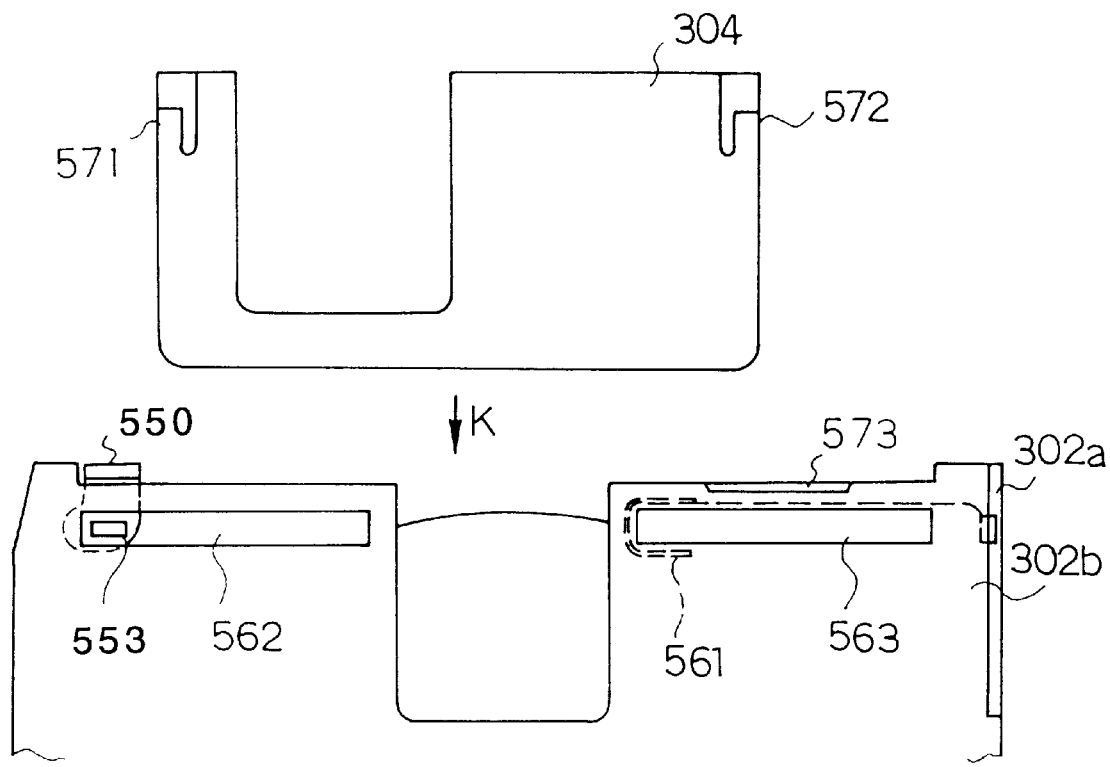
FIG. 54 shows a method of mounting the shutter 304 of Embodiment 11.
Figure 55:
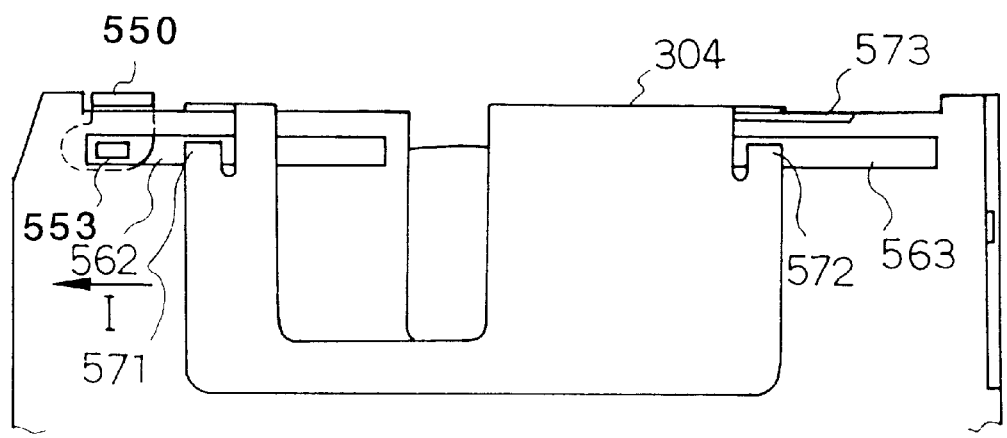
FIG. 55 shows a method of mounting the shutter 304 of Embodiment 11.

With reference to FIGS. 54 and 55, a method of mounting the shutter 304 is explained.

FIG. 54 shows a state where the case member 302*a* and the case member 302*b* are already constructed. Under the state, the shutter 304 is inserted from the direction of the arrow K. At the edge of the case member 302*b*, the taper 573 is provided and the shutter open tongue 572 is easy to be inserted. Under the state of FIG. 54, the U-shaped holder 561 is placed in the center of the recording medium cartridge 300. Further, the latch lever 530 should be placed at the end of the recording medium cartridge 300. Under such condition, when the shutter 304 is inserted, a state of FIG. 55 is provided. Namely, the shutter open tongue 572 is inserted to the open slide slit 563 and the shutter return tongue 571 is inserted into the return slide slit 562.

Under the state of FIG. 55, the shutter 304 is moved in the direction of the arrow I. By moving of the shutter 304 in the direction of the arrow I, as shown in FIG. 45, the shutter return tongue 571 and the slider hole 553 are engaged.

As has been described, assembly of the shutter 304 is completed by inserting the shutter 304 in the direction of the arrow K and sliding in the direction of the arrow I. Accordingly, assembly of the recording medium cartridge 300 of the present embodiment is greatly improved.

The following is an explanation of a hub of the present embodiment.

FIG. 56 shows a shape of the hub.

A hub 303*e* has the position setting hole 360 and the driving hole 361. The driving hole 361 has a slanted line side 590 continuously existing from the position setting hole 360. Further, the driving hole 361 has an opposite line side 591. The opposite line side 591 is almost in parallel with the slanted line side 590. FIG. 56B shows the position setting hole 360 and the driving hole 361 already shown in FIG. 8B. FIG. 56C shows the position setting hole 360 and the driving hole 361 in this embodiment.

As shown in FIG. 56B, the drive pin 430 has to be placed in the length L1, so that the drive pin 430 is inserted into the driving hole 361. As shown in FIG. 56C, the drive pin 430 has to be placed in the length L2, so that the drive pin 430 is inserted into the driving hole 361. Since L2 has a larger value compared with L1, it is possible to reduce the possibility of miss catch of the drive pin 430.

Embodiment 12

In the present embodiment, an improved recording medium drive actuator will be described.

At first, structure of the shaft 480 and the drive pin 430 is described.

FIG. 57A shows a plan view of the shaft 480 and the drive pin 430 when they are assembled.

FIG. 57B shows a side view of the shaft 480 and the drive pin 430 when they are assembled.

FIG. 57C shows a plan view of the shaft 480 and the drive pin 430 before they are assembled.

FIG. 57D shows a side view of the shaft 480 and the drive pin 430 before they are assembled.

The shaft 480 and the drive pin 430 have a concavity and a convexity which can be engaged in the vertical direction. Therefore, when the shaft 480 is moved in the vertical direction, the drive pin 430 also moves in the same direction. As has been shown in FIG. 2, the shaft 480 has the notch where the drive pin 430 is engaged. As shown in FIG. 57, it is not necessary for the shaft 480 to form the notch. Therefore, it is easy to manufacture the shaft 480. If the shaft 480 and the drive pin 430 have the structure as shown in FIG. 57, the shaft 480 and the drive pin 430 can rotate respectively. Therefore, it is possible to eliminate partial abrasion which occurs at the portions of the shaft 480 and the drive pin 430 where the hub contacts.

Next, a case where the recording medium drive actuator is easy to assemble is shown.

Figure 58:
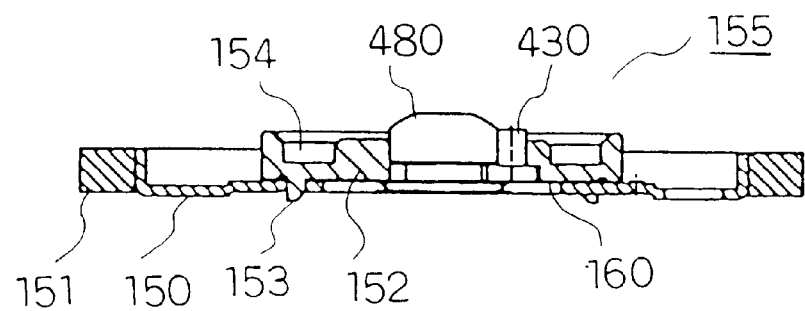
FIG. 58 shows a cross sectional view of the spindle part 155 of Embodiment 12.

FIG. 58 shows a cross sectional view of the spindle part 155.

Figure 59:
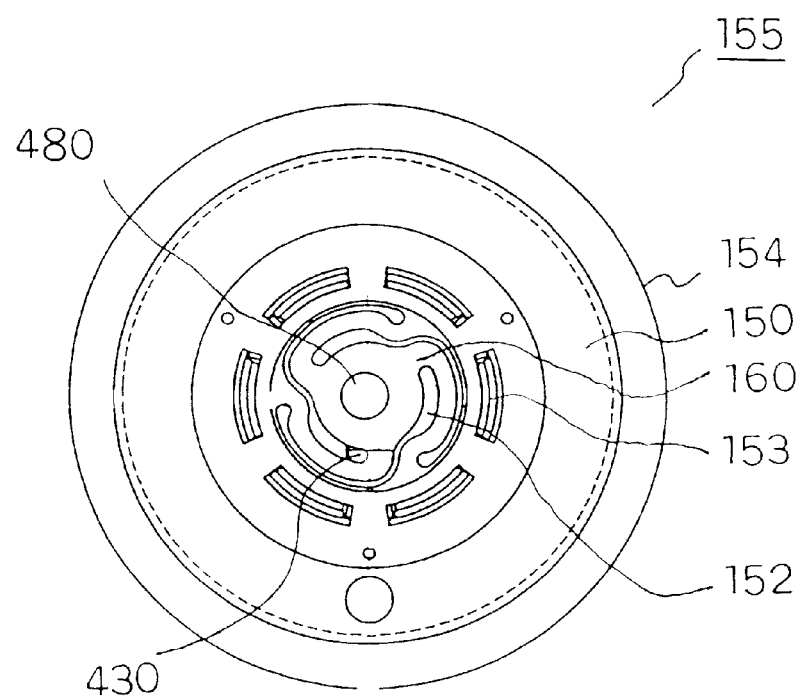
FIG. 59 shows a bottom view of the spindle part 155 of Embodiment 12.

FIG. 59 shows a bottom view of the spindle part 155.

Figure 60:
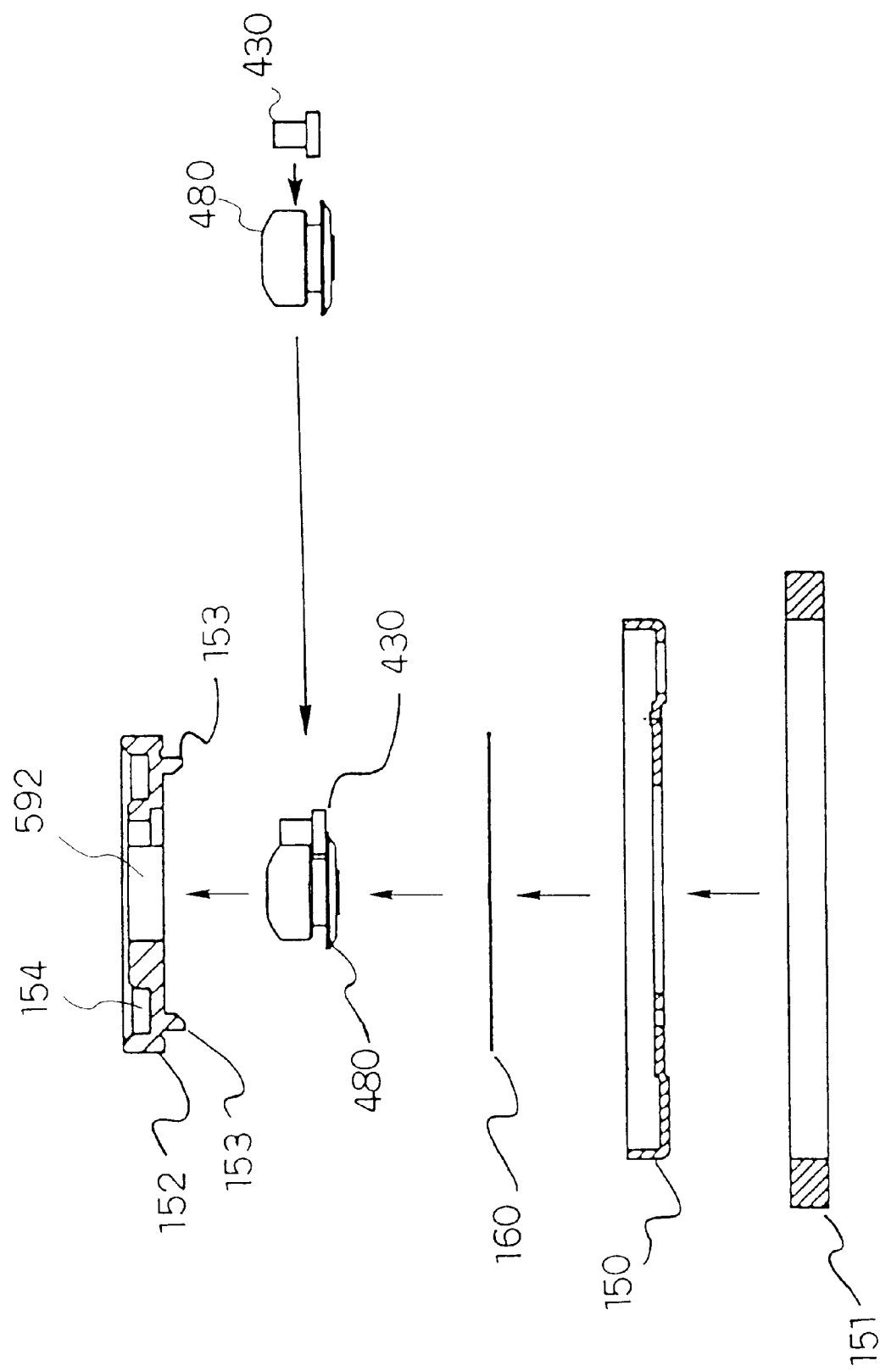
FIG. 60 shows each element of the spindle part 155 of Embodiment 12.
Figure 61:
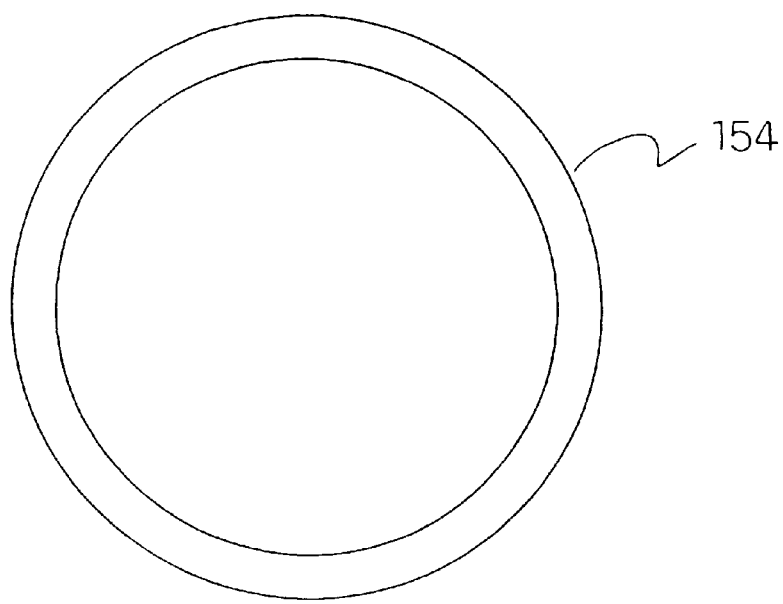
FIG. 61 shows a bottom view of elements of Embodiment 12.
Figure 62:
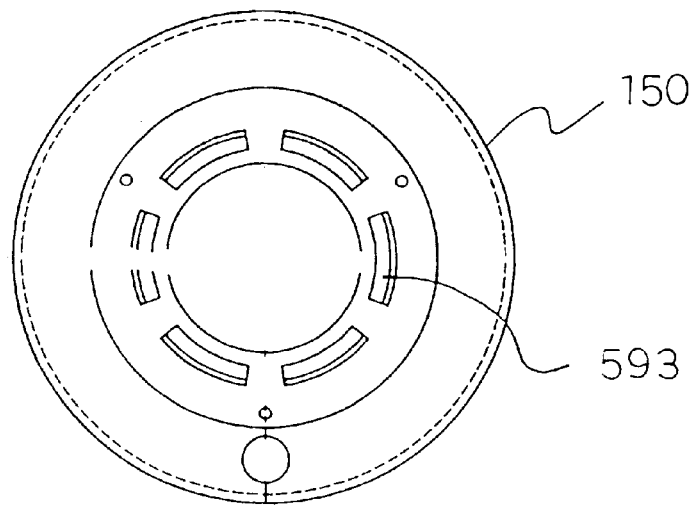
FIG. 62 shows a bottom view of elements of Embodiment 12.
Figure 63:
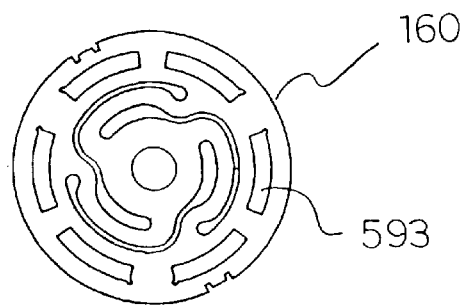
FIG. 63 shows a bottom view of elements of Embodiment 12.
Figure 64:
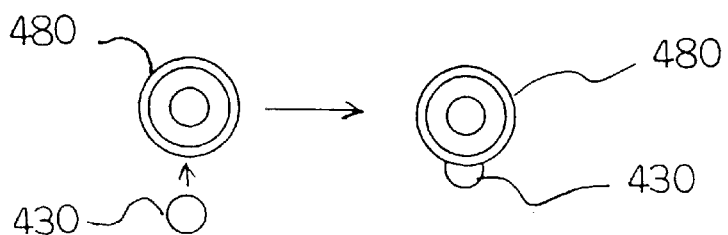
FIG. 64 shows a bottom view of elements of Embodiment 12.
Figure 65:
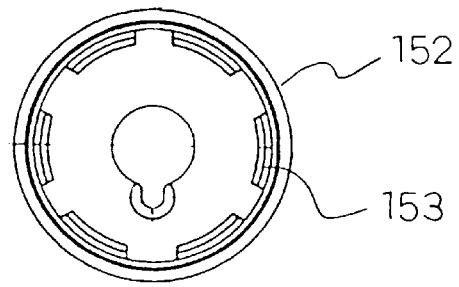
FIG. 65 shows a bottom view of elements of Embodiment 12.

FIG. 60 shows the parts of the spindle part 155.

FIGS. 61 to 65 are bottom views of the parts.

A chucking table 152 has the magnet member 154 and a plurality of projections 153. It also has an insertion hole 592 for inserting the shaft 480 and the drive pin 430. A gimbal spring 160 and a rotor 150 have a plurality of holes 593 for passing the projections 153. These parts are assembled in order as shown in FIG. 60 so as to build the spindle part 155. That is, the drive pin 430 and the shaft 480 are assembled and inserted into the insertion hole 592. The gimbal spring 160 and the rotor 150 are coupled to the chucking table 152, so that the projections 153 match with the holes 593. By crushing the projection 153, the gimbal spring 160 and the rotor 150 are fixed on the chucking table 152. And, the rotor 150 and the magnet 151 are fixed.

Thus, the gimbal spring 160 is fixed between the chucking table 152 and the rotor 150. Any extra part for fixing the gimbal spring 160 is not required. Further, it is possible to assemble the parts simultaneously.

Figure 66:
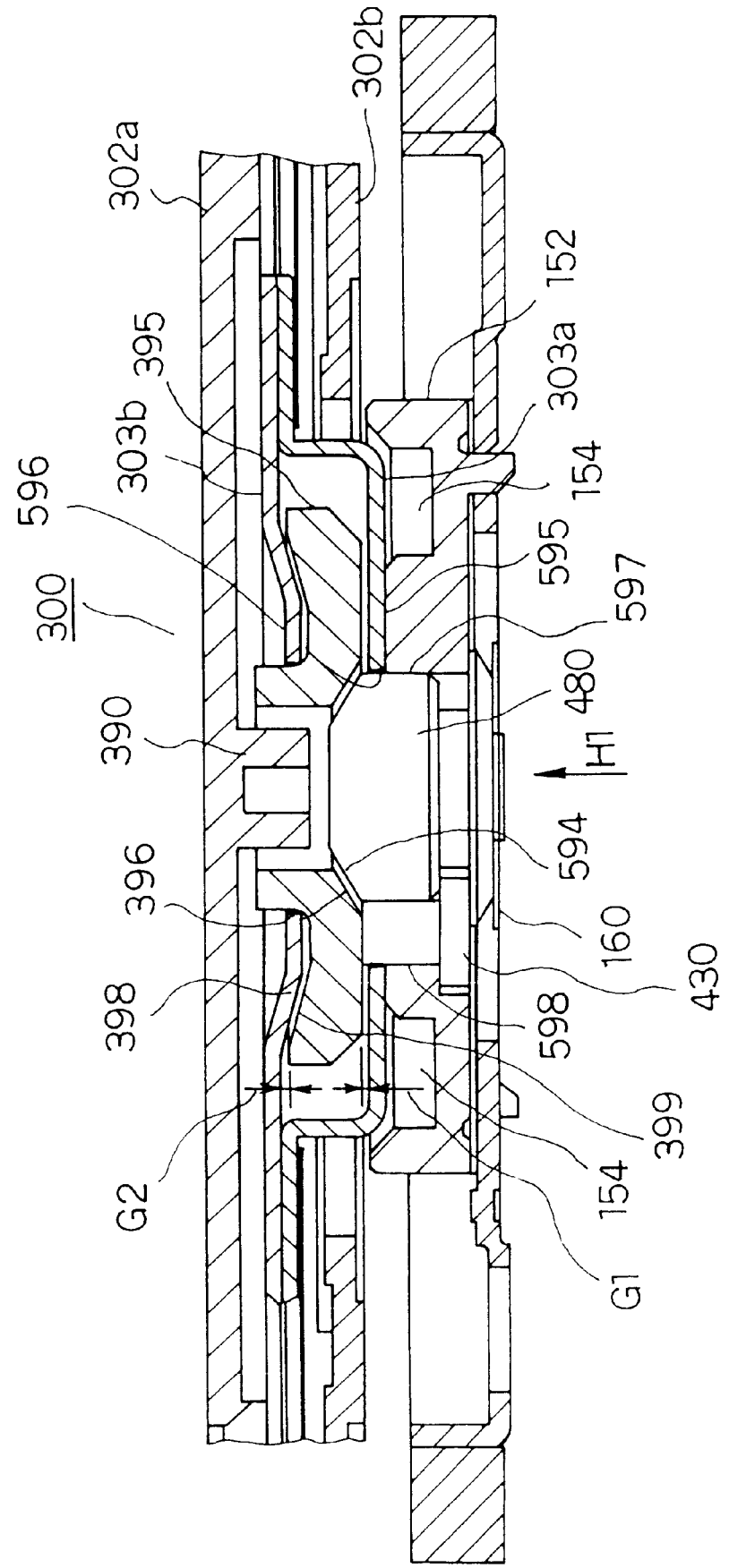
FIG. 66 shows a chucking time of the recording medium cartridge 300 of Embodiment 12.
Figure 67:
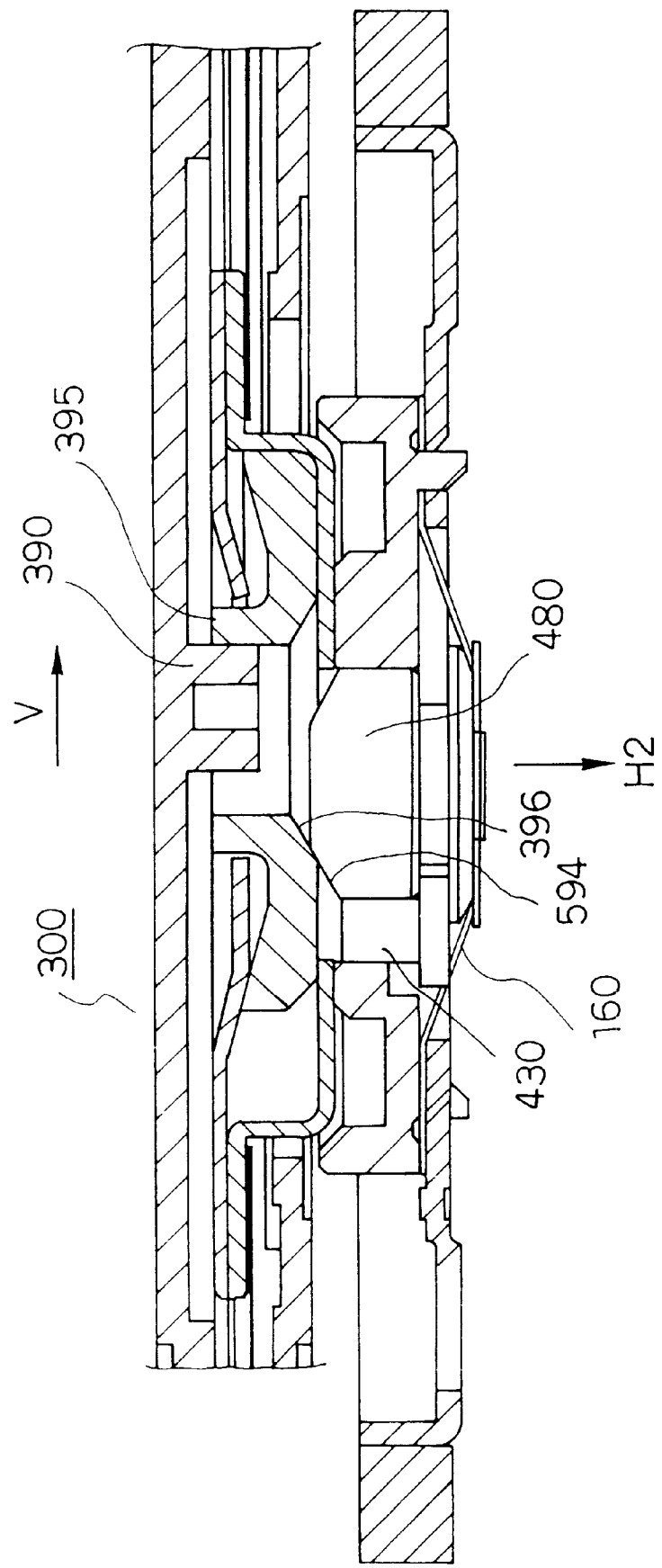
FIG. 67 shows a chucking release operation of the recording medium cartridge 300 of Embodiment 12.

FIGS. 66 and 67 show a releasing mechanism of the chucking.

It is characterized in that the slide member 395 has a slide member taper 399 and the cover member 303b has a hub taper 398.

FIG. 66 shows a chucking state of the recording medium cartridge 300. The shaft 480 combined with the drive pin 430 is pushed up by the gimbal spring 160 in the direction of the arrow H1 and inserted and engaged to the chucking table 152. The mounting member 303a of the hub 303 is on the hub bed 595 of the chucking table 152 and pulled out in the direction of the arrow H2 by the magnetic force of the magnet member 154. Cylindrical part (vertically straight part) 597 and 598 of the shaft 480 and the drive pin 430 are engaged in a hole end 596 of the mounting member 303a of the hub 303. In the room between the mounting member 303a and the cover member 303b of the hub 303, the slide member 395 is mounted movably in the horizontal direction. The slide member 395 can move in parallel to the surface of the hub bed 595 and the ejecting direction of the recording medium cartridge 300. In order to make the slide member 395 movable, gaps G1 and G2 have to be provided "between the mounting member 303a of the hub 303 and the slide member 395" and "between the cover member 303b of the hub 303 and the slide member 395" respectively. The gap lengths of gaps G1 and G2 are defined according to the size setting of the mounting member 303a and the cover member 303b of the hub 303 and the slide member 395. The gaps G1 and G2 are provided so that the slide member 395 is movable in the horizontal direction.

FIG. 67 shows a release operation of the chucked recording medium cartridge 300.

The recording medium cartridge 300 is moved in the direction of the arrow V, the ejecting direction. The slide member 395 is moved in the ejecting direction by the restriction member 390 of the case member 302a. During the operation, the shaft 480 and the drive pin 430 are pushed in the direction of the arrow H2 because the sloped face of the taper shaped hole 396 of the slide member 395 moves in the ejecting direction contacting with a spherical surface 594 of the shaft 480. When the shaft 480 and the drive pin 430 are lowered, the engagement of the hole end 596 of the mounting member 303a of the hub 303 and the cylindrical parts 597 and 598 of the shaft 480 and the drive pin 430 is released. Then, the mounting member 303a, the cover member 303b of the hub 303 and the slide member 395 can be moved in the ejecting direction as well as the recording medium cartridge 300. The gaps G1 and G2 are provided between the mounting member 303a of the hub 303 and the slide member 395 and between the cover member 303b of the hub 303 and the slide member 395. The gaps G1 and G2 are needed in order to move the slide member 395 in the horizontal direction and not needed in order to lower the shaft 480. Because, when the sloped face of the taper shaped hole 396 of the slide member 395 contacts the spherical surface 594 of the shaft 480 and lowers the shaft 480, the slide member 395 is pressed to move in the direction of the arrow H1 by the pressure of the gimbal spring 160. The slide member 395 moves toward the cover member 303b of the hub 303 by a gap G2 provided between the cover member 303b of the hub 303 and the slide member 395. As the result, the vertical positional relation of the shaft 480 and the slide member 395 fluctuates because of the existence of the gap G2. A hub taper 398 and a slide member taper 399, which are sloped parts on the cover member 303b of the hub 303 and the slide member 395, are formed to cancel the existence of the gaps. When the shaft 480 is lowered by the slide member 395, the slide member 395 is pressed by the hub taper 398 and the slide member taper 399 in the direction of the arrow H2 to make a contact with the mounting member 303a of the hub 303.

Thus, since the slide member 395 and the cover member 303b have a sloped part, even though each of the mounting member 303a, the cover member 303b and the slide member 395 has variation in size, it is possible for the slide member 395 to move freely in the horizontal direction and to lower the shaft 480 surely. When the slide member 395 and the cover member 303b do not have the slide member taper 399 and the hub taper 398, namely as shown in FIG. 1, the gaps G1 and G2 remain between the cover member 303b and the slide member 395. As has been described, the gaps G1 and G2 disturb the taper shaped hole 396 to lower the shaft 480. In order to eliminate the gap as much as possible, the hub taper 398 and the slide member taper 399 are provided. That is, the hub taper 398 and the slide member taper 399 are provided so that the slide member 395 is prohibited to move up and down when the slide member 395 moves in the horizontal direction at the time of the ejection of the recording medium cartridge 300.

In FIGS. 68 to 71, another case of the shaft 480 is shown.

Figure 72:
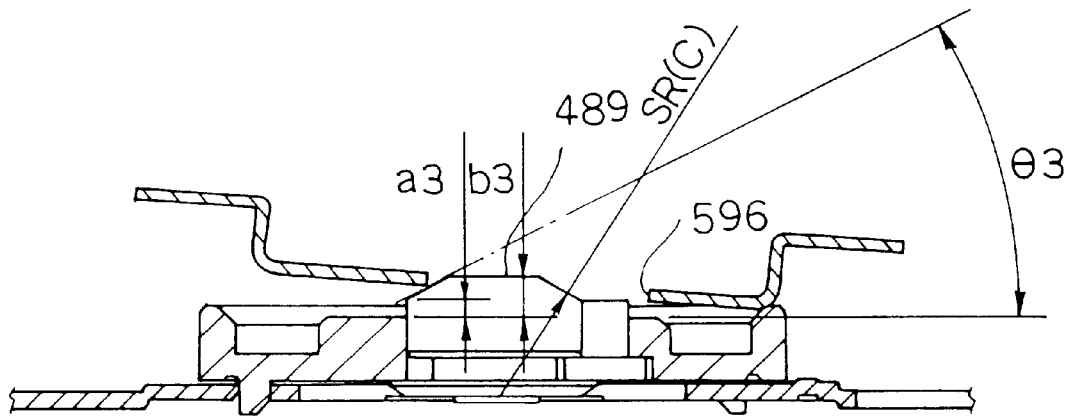
FIG. 72 shows a state where the member 303a of the mounting side of the hub 303 of the shaft 480 is lifted up on the sphere of the shaft 480 of Embodiment 12.
Figure 73:
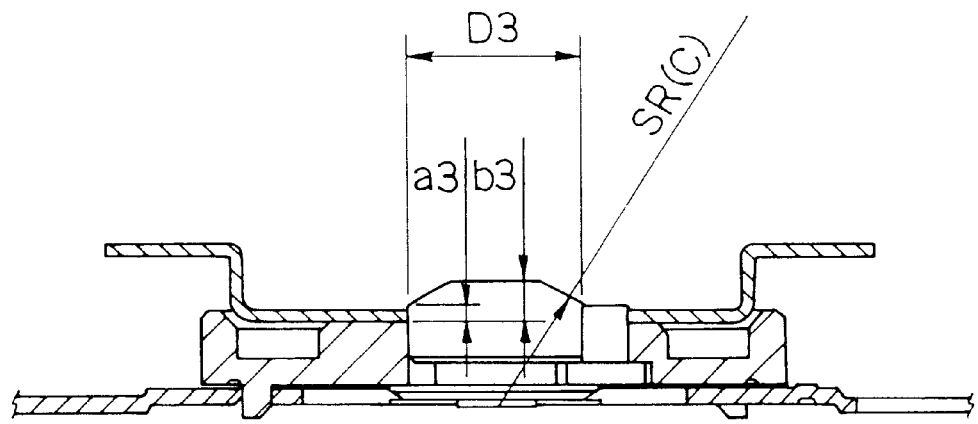
FIG. 73 shows a state where the member 303a of the mounting side of the hub 303 is chucked to the shaft 480 of Embodiment 12.

It is characterized that a shaft of FIGS. 72 to 73 has a plain part 489.

Figure 68:
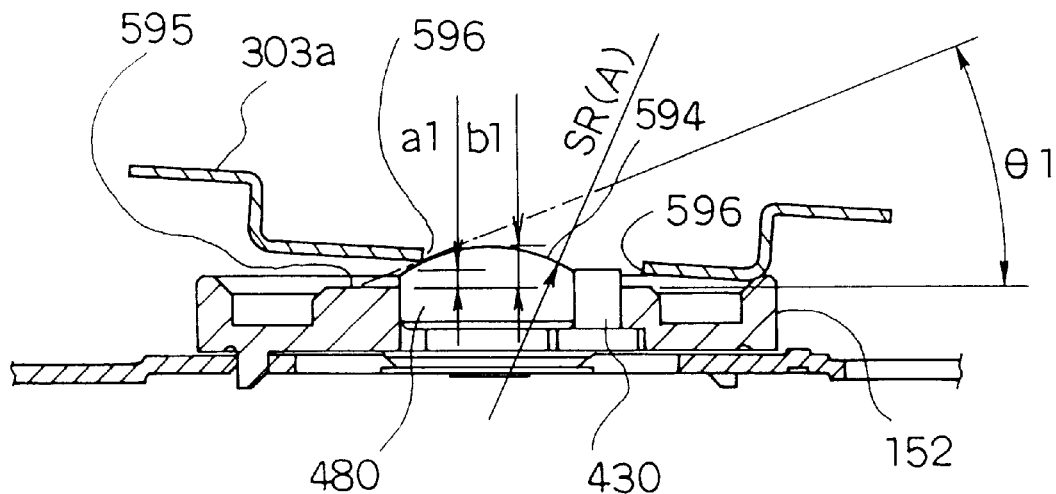
FIG. 68 shows a state where the member 303a of the mounting side of the hub 303 is lifted up on the sphere of the shaft 480 of Embodiment 12.

FIG. 68 shows a state where the mounting member 303a of the hub 303 is lifted up over the spherical surface of the shaft 480 of Embodiment 1.

Figure 69:
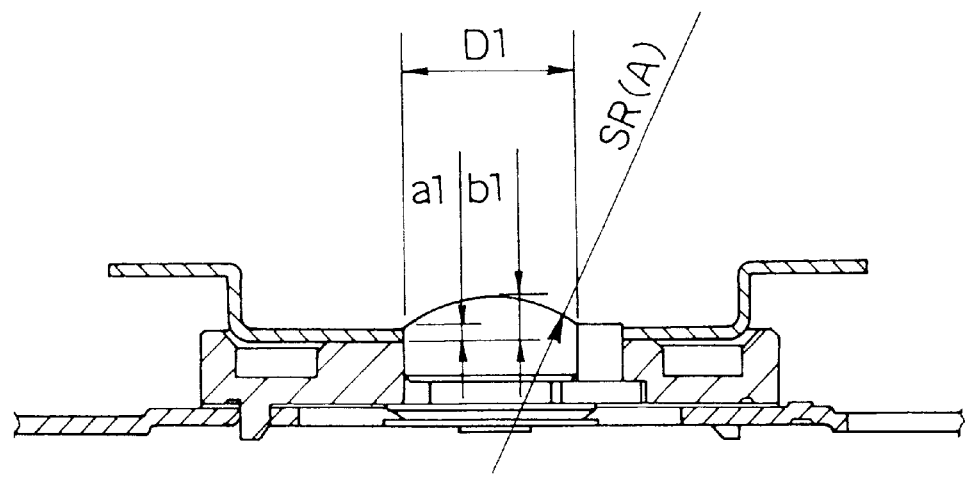
FIG. 69 shows a state where the member 303a of the mounting side of the hub 303 is chucked to the shaft 480 of Embodiment 12.

FIG. 69 shows a state where the mounting member 303a of the hub 303 has chucked to the shaft 480 of Embodiment 12.

Figure 70:
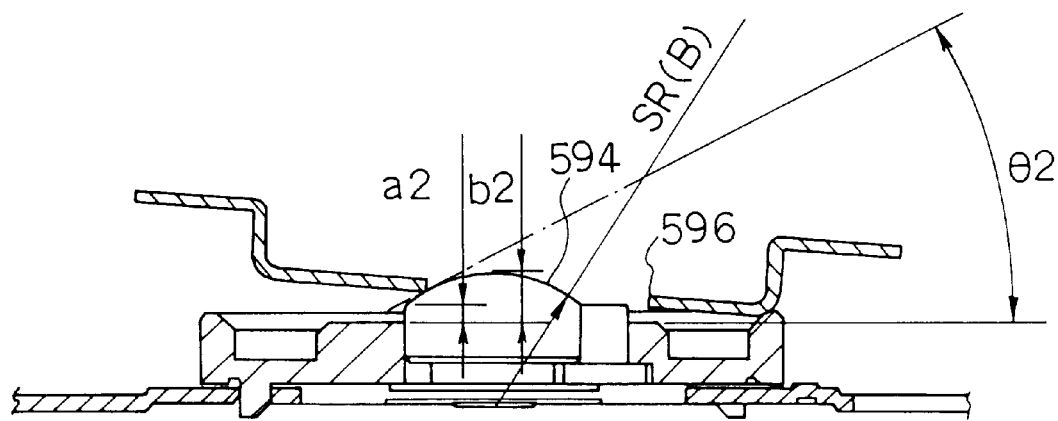
FIG. 70 shows a case where SR (sphere radius) of sphere 594 of the shaft 480 of Embodiment 12 is reduced.
Figure 71:
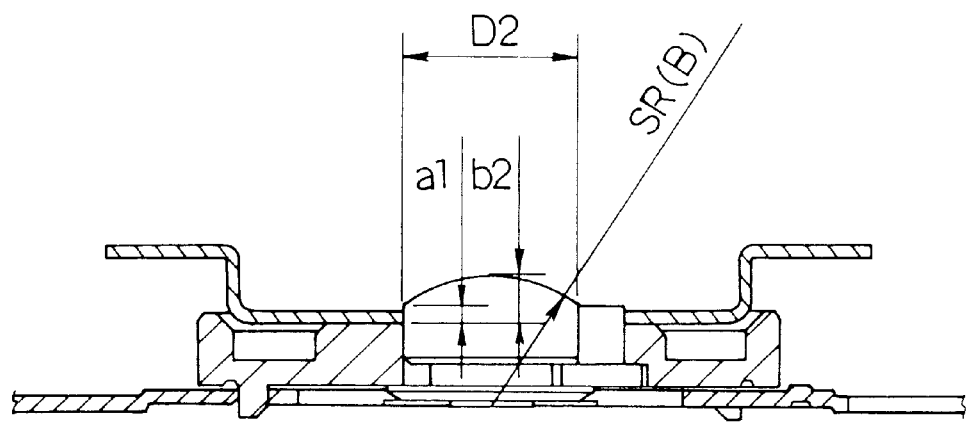
FIG. 71 shows a case where SR (sphere radius) of sphere 594 of the shaft 480 of Embodiment 12 is reduced.

FIGS. 70 and 71 show a case where a spherical radius SR of the spherical surface 594 of the shaft 480 of FIGS. 68 and 69 is reduced.

FIG. 72 shows a state where the mounting member 303a of the hub 303 is on the spherical surface of the shaft 480 having the plain part 489.

FIG. 73 shows a state where the mounting member 303a of the hub 303 has chucked to the shaft 480 having the plain part 489.

When the SR (Spherical Radius) of the spherical surface 594 is reduced (SR(B)<SR(A)), it is possible for the mounting member 303a of the hub 303 to be mounted onto the hub bed easily ($\theta 2 > \theta 1$). Here, when the length of cylindrical part contacted with the hole end 596 of the mounting member 303a of the hub 303 is assumed that "length "a2" of the cylindrical part contacted with the hole end 596=length "a1" of the cylindrical part contacted with the hole end 596", an amount of the projection from the hub bed 595 of the shaft 480 (amount "b2" of projection>amount "b1" of projection) is getting larger when the SR is reduced. That means, the height of the removable storage device gets bigger.

Then, as shown in FIGS. 72 and 73, because the plain part 489 is provided on the top (end part) of the shaft 480, under the conditions of "the amount "b3" of projection=the amount "b1" of projection", and "SR(C)<SR(A) and $\theta 3 > \theta 1$", it is possible for the mounting member 303a of the hub 303 to be mounted onto the hub bed 595 easily. That is, when length "a3" of the cylindrical part contacted with the hole end 596 length "a1" of the cylindrical part contacted with the hole end 596, amount "b3" of projection=amount "b1" of projection, diameter "D3" of the shaft 480=diameter "D1" of the shaft 480, and $\theta 3 > \theta 1$ (SR(C)<SR(A)), the plain part 489 is provided so as to easily mount the mounting member 303a of the hub 303 onto the hub bed 595.

Embodiment 13

An improved example of Embodiment 8 will be described, where "disk in/out" is detected and "write protect" is detected.

Figure 74:
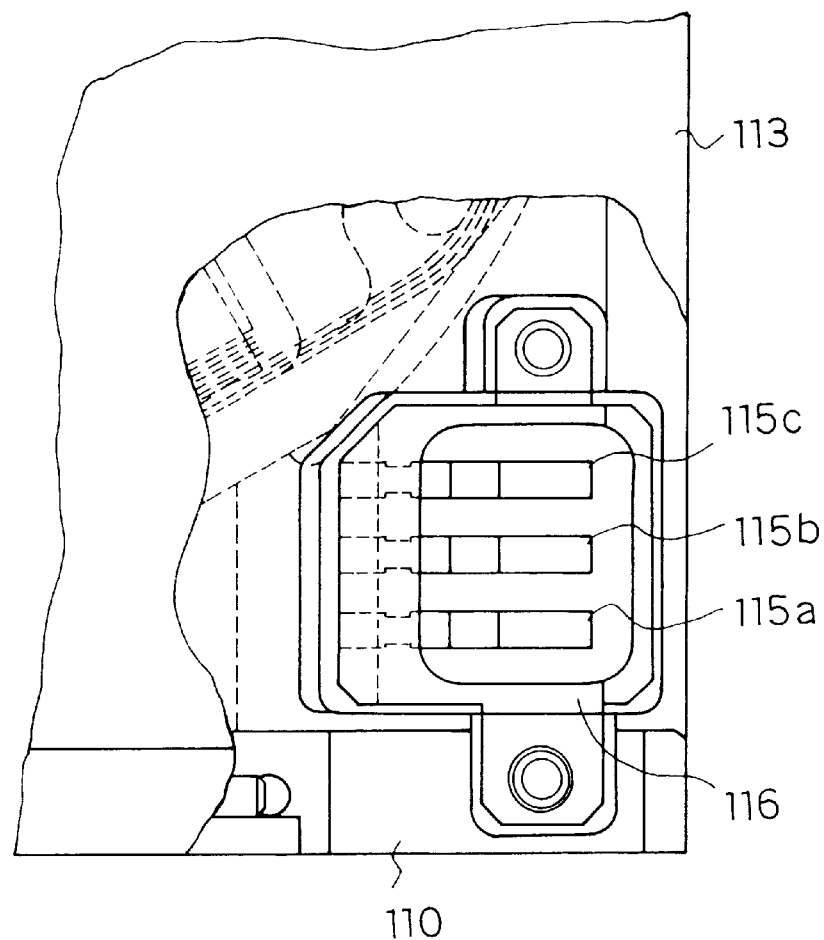
FIG. 74 shows a plan view of the switch holder 116 of the removable storage device 100 when the recording medium cartridge 300 of Embodiment 13 is not carried.

FIG. 74 shows a plan view of the switch holder 116 of the removable storage device 100 when the recording medium cartridge 300 is not carried on.

Figure 75:
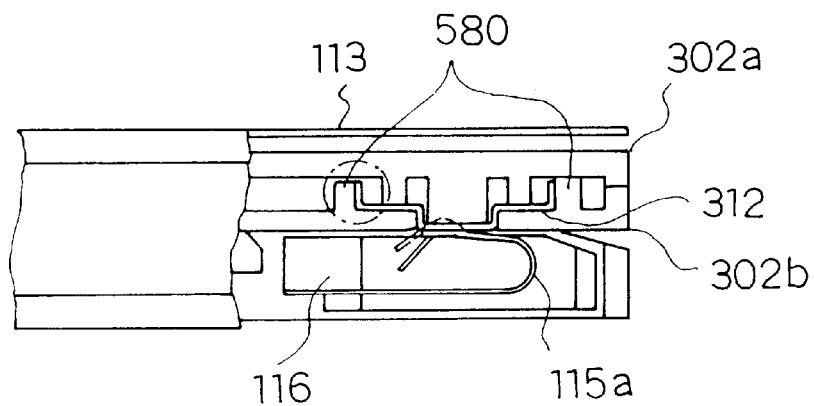
FIG. 75 shows a side view of the switch holder 116 of the removable storage device 100 when the recording medium cartridge 300 of Embodiment 13 is not carried.

FIG. 75 shows a side view of the switch holder 116 and the recording medium cartridge 300.

Figure 76:
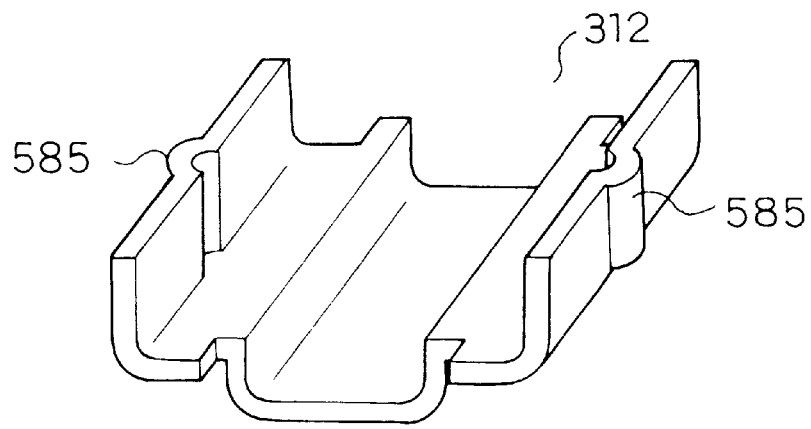
FIG. 76 shows a perspective view of the conductive metal plate 312 of Embodiment 13.

FIG. 76 shows a perspective view of the conductive metal plate 312.

Figure 77:
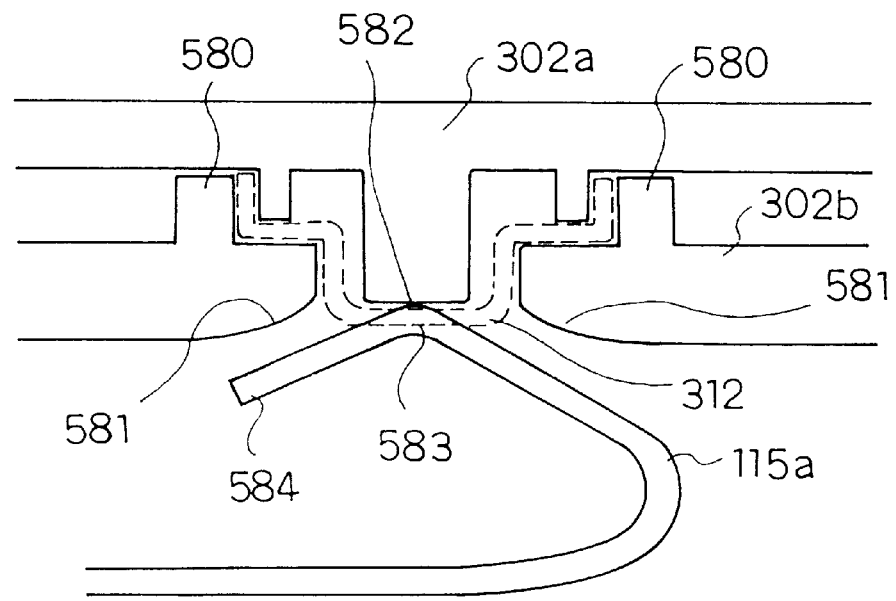
FIG. 77 shows a side view of the recording medium cartridge when the conductive metal plate 312 is not provided in Embodiment 13.

FIG. 77 shows a side view of the recording medium cartridge 300 when the conductive metal plate 312 is not mounted.

Figure 78:
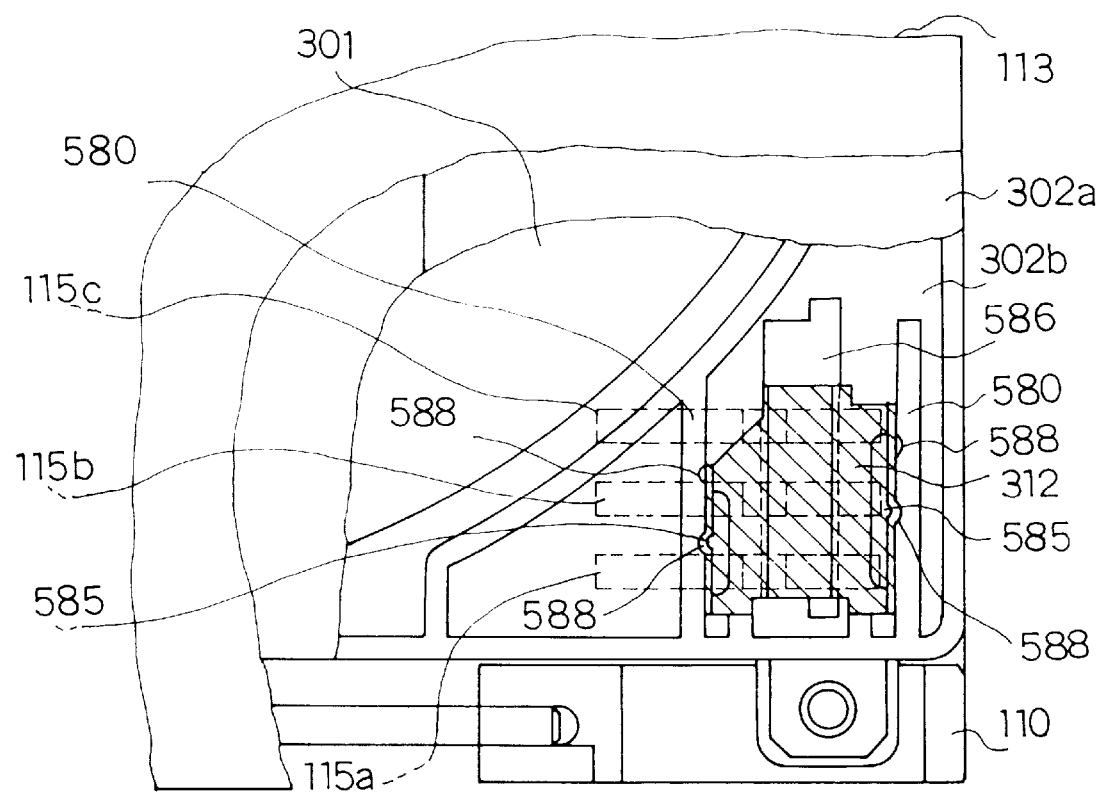
FIG. 78 shows a "write protect OFF" state of Embodiment 13.

FIG. 78 shows a "write protect OFF" state.

Figure 79:
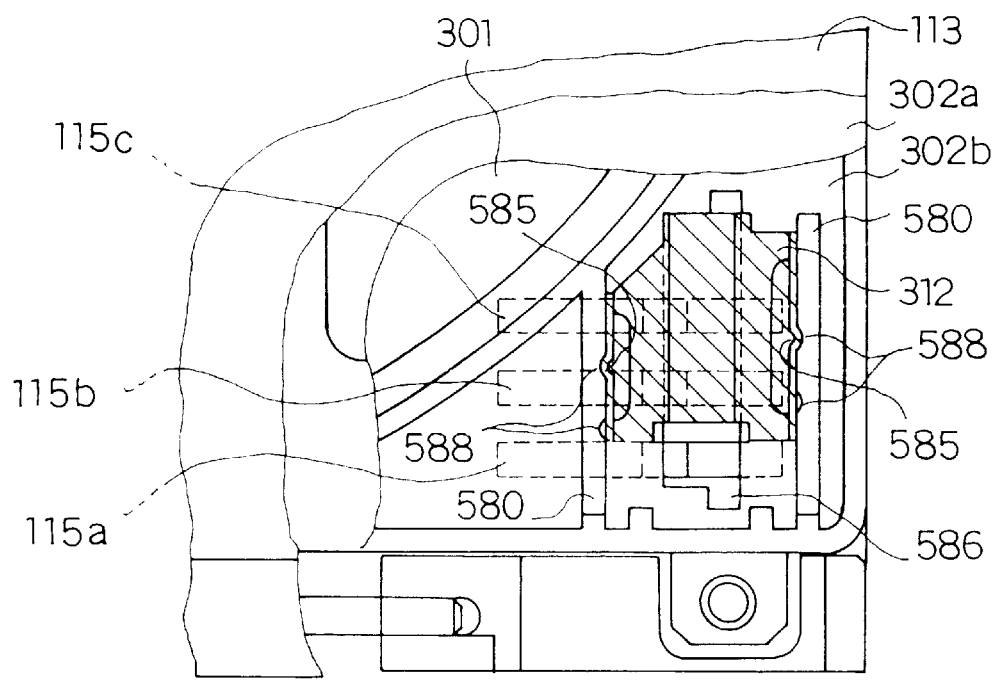
FIG. 79 shows a "write protect ON" state of Embodiment 13.

FIG. 79 shows a "write protect ON" state.

FIG. 80 shows a principle explanatory view.

FIG. 81 shows a state table.

A switch holder 116 has three contact terminals 115a, 115b and 115c. The recording medium cartridge 300 has a hole 586. A conductive metal plate 312 is mounted in the hole 586 and able to slide. The bottom part of the conductive metal plate 312 is exposed through the hole. There are two cases depending on the location of the conductive metal plate 312 as shown in FIGS. 78 and 79. Three terminals are all connected in FIG. 78. The contact terminals 115b and 115c are connected in FIG. 79. The conductive metal plate 312 is fitted between two walls 580. Accordingly, the conductive metal plate 312 is held steadily to the case member 302b until the combination with the case member 302a at the time of assembling the recording medium cartridge 300. The conductive metal plate 312 has a metal plate latch 585. The walls 580 have wall latches 588. It is possible to prevent to make an unnecessary gap or slippage in case of fitting the conductive metal plate 312 between the walls 580 by matching the metal plate latches 585 and the wall latches 588. Further, it is possible to create a click when the conductive metal plate is slid. As shown in FIG. 77, the case member 302b has a taper 581. The taper 581 is provided so that a top 584 of the contact terminal 115a will not be hooked on the edge of the case member 302b when the conductive metal plate 312 is slid and the contact terminal 115a and the convexity 582 are touched, as shown in FIG. 79.

FIGS. 80A, 80B, 80C and 81 are principle views where "disk in/out" state and "write protect ON/OFF" state is detected based on the above described configuration.

Figure 80A:
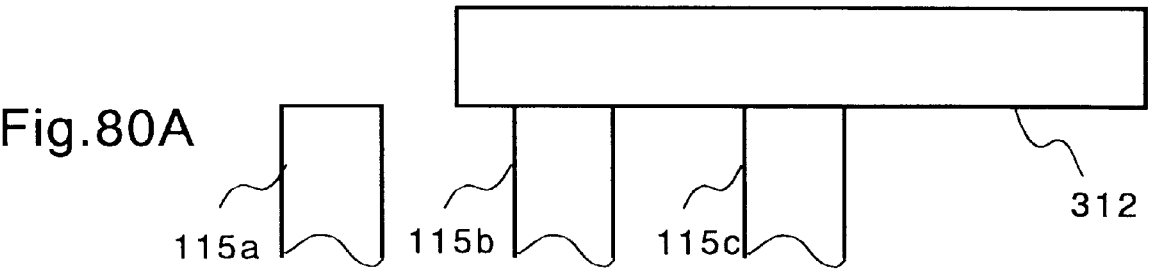
FIG. 80A shows a principle explanatory view of Embodiment 13.
Figure 80B:
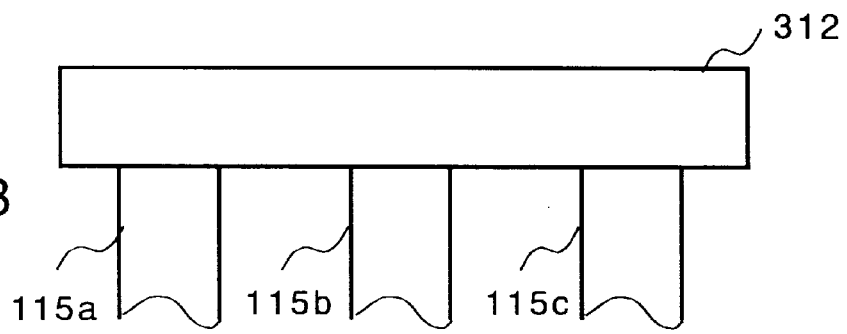
FIG. 80B shows a principle explanatory view of Embodiment 13.
Figure 80C:
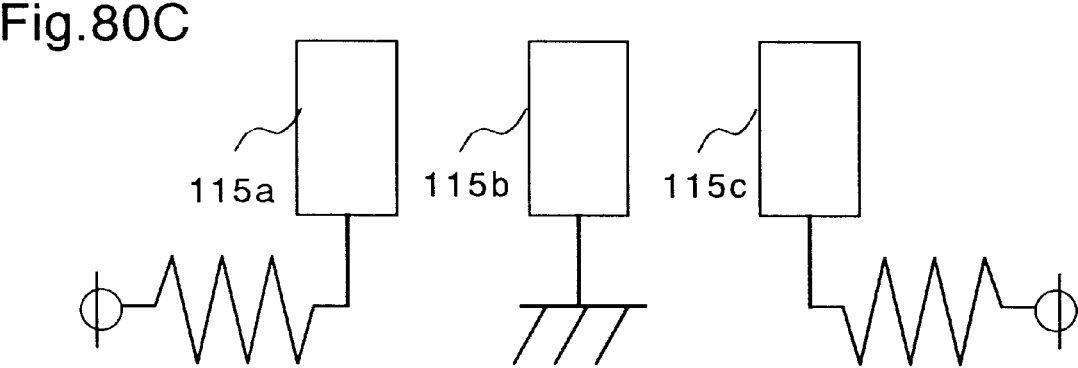
FIG. 80C shows a principle explanatory view of Embodiment 13.
Figure 82:
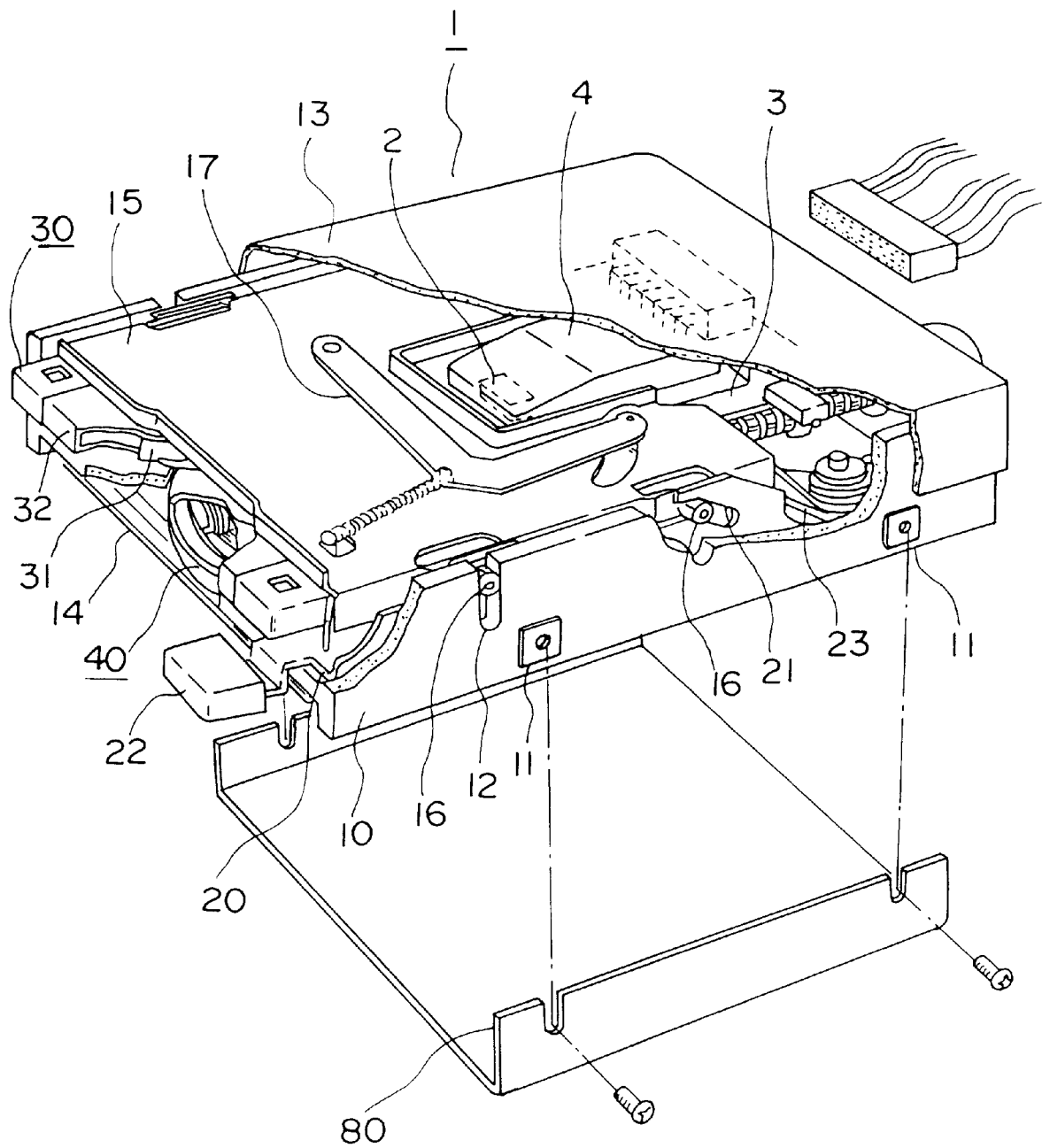
FIG. 82 shows an essential broken perspective view showing related art.
Figure 83:
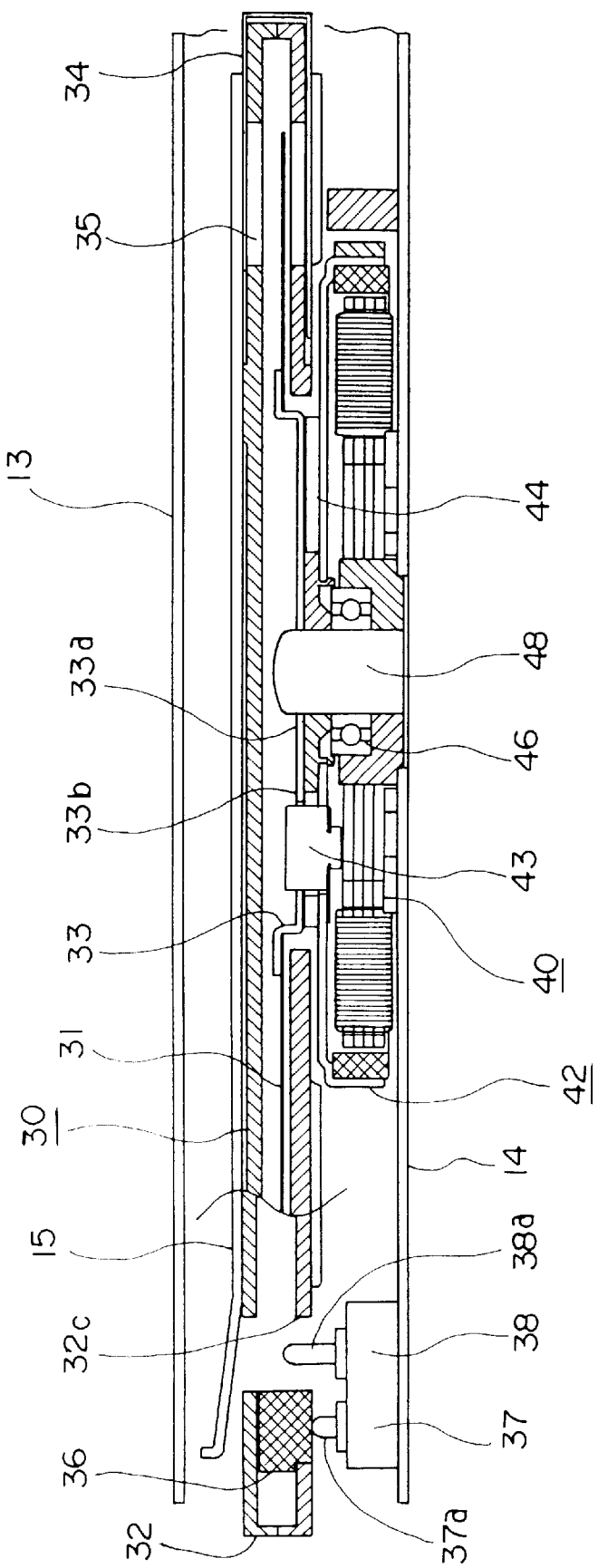
FIG. 83 shows an essential transverse cross sectional view of related art.
Figure 84:
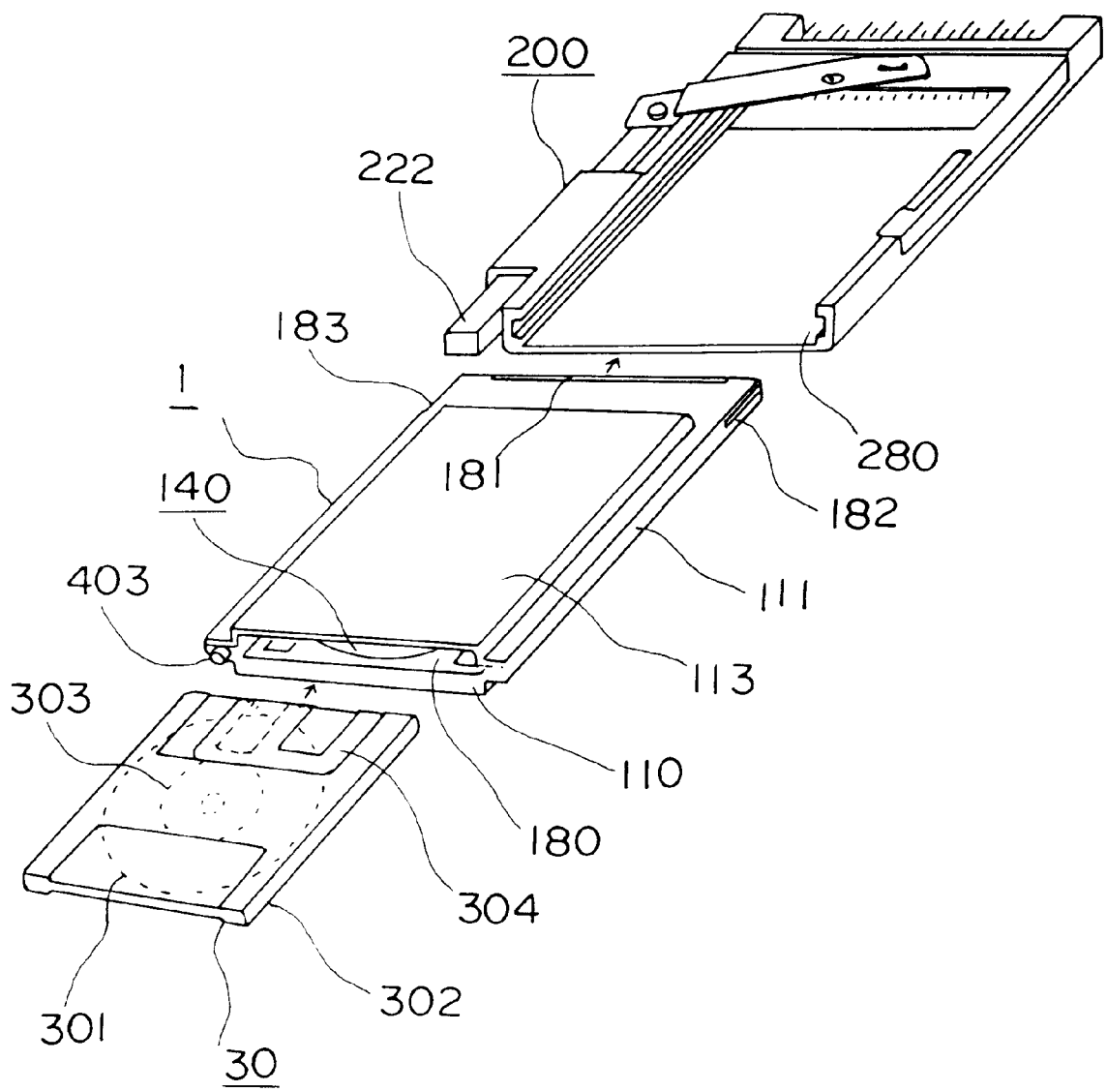
FIG. 84 shows a perspective view of related arts.
Figure 85:
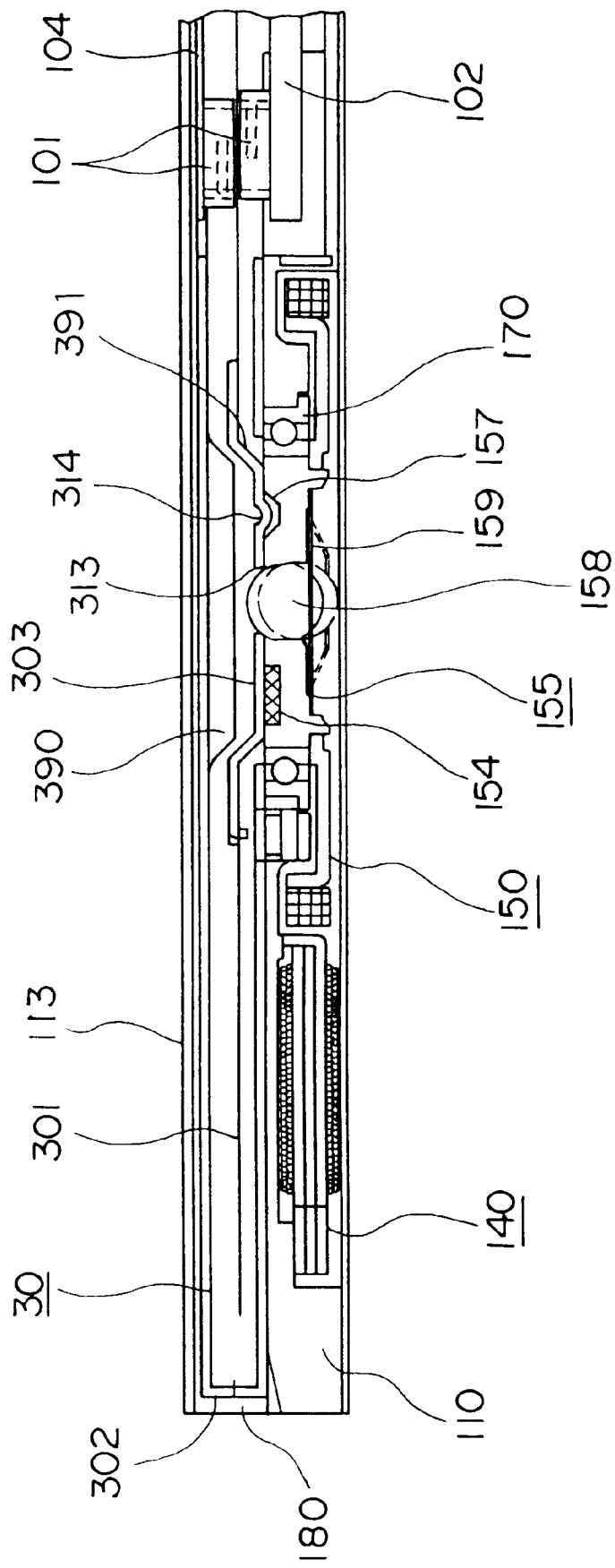
FIG. 85 shows an essential transverse cross sectional view of related art.
Figure 86:
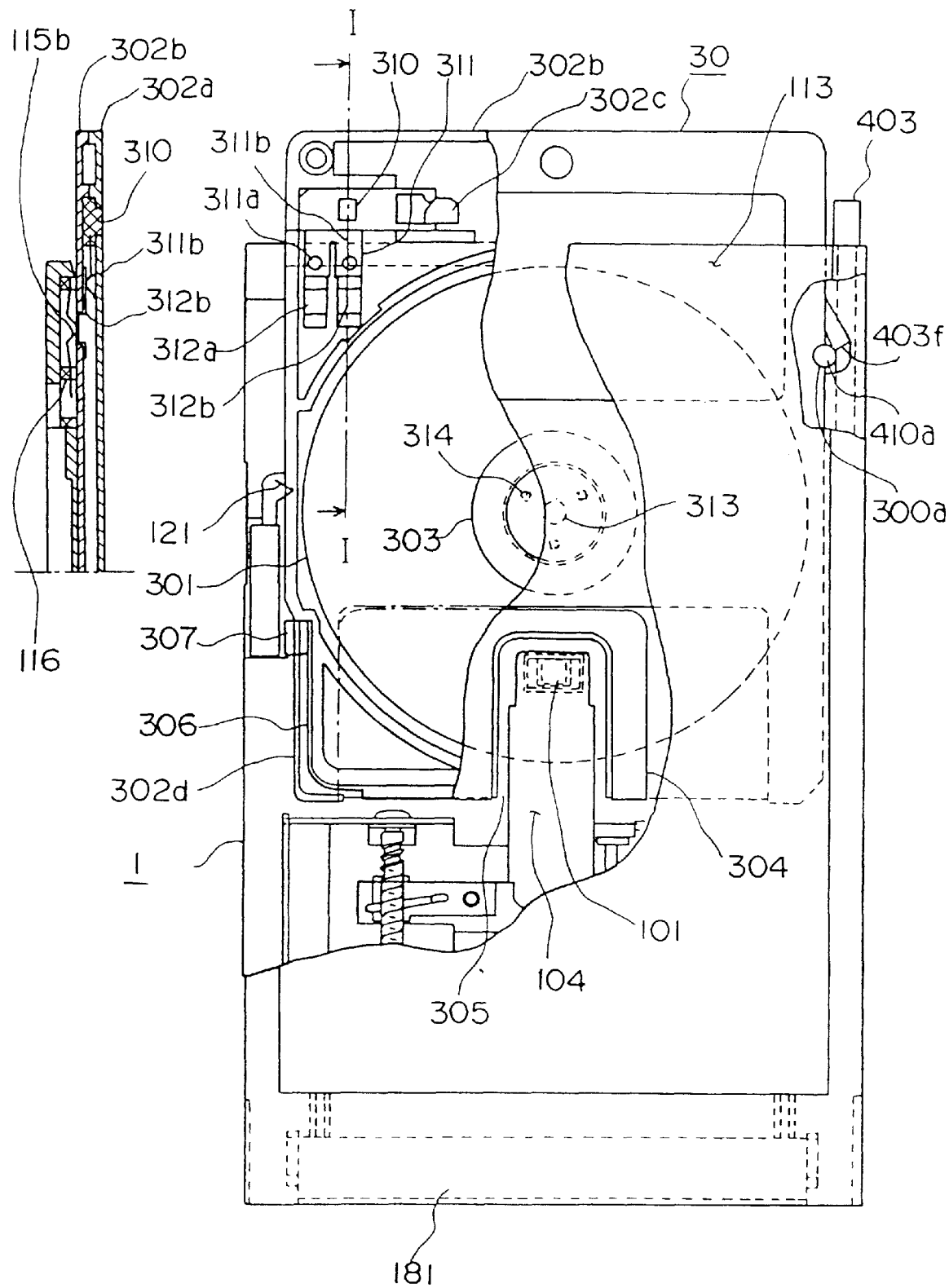
FIG. 86A shows an essential broken plan view of related art.
FIG. 86B shows a transverse cross sectional view in which the cross section A—A is seen from the direction of the arrows.
Figure 87:
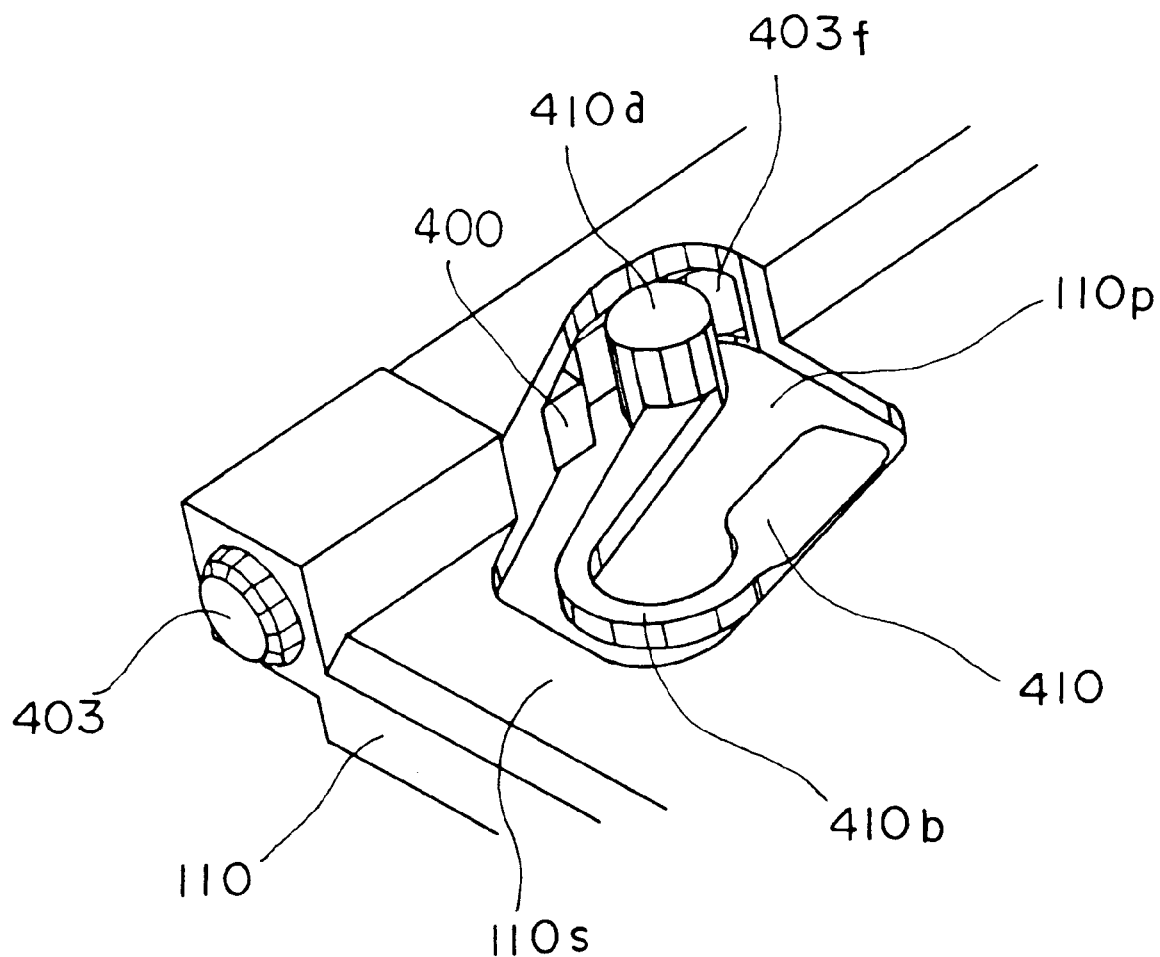
FIG. 87 shows an essential broken perspective view of related art.

The contact terminals 115a and 115c are connected to the power source and the contact terminal 115b is connected to the earth. When the disk is not inserted, in three contact terminals, as shown in FIG. 80C, it is possible to detect "disk out" state. When the disk is inserted, in a case where the conductive metal plate 312 connects three contact terminals, namely, in case of FIG. 80B, it is possible to detect "write protect OFF" state. Further, as shown in FIG. 80A, in which the conductive metal plate 312 is slid, it is possible to detect "write protect ON" state.

As has been described, in the present embodiment, based on the conductive metal plate 312, it is possible to detect "disk in/out" state and "write protect ON/OFF" state. Accordingly, it is possible for the recording medium cartridge 300 to reduce the number of the parts.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only, and not intended to be limiting. The invention is limited only as defined in the following claims and the equivalents thereto.

What is claimed is:

1. A storage device for connecting to an information processing device, comprising:
    a recording medium cartridge containing a recording medium;
    a frame for holding the recording medium cartridge;
    an insertion/ejection means for inserting/ejecting the recording medium cartridge into/from the frame;
    a recording medium drive actuator, provided on the frame for rotating and driving the recording medium,
    wherein the recording medium cartridge has
        a hub including a position setting hole supporting the recording medium,
        a restriction member provided on the recording medium cartridge, and
        a slide member, provided in the hub, for moving parallel to the frame, wherein a moving range of the slide member is restricted by the restriction member;
    wherein said recording medium drive actuator has
        a shaft, provided in the frame, for engaging with the position setting hole of the hub by moving vertically with respect to the frame towards the recording medium when the recording medium cartridge is inserted into said frame and
    wherein said shaft
        a) is retracted by the slide member moving horizontally to the frame when the recording medium cartridge is inserted into the frame so that an engagement with the position setting hole is enabled; and,
        b) is retracted by the slide member moving parallel to the frame when the recording medium cartridge is ejected from the frame by the insertion/ejection means, so that the engagement with the position setting hole can be released.

2. The storage device of claim 1, wherein said recording medium drive actuator includes a spindle part having a taper at an outer circumference whereat the recording medium cartridge engages.

* * * * *